(12) United States Patent
Favor et al.

(10) Patent No.: US 12,001,337 B2
(45) Date of Patent: Jun. 4, 2024

(54) USING PHYSICAL ADDRESS PROXIES TO ACCOMPLISH PENALTY-LESS PROCESSING OF LOAD/STORE INSTRUCTIONS WHOSE DATA STRADDLES CACHE LINE ADDRESS BOUNDARIES

(71) Applicant: Ventana Micro Systems Inc., Cupertino, CA (US)

(72) Inventors: John G. Favor, San Francisco, CA (US); Srivatsan Srinivasan, Cedar Park, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 205 days.

(21) Appl. No.: 17/747,749

(22) Filed: May 18, 2022

(65) Prior Publication Data

US 2022/0358045 A1    Nov. 10, 2022

Related U.S. Application Data

(63) Continuation-in-part of application No. 17/370,009, filed on Jul. 8, 2021, now Pat. No. 11,481,332, and a continuation-in-part of application No. 17/351,927, filed on Jun. 18, 2021, now Pat. No. 11,416,406, and a continuation-in-part of application No. 17/351,946, filed on Jun. 18, 2021, now Pat. No. 11,397,686, and a continuation-in-part of application No. 17/315,262, filed on May 7, 2021, now Pat. No. 11,416,400, said (Continued)

(51) Int. Cl.
*G06F 12/08* (2016.01)
*G06F 12/0811* (2016.01)
*G06F 12/0864* (2016.01)

(52) U.S. Cl.
CPC ...... *G06F 12/0864* (2013.01); *G06F 12/0811* (2013.01)

(58) Field of Classification Search
CPC .................... G06F 12/0864; G06F 12/0811
See application file for complete search history.

(56) References Cited

U.S. PATENT DOCUMENTS 5,526,510 A    6/1996 Akkary et al.
5,742,831 A    4/1998 Creta
(Continued)

*Primary Examiner* — Jae U Yu
(74) *Attorney, Agent, or Firm* — E. Alan Davis; Huffman Law Group, PC

(57) ABSTRACT

A microprocessor includes a physically-indexed physically-tagged second-level set-associative cache. A set index and a way uniquely identifies each entry. A load/store unit, during store/load instruction execution: detects that a first and second portions of store/load data are to be written/read to/from different first and second lines of memory specified by first and second store physical memory line addresses, writes to a store/load queue entry first and second store physical address proxies (PAPs) for first and second store physical memory line addresses (and all the store data in store execution case). The first and second store PAPs comprise respective set indexes and ways that uniquely identifies respective entries of the second-level cache that holds respective copies of the respective first and second lines of memory. The entries of the store queue are absent storage for holding the first and second store physical memory line addresses.

40 Claims, 26 Drawing Sheets

Related U.S. Application Data application No. 17/370,009 is a continuation-in-part of application No. 17/351,927, filed on Jun. 18, 2021, now Pat. No. 11,416,406, and a continuation-in-part of application No. 17/351,946, filed on Jun. 18, 2021, now Pat. No. 11,397,686, and a continuation-in-part of application No. 17/315,262, filed on May 7, 2021, now Pat. No. 11,416,400, said application No. 17/351,927 is a continuation-in-part of application No. 17/315,262, filed on May 7, 2021, now Pat. No. 11,416,400, said application No. 17/351,946 is a continuation-in-part of application No. 17/315,262, filed on May 7, 2021, now Pat. No. 11,416,400.

(60) Provisional application No. 63/331,487, filed on Apr. 15, 2022, provisional application No. 63/285,372, filed on Dec. 2, 2021, provisional application No. 63/271,934, filed on Oct. 26, 2021.

(56) References Cited

U.S. PATENT DOCUMENTS

| | | |
|---|---|---|
| 5,745,729 A | 4/1998 | Greenley et al. |
| 6,006,312 A | 12/1999 | Kohn et al. |
| 6,662,280 B1 | 12/2003 | Hughes |
| 7,058,065 B2 | 6/2006 | Musoll et al. |
| 8,521,982 B2 | 8/2013 | Cargnoni et al. |
| 8,984,254 B2 | 3/2015 | Tran et al. |
| 10,397,362 B1 | 8/2019 | Volpe et al. |
| 10,565,113 B2 | 2/2020 | Avudaiyappan |
| 11,625,335 B2 | 4/2023 | Borikar et al. |
| 2002/0120813 A1 | 8/2002 | Boatright et al. |
| 2003/0023814 A1 | 1/2003 | Barroso et al. |
| 2004/0148468 A1 | 7/2004 | Hooker |
| 2006/0107021 A1 | 5/2006 | Barrick et al. |
| 2009/0172360 A1 | 7/2009 | Hikichi |
| 2013/0185792 A1 | 7/2013 | Balakrishnan et al. |
| 2013/0304991 A1* | 11/2013 | Bottcher ............ G06F 12/1054 711/E12.024 |
| 2014/0215191 A1 | 7/2014 | Kanapathipillai et al. |
| 2015/0019840 A1 | 1/2015 | Anderson et al. |
| 2015/0331796 A1 | 11/2015 | Guthrie et al. |
| 2017/0293567 A1 | 10/2017 | Bryant et al. |
| 2019/0108028 A1 | 4/2019 | Gonzalez et al. |
| 2019/0108035 A1 | 4/2019 | Gonzalez et al. |
| 2020/0133861 A1 | 4/2020 | Avudaiyappan |
| 2022/0357955 A1 | 11/2022 | Favor et al. |
| 2022/0358037 A1 | 11/2022 | Favor et al. |
| 2022/0358038 A1 | 11/2022 | Favor et al. |
| 2022/0358039 A1 | 11/2022 | Favor et al. |
| 2022/0358040 A1 | 11/2022 | Favor et al. |
| 2022/0358044 A1 | 11/2022 | Favor et al. |
| 2022/0358046 A1 | 11/2022 | Favor et al. |
| 2022/0358047 A1 | 11/2022 | Favor et al. |
| 2022/0358048 A1 | 11/2022 | Favor et al. |
| 2022/0358052 A1 | 11/2022 | Favor et al. |
| 2022/0358209 A1 | 11/2022 | Favor et al. |
| 2022/0358210 A1 | 11/2022 | Favor et al. |

* cited by examiner

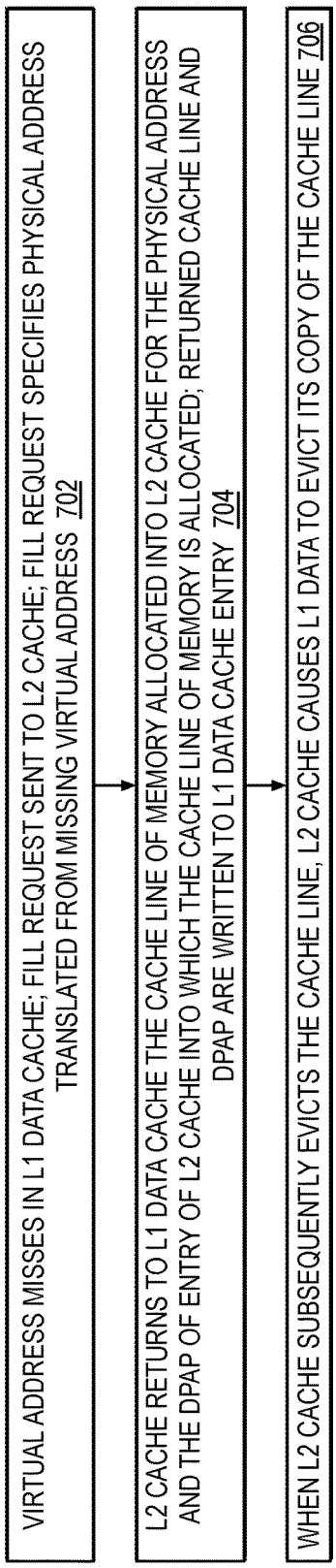
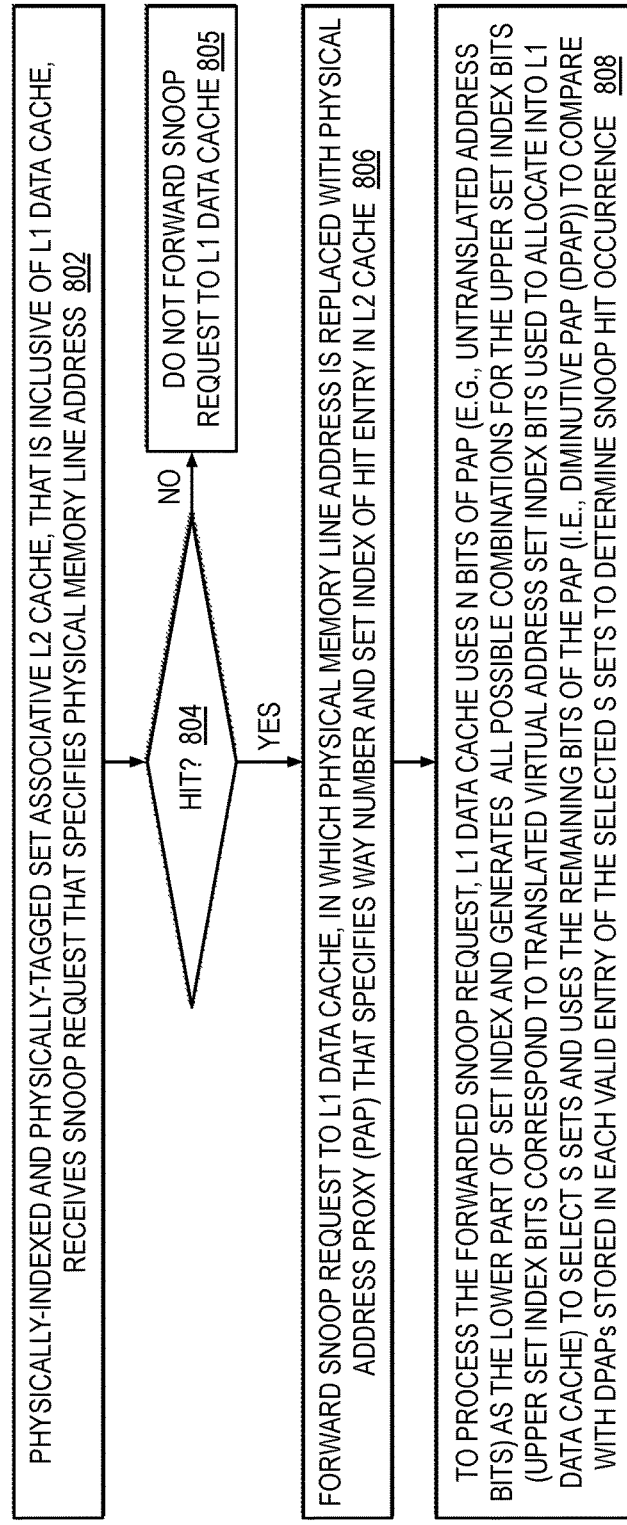

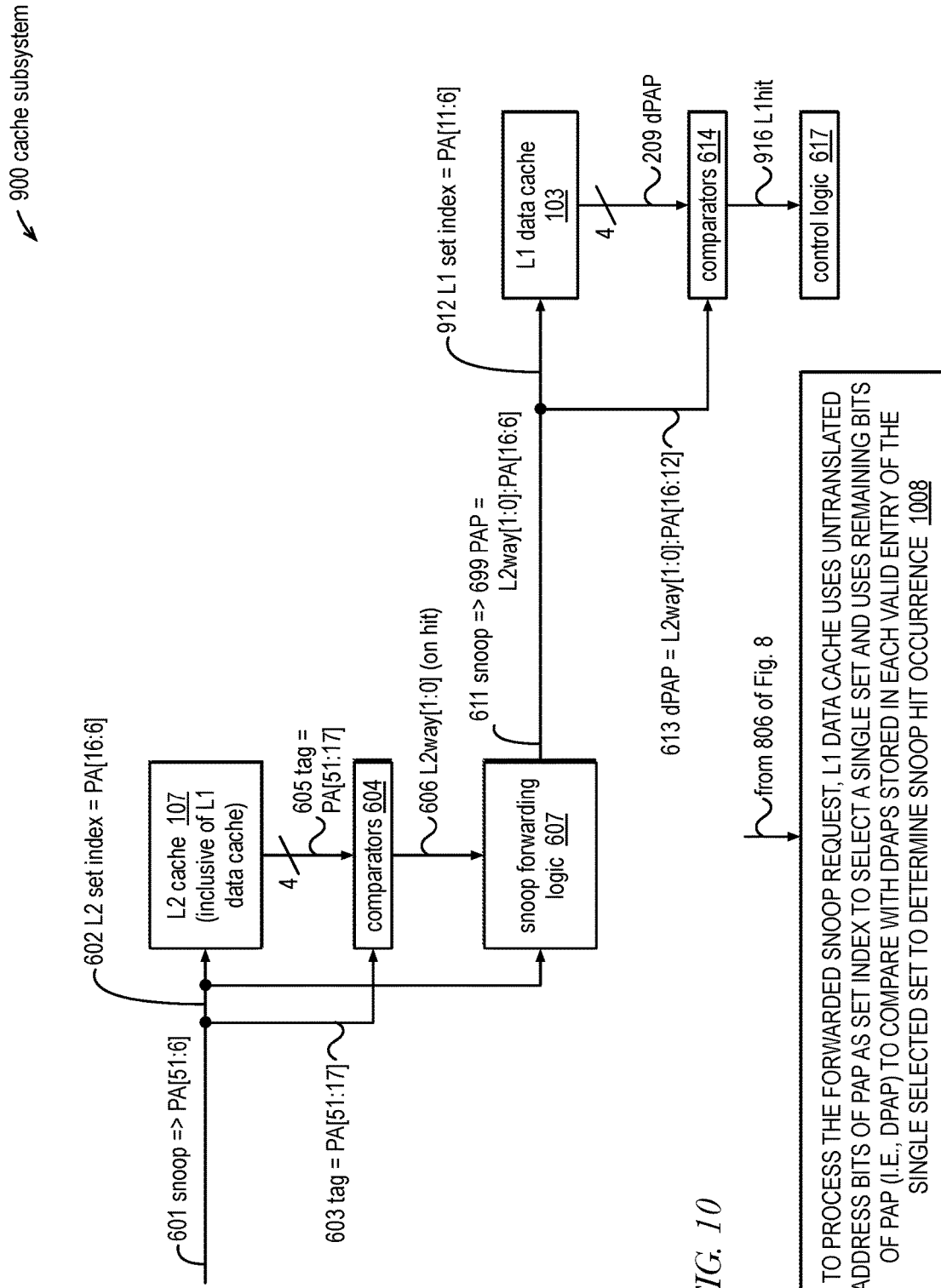

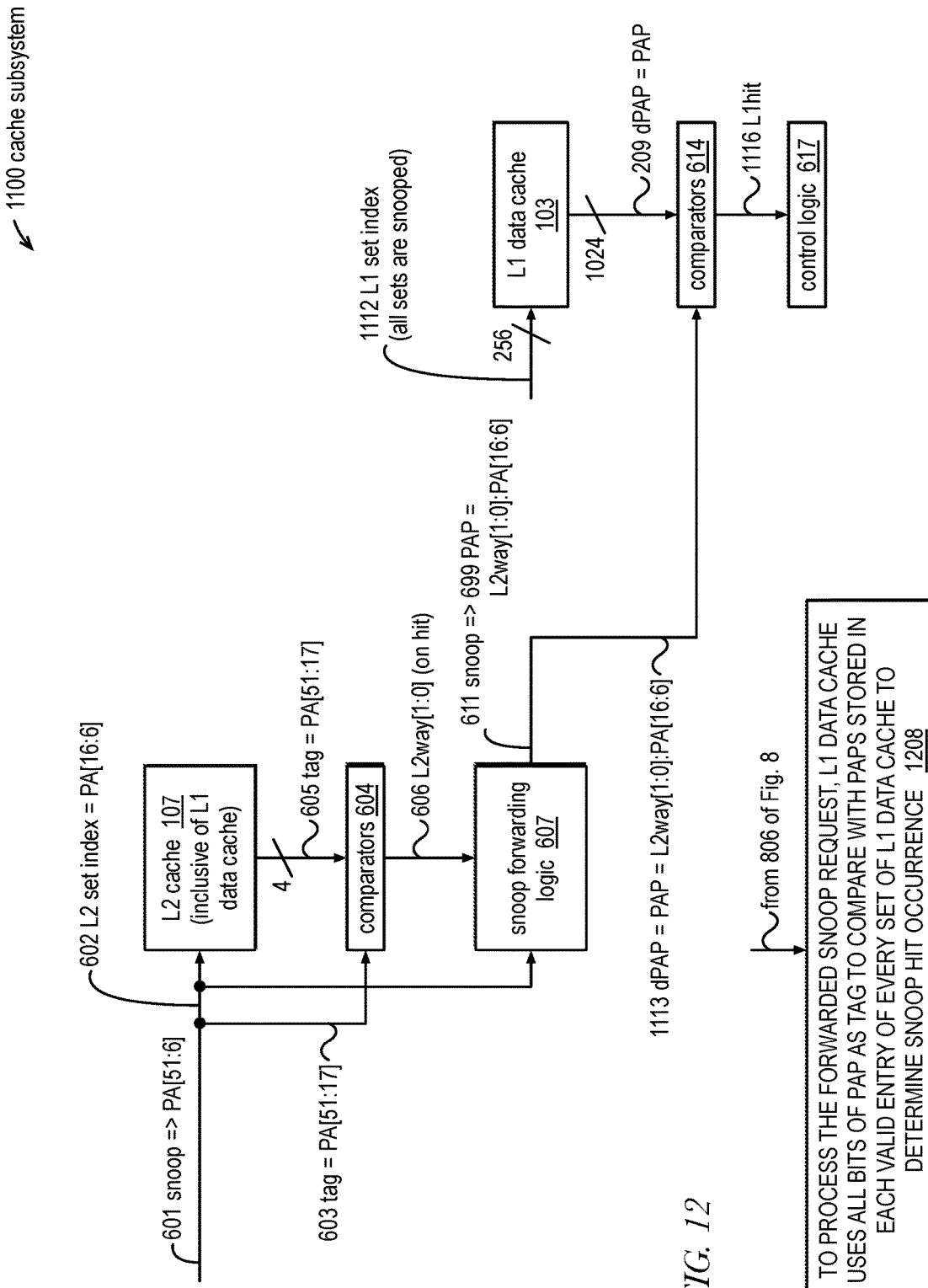

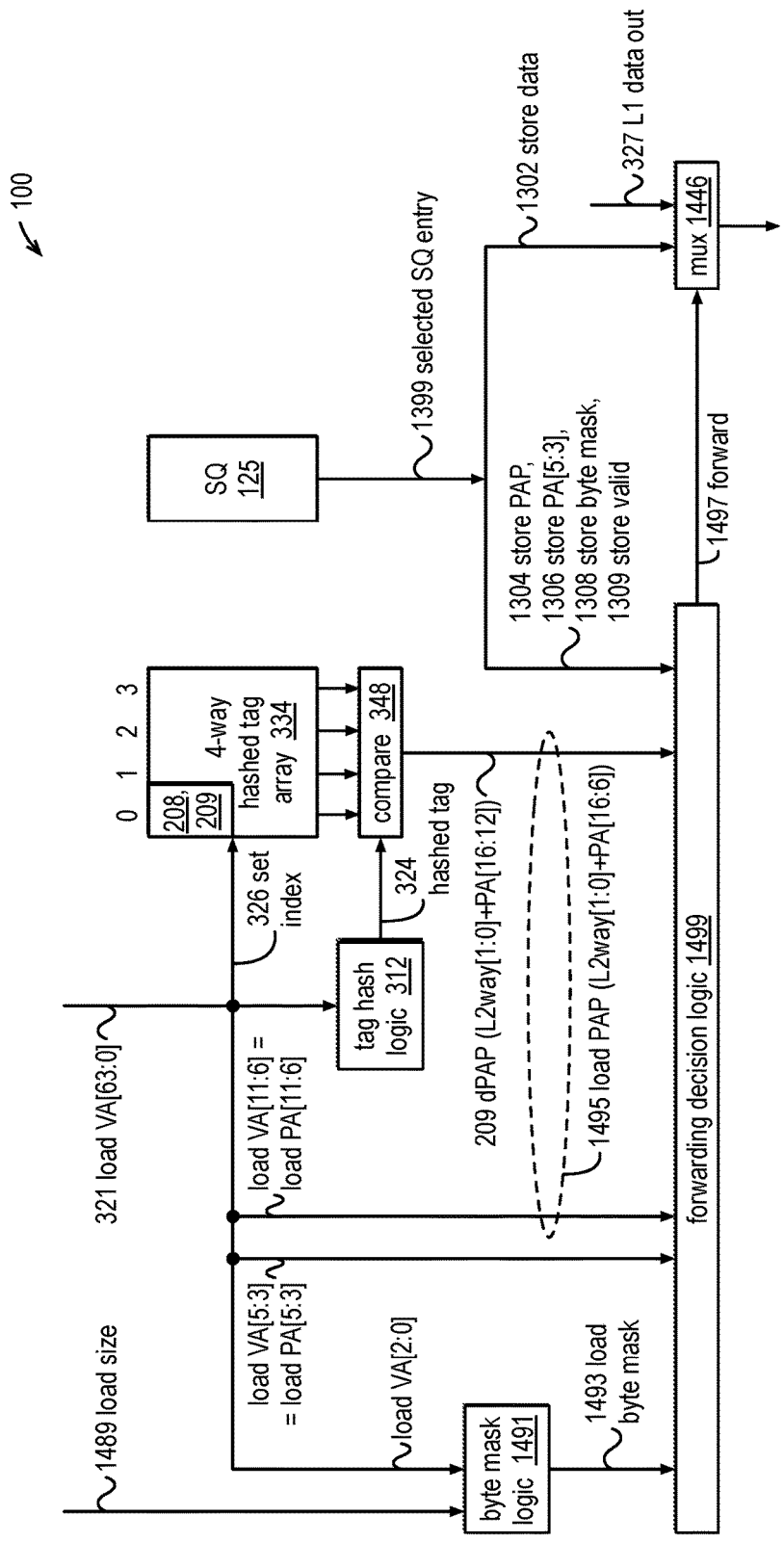

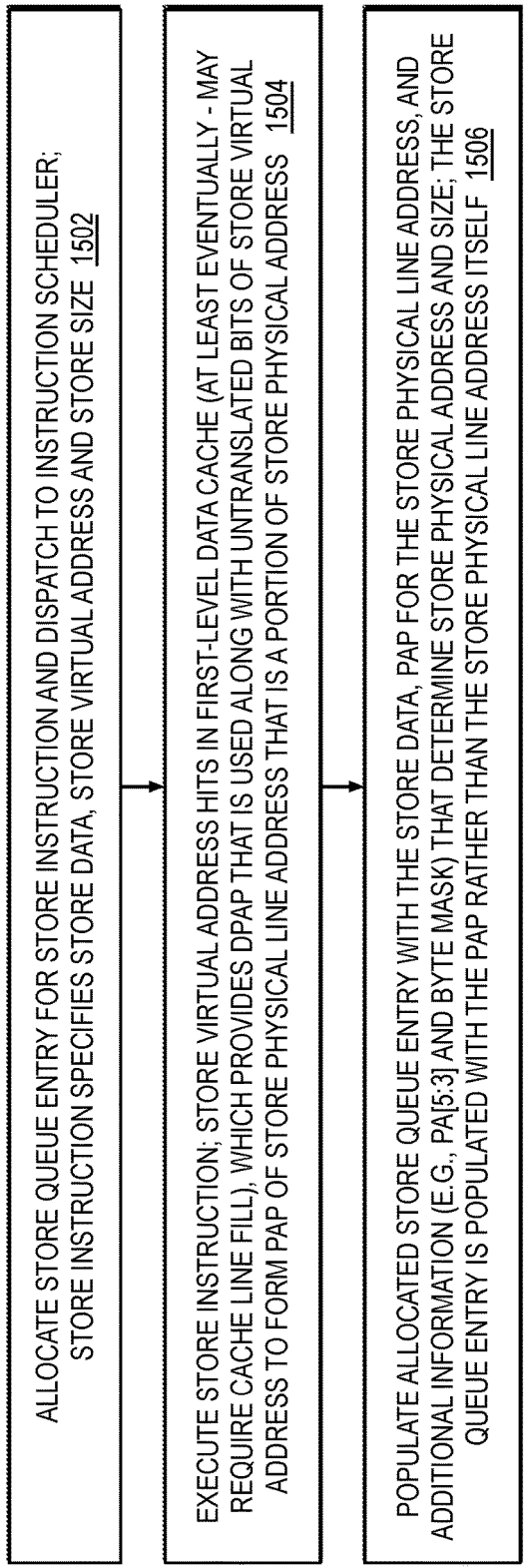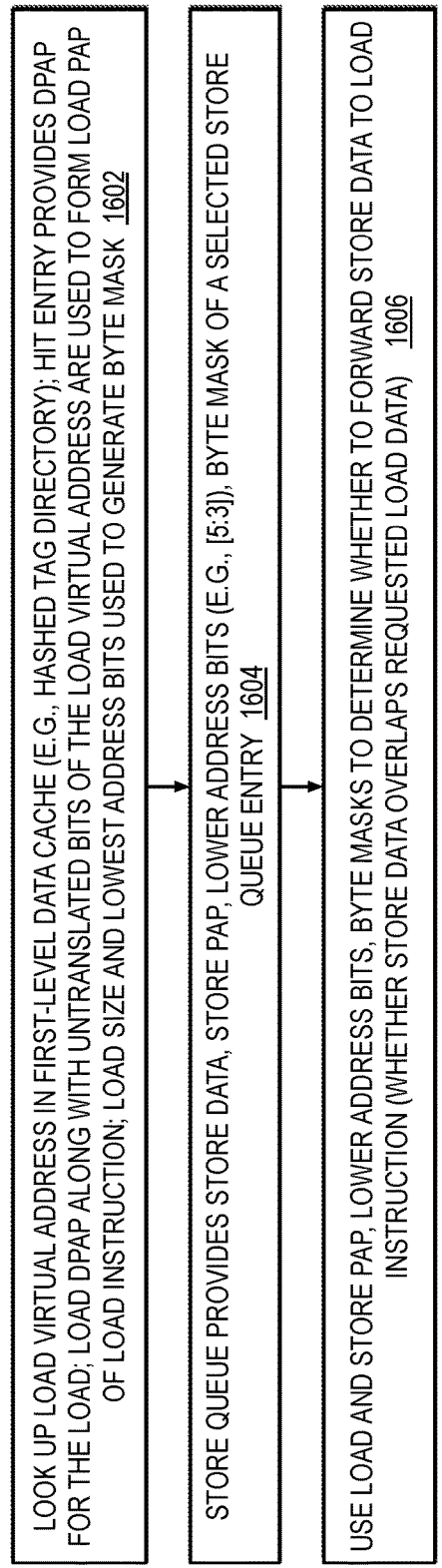

USING PHYSICAL ADDRESS PROXIES TO ACCOMPLISH PENALTY-LESS PROCESSING OF LOAD/STORE INSTRUCTIONS WHOSE DATA STRADDLES CACHE LINE ADDRESS BOUNDARIES

CROSS REFERENCE TO RELATED APPLICATION(S)

This application claims priority to U.S. Provisional Application Ser. No. 63/285,372 filed Dec. 2, 2021 and to U.S. Provisional Application Ser. No. 63/271,934 filed Oct. 26, 2021 and to U.S. Provisional Application Ser. No. 63/331,487 filed Apr. 15, 2022, and this application is a continuation-in-part of U.S. Non-Provisional application Ser. No. 17/370,009, filed Jul. 8, 2021, now U.S. Pat. No. 11,481,332, and is a continuation-in-part of U.S. Non-Provisional application Ser. No. 17/351,927, filed Jun. 18, 2021, now U.S. Pat. No. 11,416,406, and is a continuation-in-part of U.S. Non-Provisional application Ser. No. 17/351,946, filed Jun. 18, 2021, now U.S. Pat. No. 11,397,686, and is a continuation-in-part of U.S. Non-Provisional application Ser. No. 17/315,262, filed May 7, 2021; now U.S. Pat. No. 11,416,400, Ser. No. 17/370,009 is a continuation-in-part of Ser. No. 17/351,927 and Ser. No. 17/351,946 and Ser. No. 17/315,262; each of Ser. No. 17/351,927 and Ser. No. 17/351,946 is a continuation-in-part of Ser. No. 17/315,262; each of Ser. No. 17/370,009 and Ser. No. 17/351,927 and Ser. No. 17/351,946 and Ser. No. 17/315,262 and 63/271,934 and 63/331,487 and 63/285,372 is hereby incorporated by reference in its entirety.

BACKGROUND

Cache memories in microprocessors may have a significant impact on their performance. A cache memory is a memory within a processor that is small and fast relative to system memory, also referred to as main memory. The cache memory holds a copy of a small subset of the contents of system memory so that the processor can access the subset faster than the processor can access system memory. Generally, the cache tends to hold most recently used data by evicting least recently used data when allocating space for newly used data. In this manner, a cache memory reduces the execution time of load/store instructions by alleviating the need to read system memory to access the data specified by a load instruction and enabling a store instruction to immediately write its data to the cache memory without having to wait to write the data to system memory, for example. Generally, a cache memory stores a copy of system memory data in a quantum of a cache line, or cache block, e.g., 64 bytes. That is, when a cache memory allocates an entry for a memory address, the cache memory brings in an entire cache line implicated by the memory address, and when the cache memory has modified a copy of system memory, the cache memory writes back to system memory the entire modified cache line rather than merely the modified data.

The cache memories may significantly improve processor performance since a system memory access may require an order of magnitude more clock cycles than a cache memory access. Importantly, a load instruction, for example, may be stalled in its execution waiting for the data to be read from memory. To further exacerbate the situation, instructions dependent upon the load data may be prevented from being issued for execution, and instructions dependent upon the dependent instructions may also be prevented from being issued for execution, and so forth. If enough dependent instructions are stalled or waiting to issue and sufficient independent instructions are not within the execution window, execution units of the processor may sit idle, significantly reducing the instruction execution rate of the processor.

Even though a cache memory may improve load/store execution time by mitigating the need for memory accesses, nevertheless the time required to access the cache memory also affects the performance of the processor. This is particularly true for the cache memory that is directly accessed by load/store units of the processor, i.e., the cache memory at the lowest level in a processor that includes a cache hierarchy of multiple cache memories. That is, the performance of the processor may be significantly improved by reducing even a single clock cycle from the access time to the first level cache memory and/or enabling the cycle time of the processor to be made shorter by reducing the first level cache memory access time.

Finally, the performance of the processor is also significantly affected by the hit rate of the cache memory, which is affected by the capacity of the cache memory in terms of the number of bytes the cache memory is designed to hold. Cache memories hold other information besides the actual cache line data such as tags, status, and replacement policy information. Reducing the amount of other information held by the cache may enable the capacity of the cache to be bigger, i.e., to store more bytes of copies of memory data, thereby improving its hit rate. Furthermore, reducing the amount of other information held by the cache may enable the physical size of the cache—i.e., the area on the integrated circuit—to be smaller and to reduce the physical size of accompanying logic, e.g., comparators, again potentially enabling the capacity of the cache to be bigger, thereby improving its hit rate and improving the performance of the processor.

Another issue arises in the context of a system that includes multiple processors that share system memory and that each include a cache memory. In such systems, the processors must cooperate to ensure that when a processor reads from a memory address it receives the value most recently written to the address by any of the processors. For example, assume processors A and B each have a copy of a cache line at a memory address in their respective caches, and assume processor A modifies its copy of the cache line. The system needs to ensure that processor B receives the modified value when it subsequently reads from the address. This is commonly referred to as cache coherency.

A frequently employed protocol for attaining cache coherency is commonly referred to as a write-invalidate protocol that involves each processor snooping a shared bus used to access system memory. Using the example above, processor A broadcasts on the bus an invalidate transaction to announce that it intends to modify its copy of the cache line at the memory address. Processor B snoops the bus and sees the invalidate transaction. In response, processor B invalidates its copy of the cache line. When processor B later reads from the memory address, it broadcasts a read transaction on the bus. Processor A snoops the bus and sees the read transaction. In response, processor A provides the modified cache line to processor B and cancels the read transaction to the system memory. Processor A may also write back the modified cache line to system memory at this time.

As described above, cache memories hold and process other information besides the actual cache line data, some of which involves information for handling snooping the shared bus to attain cache coherency. By reducing the amount of cache coherence-related information held and processed by the cache, performance of the processor may be improved by increasing the speed of the cache and reducing its physical size.

SUMMARY

In one embodiment, the present disclosure provides a microprocessor that includes a physically-indexed physically-tagged second-level set-associative cache. Each entry of the second-level cache is configured to hold a copy of a line of memory and is uniquely identified by a set index and a way. The microprocessor also includes a store queue and a load/store unit. The load/store unit is configured to, during execution of a store instruction having store data: detect that, based on a store virtual address and a data size specified by the store instruction, a first portion of the store data is to be written to a first line of memory specified by a first store physical memory line address and that a second portion of the store data is to be written to a second line of memory different from the first line of memory and specified by a second store physical memory line address, write all the store data to an entry of the store queue allocated to the store instruction, and write to the allocated store queue entry first and second store physical address proxies (PAPs) for the first and second store physical memory line addresses, respectively. The first store PAP comprises the set index and way that uniquely identifies an entry of the second-level cache that holds a copy of the first line of memory specified by the first store physical memory line address. The second store PAP comprises the set index and way that uniquely identifies an entry of the second-level cache that holds a copy of the second line of memory specified by the second store physical memory line address. The entries of the store queue are absent storage for holding the first and second store physical memory line addresses.

In another embodiment, the present disclosure provides a microprocessor that includes a physically-indexed physically-tagged second-level set-associative cache. Each entry of the second-level cache is configured to hold a copy of a line of memory and is uniquely identified by a set index and a way. The microprocessor also includes a load queue and a load/store unit. The load/store unit is configured to, during execution of a load instruction that requests load data: detect that, based on a load virtual address and a data size specified by the load instruction, a first portion of the load data is to be read from a first line of memory specified by a first load physical memory line address and that a second portion of the load data is to be read from a second line of memory different from the first line of memory and specified by a second load physical memory line address and write to an entry of the load queue allocated to the load instruction first and second load physical address proxies (PAPs) for the first and second load physical memory line addresses, respectively. The first load PAP comprises the set index and way that uniquely identifies an entry of the second-level cache that holds a copy of the first line of memory specified by the first load physical memory line address. The second load PAP comprises the set index and way that uniquely identifies an entry of the second-level cache that holds a copy of the second line of memory specified by the second load physical memory line address. The entries of the load queue are absent storage for holding the first and second load physical memory line addresses.

In yet another embodiment, the present disclosure provides a method for use in a microprocessor that includes a physically-indexed physically-tagged second-level set-associative cache, wherein each entry of the second-level cache is configured to hold a copy of a line of memory and is uniquely identified by a set index and a way, a store queue, and a load/store unit. The method includes, by the load/store unit, during execution of a store instruction having store data: detecting, based on a store virtual address and a data size specified by the store instruction, a first portion of the store data is to be written to a first line of memory specified by a first store physical memory line address and that a second portion of the store data is to be written to a second line of memory different from the first line of memory and specified by a second store physical memory line address. The method also includes writing all the store data to an entry of the store queue allocated to the store instruction. The method also includes writing to the allocated store queue entry first and second store physical address proxies (PAPs) for the first and second store physical memory line addresses, respectively. The first store PAP comprises the set index and way that uniquely identifies an entry of the second-level cache that holds a copy of the first line of memory specified by the first store physical memory line address. The second store PAP comprises the set index and way that uniquely identifies an entry of the second-level cache that holds a copy of the second line of memory specified by the second store physical memory line address. The entries of the store queue are absent storage for holding the first and second store physical memory line addresses.

In yet another embodiment, the present disclosure provides a method for use in a microprocessor that includes a physically-indexed physically-tagged second-level set-associative cache, wherein each entry of the second-level cache is configured to hold a copy of a line of memory and is uniquely identified by a set index and a way, a load queue, and a load/store unit. The method includes by the load/store unit during execution of a load instruction that requests load data: detecting that, based on a load virtual address and a data size specified by the load instruction, a first portion of the load data is to be read from a first line of memory specified by a first load physical memory line address and that a second portion of the load data is to be read from a second line of memory different from the first line of memory and specified by a second load physical memory line address. The method also includes writing to an entry of the load queue allocated to the load instruction first and second load physical address proxies (PAPs) for the first and second load physical memory line addresses, respectively. The first load PAP comprises the set index and way that uniquely identifies an entry of the second-level cache that holds a copy of the first line of memory specified by the first load physical memory line address. The second load PAP comprises the set index and way that uniquely identifies an entry of the second-level cache that holds a copy of the second line of memory specified by the second load physical memory line address. The entries of the load queue are absent storage for holding the first and second load physical memory line addresses.

BRIEF DESCRIPTION OF THE DRAWINGS

FIG. 7 is an example flowchart illustrating operation of the cache subsystem of FIG. 6 to process a miss in the L1 data cache in furtherance of an inclusive cache policy in accordance with embodiments of the present disclosure.

FIG. 8 is an example flowchart illustrating operation of the cache subsystem of FIG. 6 to process a snoop request in accordance with embodiments of the present disclosure.

FIG. 9 is an example block diagram of a cache subsystem that employs PAPs to accomplish cache coherence in accordance with embodiments of the present disclosure.

FIG. 10 is an example flowchart portion illustrating operation of the cache subsystem of FIG. 9 to process a snoop request in accordance with embodiments of the present disclosure.

FIG. 11 is an example block diagram of a cache subsystem that employs PAPs to accomplish cache coherence in accordance with embodiments of the present disclosure.

FIG. 12 is an example flowchart portion illustrating operation of the cache subsystem of FIG. 11 to process a snoop request in accordance with embodiments of the present disclosure.

FIG. 13 is an example block diagram of a store queue entry of the store queue (SQ) of FIG. 1 that holds PAPs to accomplish store-to-load forwarding in accordance with embodiments of the present disclosure.

FIG. 14 is an example block diagram of portions of the processor of FIG. 1 used to perform store-to-load forwarding using PAPs in accordance with embodiments of the present disclosure.

FIG. 15 is an example flowchart illustrating processing of a store instruction that includes writing a store PAP into a store queue entry in accordance with embodiments of the present disclosure.

FIG. 16 is an example flowchart illustrating processing of a load instruction that includes using a load PAP and a store PAP from a store queue entry to decide whether to forward store data to the load instruction from the store queue entry in accordance with embodiments of the present disclosure.

DETAILED DESCRIPTION

Figure 1:
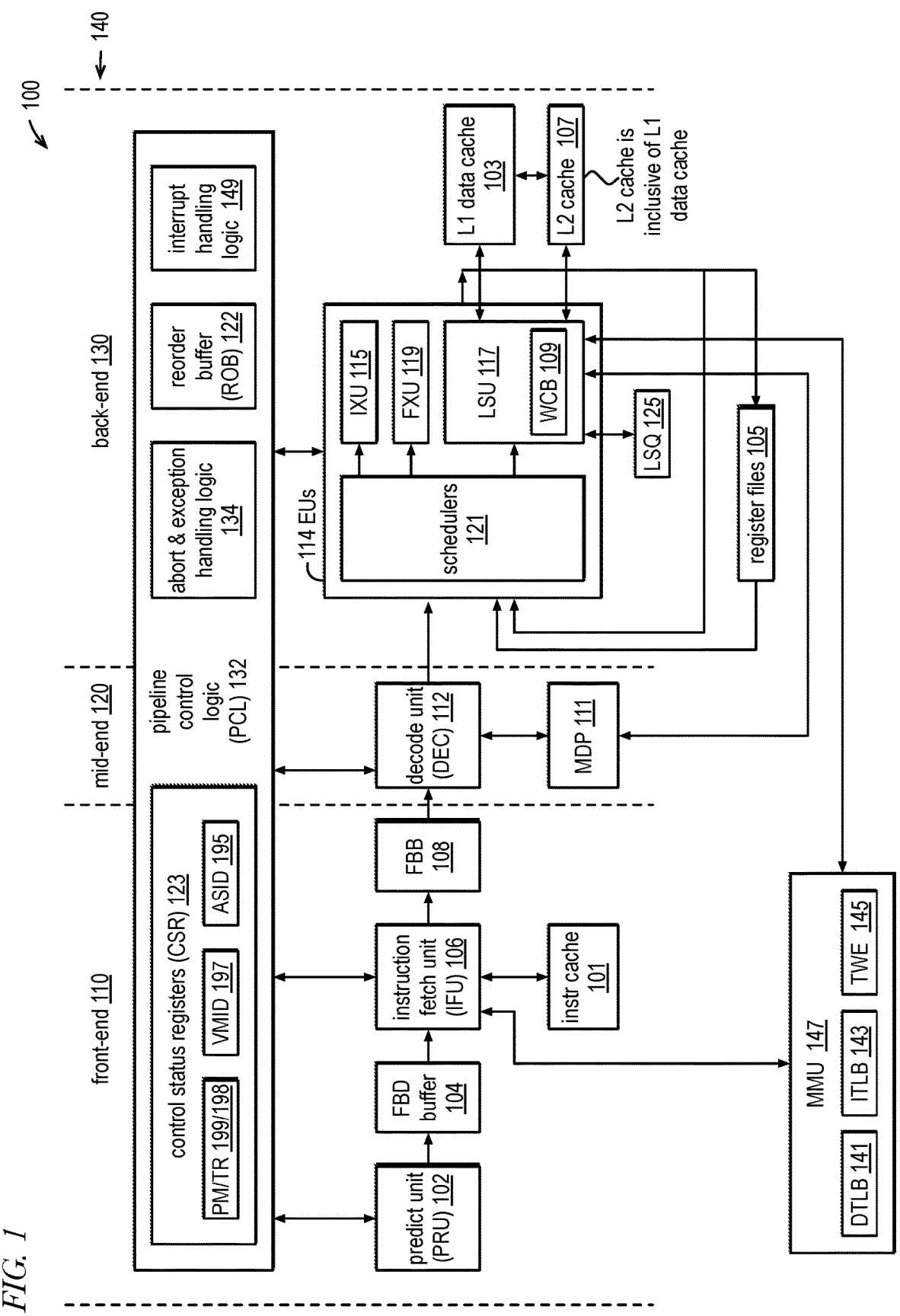
FIG. 1 is an example block diagram of a pipelined super-scalar, out-of-order execution microprocessor core that performs speculative execution of instructions in accordance with embodiments of the present disclosure.

FIG. 1 is an example block diagram of a pipelined super-scalar, out-of-order execution microprocessor core 100 that performs speculative execution of instructions in accordance with embodiments of the present disclosure. Speculative execution of an instruction means execution of the instruction during a time when at least one instruction older in program order than the instruction has not completed execution such that a possibility exists that execution of the older instruction will result in an abort, i.e., flush, of the instruction. The core 100 includes a cache memory subsystem that employs physical address proxies (PAP) to attain cache coherence as described herein. Although a single core 100 is shown, the PAP cache coherence techniques described herein are not limited to a particular number of cores. Generally, the PAP cache coherence embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the PAP cache coherence techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a level-1 (L1) data cache 103, a level-2 (L2) cache 107, a register files 105, a plurality of execution units (EU) 114, and load and store queues (LSQ) 125. In one embodiment, the register files 105 include an integer register file, a floating-point register file and a vector register file. In one embodiment, the register files 105 include both architectural registers as well as microarchitectural registers. In one embodiment, the EUs 114 include integer execution units (IXU) 115, floating point units (FXU) 119, and a load-store unit (LSU) 117. The LSQ 125 hold speculatively executed load/store micro-operations, or load/store Ops, until the Op is committed. More specifically, the load queue 125 holds a load operation until it is committed, and the store queue 125 holds a store operation until it is committed. The store queue 125 may also forward store data that it holds to other dependent load Ops. When a load/store Op is committed, the load queue 125 and store queue 125 may be used to check for store forwarding violations. When a store Op is committed, the store data held in the associated store queue 125 entry is written into the L1 data cache 103 at the store address held in the store queue 125 entry. In one embodiment, the load and store queues 125 are combined into a single memory queue structure rather than separate queues. The DEC 112 allocates an entry of the LSQ 125 in response to decode of a load/store instruction.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. In one embodiment, the core 100 also includes a memory dependence predictor (MDP) 111 coupled to the DEC 112 and LSU 117. The MDP 111 makes store dependence predictions that indicate whether store-to-load forwarding should be performed.

The LSU 117 includes a write combining buffer (WCB) 109 that buffers write requests sent by the LSU 117 to the DTLB 141 and to the L2 cache 107. In one embodiment, the L1 data cache 103 is a virtually-indexed virtually-tagged write-through cache. In the case of a store operation, when there are no older operations that could cause the store operation to be aborted, the store operation is ready to be committed, and the store data is written into the L1 data cache 103. The LSU 117 also generates a write request to "write-through" the store data to the L2 cache 107 and update the DTLB 141, e.g., to set a page dirty, or page modified, bit. The write request is buffered in the WCB 109. Eventually, at a relatively low priority, the store data associated with the write request will be written to the L2 cache 107. However, entries of the write combining buffer 109 are larger (e.g., 32 bytes) than the largest load and store operations (e.g., eight bytes). When possible, the WCB 109 combines, or merges, multiple write requests into a single entry of the WCB 109 such that the WCB 109 may make a potentially larger single write request to the L2 cache 107 that encompasses the store data of multiple store operations that have spatially-locality. The merging, or combining, is possible when the starting physical memory address and size of two or more store operations align and fall within a single entry of the WCB 109. For example, assume a first 8-byte store operation to 32-byte aligned physical address A, a second 4-byte store operation to physical address A+8, a third 2-byte store operation to physical address A+12, and a fourth 1-byte store operation to physical address A+14. The WCB 109 may combine the four store operations into a single entry and perform a single write request to the L2 cache 107 of the fifteen bytes at address A. By combining write requests, the WCB 109 may free up bandwidth of the L2 cache 107 for other requests, such as cache line fill requests from the L1 data cache 103 to the L2 cache 107 or snoop requests.

The microprocessor 110 may also include other blocks not shown, such as a load buffer, a bus interface unit, and various levels of cache memory above the instruction cache 101 and L1 data cache 103 and L2 cache 107, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables, or translation tables, of a process. The TLBs (e.g., DTLB 141 and ITLB 143) may include the ASID in their tags to distinguish entries for different processes. In the x86 ISA, for example, an ASID may correspond to a processor context identifier (PCID). The core 100 also provides machine virtualization support. Each virtual machine running on the core 100 may have its own virtual machine identifier (VMID). The TLBs may include the VMID in their tags to distinguish entries for different virtual machines. Finally, the core 100 provides different privilege modes (PM), or privilege levels. The PM of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

As used herein and as shown in FIG. 1, a translation context (TC) of the core 100 (or of a hardware thread in the case of a multi-threaded core) is a function of the ASID, VMID, and/or PM or a translation regime (TR), which is based on the PM. In one embodiment, the TR indicates whether address translation is off (e.g., M mode) or on, whether one level of address translation is needed (e.g., U mode, S mode and HS mode) or two levels of address translation is needed (VU mode and VS mode), and what form of translation table scheme is involved. For example, in a RISC-V embodiment, the U and S privilege modes (or U and HS, when the hypervisor extension is active) may share a first TR in which one level of translation is required based on the ASID, VU and VS share a second TR in which two levels of translation are required based on the ASID and VMID, and M privilege level constitutes a third TR in which no translation is performed, i.e., all addresses are physical addresses.

Pipeline control logic (PCL) 132 is coupled to and controls various aspects of the pipeline 140 which are described in detail herein. The PCL 132 includes a ReOrder Buffer (ROB) 122, interrupt handling logic 149, abort and exception-handling logic 134, and control and status registers (CSR) 123. The CSRs 123 hold, among other things, the PM 199, VMID 197, and ASID 195 of the core 100, or one or more functional dependencies thereof (such as the TR and/or TC). In one embodiment (e.g., in the RISC-V ISA), the current PM 199 does not reside in a software-visible CSR 123; rather, the PM 199 resides in a microarchitectural register. However, the previous PM 199 is readable by a software read of a CSR 123 in certain circumstances, such as upon taking of an exception. In one embodiment, the CSRs 123 may hold a VMID 197 and ASID 195 for each TR or PM.

The pipeline units may signal a need for an abort, as described in more detail below, e.g., in response to detection of a mis-prediction (e.g., by a branch predictor of a direction or target address of a branch instruction, or of a mis-prediction that store data should be forwarded to a load Op in response to a store dependence prediction, e.g., by the MDP 111) or other microarchitectural exception, architectural exception, or interrupt. Examples of architectural exceptions include an invalid opcode fault, debug breakpoint, or illegal instruction fault (e.g., insufficient privilege mode) that may be detected by the DEC 112, a page fault, permission violation or access fault that may be detected by the LSU 117, and an attempt to fetch an instruction from a non-executable page or a page the current process does not have permission to access that may be detected by the IFU 106. In response, the PCL 132 may assert flush signals to selectively flush instructions/Ops from the various units of the pipeline 140. Conventionally, exceptions are categorized as either faults, traps, or aborts. The term "abort" as used herein is not limited by the conventional categorization of exceptions. As used herein, "abort" is a microarchitectural mechanism used to flush instructions from the pipeline 140 for many purposes, which encompasses interrupts, faults and traps. Purposes of aborts include recovering from microarchitectural hazards such as a branch mis-prediction or a store-to-load forwarding violation. The microarchitectural abort mechanism may also be used to handle architectural exceptions and for architecturally defined cases where changing the privilege mode requires strong in-order synchronization. In one embodiment, the back-end 130 of the processor 100 operates under a single PM, while the PM for the front-end 110 and mid-end 120 may change (e.g., in response to a PM-changing instruction) while older instructions under an older PM continue to drain out of the back-end 130. Other blocks of the core 100, e.g., DEC 112, may maintain shadow copies of various CSRs 123 to perform their operations.

The PRU 102 maintains the program counter (PC) and includes predictors that predict program flow that may be altered by control flow instructions, such as branch instructions. In one embodiment, the PRU 102 includes a next index predictor (NIP), a branch target buffer (BTB), a main conditional branch predictor (CBP), a secondary conditional branch predictor (BMP), an indirect branch predictor (IBP), and a return address predictor (RAP). As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB). An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions. An FBD may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. The core 100 processes FBlks one at a time, i.e., FBlks are not merged or concatenated. By design, the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 decodes architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses—also referred to as result busses or bypass busses—back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Ops from different FBlks are not concatenated together into the same OpGroup. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. In one embodiment, the MDP 111 provides up to four predictions per cycle, each corresponding to the Ops of a single OpGroup. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all the EUs 114 (and integrated with the ROB 122 according to one embodiment) serves all the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired.

Embodiments of a cache subsystem are described herein that advantageously enable cache coherency attainment with higher performance and/or reduced size using PAPs.

Figures 2, 3:
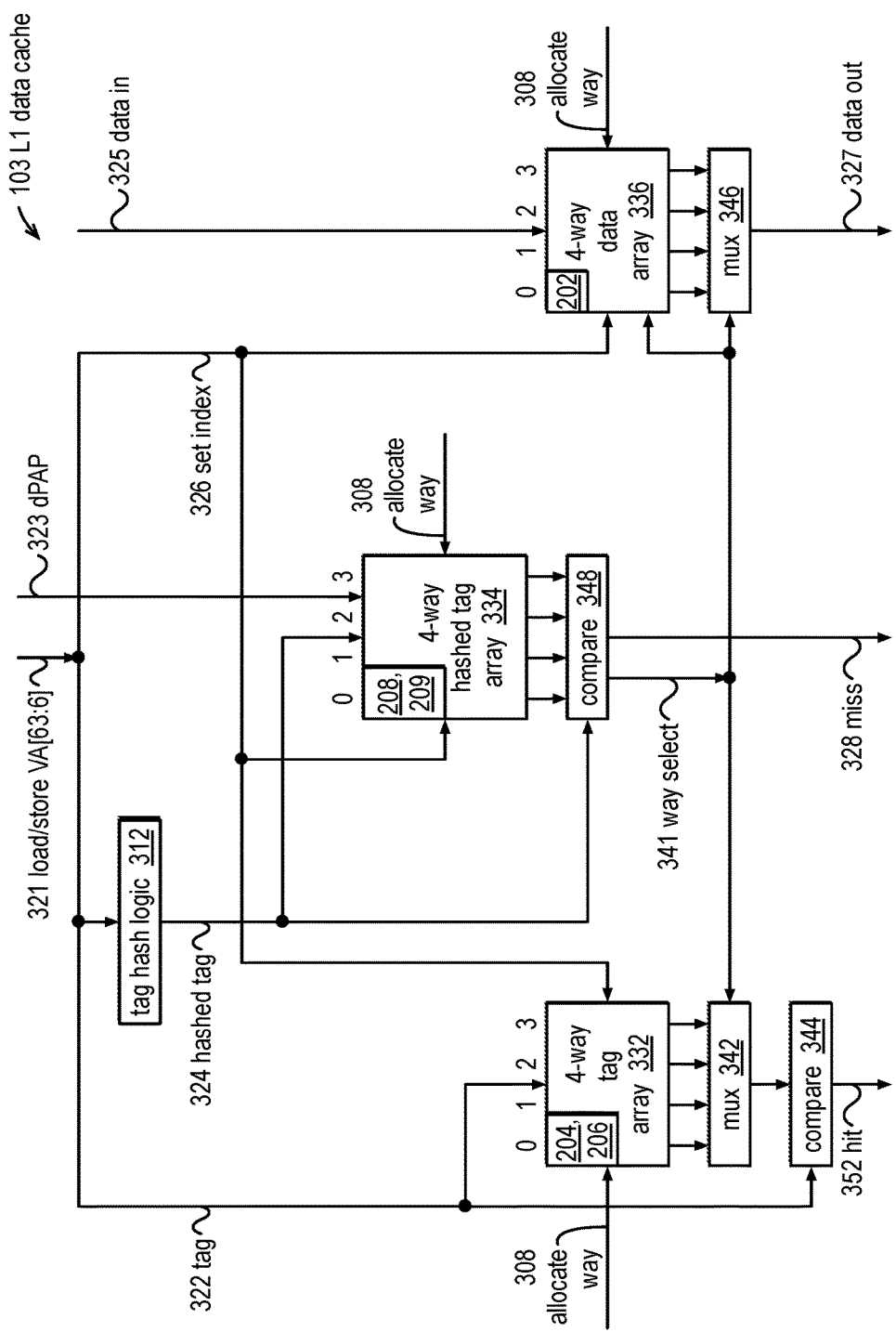
FIG. 2 is an example block diagram of a cache entry of L1 data cache of FIG. 1 that employs PAPs to accomplish cache coherence in accordance with embodiments of the present disclosure.
FIG. 3 is an example block diagram illustrating the L1 data cache of FIG. 1 that employs PAPs to accomplish cache coherence in accordance with embodiments of the present disclosure.

FIG. 2 is an example block diagram of a cache entry 201 of L1 data cache 103 of FIG. 1 that employs PAPs to accomplish cache coherence in accordance with embodiments of the present disclosure. The L1 data cache entry 201 is used in the L1 data cache 103 embodiment of FIG. 3 described in more detail below. The L1 data cache entry 201 includes cache line data 202, a virtual address tag 204, a status field 206, a hashed tag field 208, and a diminutive physical address proxy (dPAP) field 209. The cache line data 202 is the copy of the data brought into the L1 data cache 103 from system memory indirectly through a higher level of the cache memory hierarchy, namely the L2 cache 107.

The tag 204 is upper bits (e.g., tag bits 322 of FIG. 3) of the virtual memory address (e.g., virtual load/store address 321 of FIG. 3) specified by the operation that brought the cache line into the L1 data cache 103, e.g., the virtual memory address specified by a load/store operation. That is, when an entry 201 in the L1 data cache 103 is allocated, the tag bits 322 of the virtual memory address 321 are written to the virtual address tag 204 of the entry 201. When the L1 data cache 103 is subsequently accessed (e.g., by a subsequent load/store operation), the virtual address tag 204 is used to determine whether the access hits in the L1 data cache 103. Generally speaking, the L1 data cache 103 uses lower bits (e.g., set index bits 326 of FIG. 3) of the virtual memory address to index into the L1 data cache 103 and uses the remaining bits of the virtual address 321 above the set index bits 326 as the tag bits. To illustrate by way of example, assume a 64 kilobyte (KB) L1 data cache 103 arranged as a 4-way set associative cache having 64-byte cache lines; address bits [5:0] are an offset into the cache line, virtual address bits [13:6] (set index bits) are used as the set index, and virtual address bits [N−1:14] (tag bits) are used as the tag, where N is the number of bits of the virtual memory address, where N is 63 in the embodiment of FIG. 3.

The status 206 indicates the state of the cache line. More specifically, the status 206 indicates whether the cache line data is valid or invalid. Typically, the status 206 also indicates whether the cache line has been modified since it was brought into the L1 data cache 103. The status 206 may also indicate whether the cache line is exclusively held by the L1 data cache 103 or whether the cache line is shared by other cache memories in the system. An example protocol used to maintain cache coherency defines four possible states for a cache line: Modified, Exclusive, Shared, Invalid (MESI).

The hashed tag 208 may be a hash of the tag bits 322 of FIG. 3 of the virtual memory address 321, as described in more detail below. Advantageously, the hashed tag 208 may be used to generate a predicted early miss indication, e.g., miss 328 of FIG. 3, and may be used to generate a predicted early way select signal, e.g., way select 342 of FIG. 3, as described in more detail with respect to FIG. 3.

Figure 6:
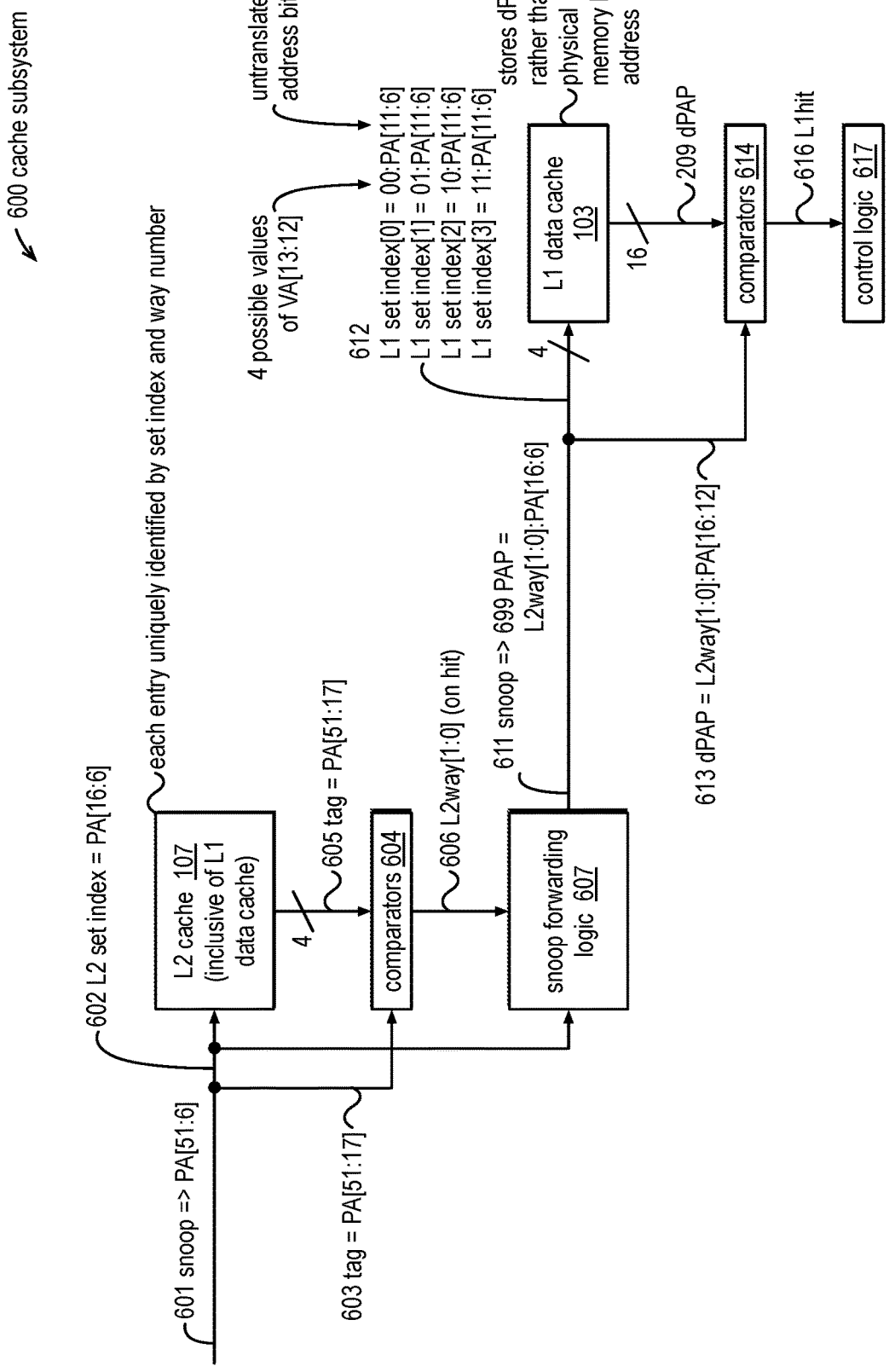
FIG. 6 is an example block diagram of a cache subsystem that employs PAPs to accomplish cache coherence in accordance with embodiments of the present disclosure.

The dPAP 209 is all or a portion of a physical address proxy (PAP), e.g., PAP 699 of FIG. 6. As described herein, the L2 cache 107 is inclusive of the L1 data cache 103. That is, each cache line of memory allocated into the L1 data cache 103 is also allocated into the L2 cache 107, and when the L2 cache 107 evicts the cache line, the L2 cache 107 also causes the L1 data cache 103 to evict the cache line. A PAP is a forward pointer to the unique entry in the L2 cache 107 (e.g., L2 entry 401 of FIG. 4) that holds a copy of the cache line held in the entry 201 of the L1 data cache 103. For example, in the embodiments of FIGS. 6 and 9, the dPAP 209 is the PAP less the untranslated physical address PA[11: 6] bits that are used in the L1 set index. That is, the dPAP is the L2 way and the translated physical address bits PA[16:12] of the set index of the L2 cache 107 set containing the entry 401 that holds the copy of the L1 data cache 103 cache line. For another example, in the embodiment of FIG. 11, the dPAP is the entire PAP, e.g., all the bits of the L2 way and L2 set index that point to the entry 401 in the L2 cache 107 that holds the copy of the L1 data cache 103 cache line. Uses of the dPAP 209 and PAP are described in more detail herein.

FIG. 3 is an example block diagram illustrating the L1 data cache 103 of FIG. 1 that employs PAPs to accomplish cache coherence in accordance with embodiments of the present disclosure. In the embodiment of FIG. 3, the L1 data cache 103 is a virtual cache, i.e., it is virtually-indexed and virtually-tagged. In the embodiment of FIG. 3, the DTLB 141 of FIG. 1 is a second-level TLB, and the processor 100 includes no first-level TLB. The L1 data cache 103 includes a tag array 332, a data array 336, a hashed tag array 334, a multiplexer 342, a comparator 344, a multiplexer 346, and tag hash logic 312. The LSU 117 generates a virtual load/store address VA[63:0] and provides to the L1 data cache 103 a portion thereof VA[63:6] 321 used to specify a line of memory that may be stored in the L1 data cache 103. The virtual address 321 includes a tag 322 portion (e.g., bits [63:14]) and a set index 326 portion (e.g., bits [13:6]). The L1 data cache 103 also includes an allocate way input 308 for allocating an entry into the L1 data cache 103. The L1 data cache 103 also includes a data in input 325 for writing data into the L1 data cache 103, e.g., during a store commit operation and during a cache line allocation.

The L1 data cache 103 also includes a hit output 352, early miss prediction 328, and a data out output 227. The tag array 332 and data array 336 are random access memory arrays. In the embodiment of FIG. 3, the L1 data cache 103 is arranged as a 4-way set associative cache; hence, the tag array 332 and data array 336 are arranged as 4-way set associative memory arrays. However, other embodiments are contemplated in which the associativity has a different number of ways than four, including direct-mapped and fully associative embodiments. The set index 326 selects the set of entries on each allocation or access, e.g., load/store operation.

In the embodiment of FIG. 3, each entry of the L1 data cache 103 is structured as the entry 201 of FIG. 2, having cache line data 202, a tag 204, a status 206, a hashed tag 208, and a dPAP 209. The data array 336 holds the cache line data 202 associated with each of the entries 201 of the L1 data cache 103. The tag array 332 holds the tag 204 associated with each of the entries 201 of the L1 data cache 103. The hashed tag array 334, also referred to as a hashed address directory 334, holds the hashed tag 208 and dPAP 209 associated with each of the entries 201 of the L1 data cache 103. In one embodiment, the status 206 of each entry is also stored in the tag array 332, whereas in another embodiment the L1 data cache 103 includes a separate memory array for storing the status 206 of the entries. Although in the embodiment of FIG. 3 the data array 336 and tag array 332 are separate, other embodiments are contemplated in which the data and tag (and status) reside in the same memory array.

The tag hash logic 312 hashes the tag 322 portion of the virtual load/store address 321 to generate the hashed tag 324. That is, the tag 322 is an input to a hash function performed by tag hash logic 312 that outputs the hashed tag 324. The hash function performs a logical and/or arithmetic operation on its input bits to generate output bits. For example, in one embodiment, the hash function is a logical exclusive-OR on at least a portion of the tag 322 bits. The number of output bits of the hash function is the size of the hashed tag 324 and the hashed tag field 208 of the data cache entry 201. The hashed tag 324 is provided as an input to the hashed tag array 334 for writing into the hashed tag 208 of the selected entry 201 of the hashed tag array 334, e.g., during an allocation. Similarly, a dPAP 323 obtained from the L2 cache 107 during an allocation (as described with respect to FIG. 7) are written into the dPAP 209 of the selected entry 201 of the hashed tag array 334 during an allocation. The set index 326 selects the set of entries of the hashed tag array 334. In the case of an allocation, the hashed tag 324 and dPAP 323 are written into the hashed tag 208 and dPAP 209 of the entry 201 of the way selected by an allocate way input 308 of the selected set. In the case of an access, comparator 348 compares the hashed tag 324 with each of the hashed tags 208 of the selected set. If there is a valid match, the early miss signal 328 is false and the way select 341 indicates the matching way; otherwise, the early miss signal 328 is true. The dPAP 323 stored in the dPAP field 202 of the L1 entry 201 is used to process a snoop request to attain cache coherency, as described in more detail with respect to FIGS. 6 through 12.

Because the hashed tag 324 and the hashed tags 208 are small (e.g., 16 bits as an illustrative example) relative to the tag 322 and tags 204 (e.g., 54 bits as an illustrative example), the comparison performed by comparator 348 may be faster than the comparison performed by comparator 344 (described more below), for example. Therefore, the way select 341 may be signaled by an earlier stage in the L1 data cache 103 pipeline than an embodiment that relies on a comparison of the tags 204 of the tag array 332 to generate a way select. This may be advantageous because it may shorten the time to data out 227.

Additionally, the early miss prediction 328 may be signaled by an earlier stage than the stage that signals the hit indicator 352. This may be advantageous because it may enable a cache line fill requestor (not shown) to generate a cache line fill request to fill a missing cache line earlier than an embodiment that would rely on a comparison of the tags 204 in the tag array 332 to detect a miss. Thus, the hashed tag array 334 may enable a high performance, high frequency design of the processor 100.

It is noted that due to the nature of the hashed tag 324, if the early miss indicator 328 indicates a false value, i.e., indicates a hit, the hit indication may be incorrect, i.e., the hit indicator 352 may subsequently indicate a false value, i.e., a miss. Thus, the early miss indicator 328 is a prediction, not necessarily a correct miss indicator. This is because differing tag 322 values may hash to the same value. However, if the early miss indicator 328 indicates a true value, i.e., indicates a miss, the miss indication is correct, i.e., the hit indicator 352 will also indicate a miss, i.e., will indicate a false value. This is because if two hash results are not equal (assuming they were hashed using the same hash algorithm), then they could not have been generated from equal inputs, i.e., matching inputs.

The tag 322 is provided as an input to the tag array 332 for writing into the tag 204 field of the selected entry of the tag array 332, e.g., during an allocation. The set index 326 selects the set of entries of the tag array 332. In the case of an allocation, the tag 322 is written into the tag 204 of the entry of the way selected by the allocate way input 308 of the selected set. In the case of an access (e.g., a load/store operation), the mux 342 selects the tag 204 of the way selected by the early way select 341, and the comparator 344 compares the tag 322 with the tag 204 of the selected set. If there is a valid match, the hit signal 352 is true; otherwise, the hit signal 352 is false. In one embodiment, the cache line fill requestor advantageously uses the early miss prediction 328 provided by the hashed tag array 334 in order to generate a fill request as soon as possible, rather than waiting for the hit signal 352. However, in embodiments of the LSU 117 that employ the L1 data cache 103 of FIG. 3, the cache line fill requestor is also configured to examine both the early miss prediction 328 and the hit indicator 352, detect an instance in which the early miss prediction 328 predicted a false hit, and generate a fill request accordingly.

The data array 336 receives the data in input 325 for writing into the cache line data 202 field of the selected entry of the data array 336, e.g., during a cache line allocation or a store commit operation. The set index 326 selects the set of entries of the data array 336. In the case of an allocation, the way of the selected set is selected by the allocate way input 308, and in the case of a memory access operation (e.g., load/store operation) the way is selected by the way select signal 341. In the case of a read operation (e.g., load operation), the mux 346 receives the cache line data 202 of all four ways and selects one of the ways based on the way select signal 341, and the cache line data 202 selected by the mux 346 is provided on the data out output 227.

Figures 4, 5:
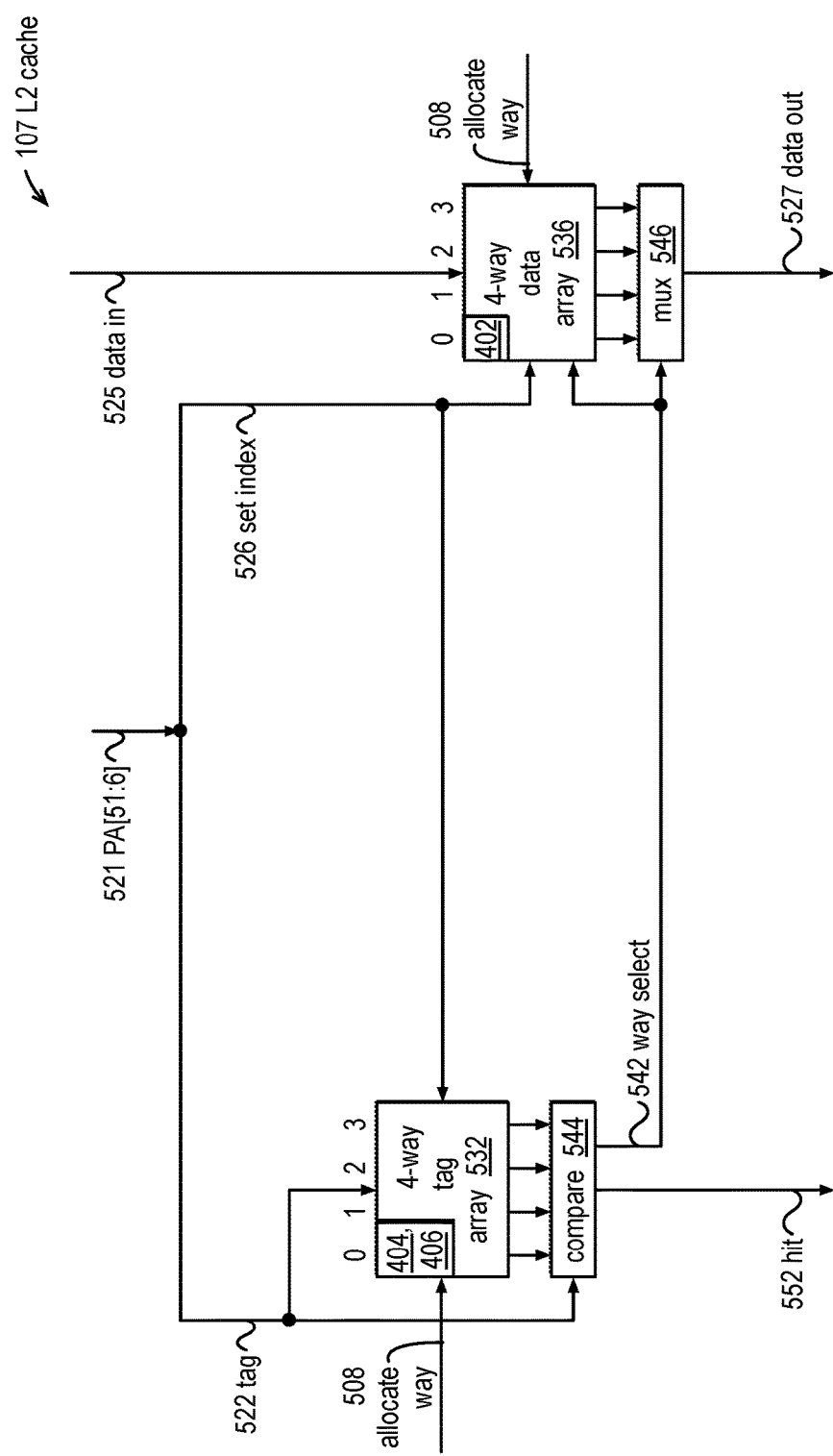
FIG. 4 is an example block diagram of a cache entry of the L2 cache of FIG. 1 that employs PAPs to accomplish cache coherence in accordance with embodiments of the present disclosure.
FIG. 5 is an example block diagram illustrating the L2 cache of FIG. 1 that employs PAPs to accomplish cache coherence in accordance with embodiments of the present disclosure.

FIG. 4 is an example block diagram of a cache entry 401 of L2 cache 107 of FIG. 1 that employs PAPs to accomplish cache coherence in accordance with embodiments of the present disclosure. The L2 cache entry 401 is used in the physically-indexed physically-tagged L2 cache 107 embodiment of FIG. 5 described in more detail below. That is, the tag field 404 holds a physical address tag, rather than a virtual address tag. Also, the cache entry 401 of FIG. 4 does not include a hashed tag field 208 nor a dPAP field 209 as in FIG. 2. Otherwise, the cache entry 401 of FIG. 4 is similar in many respects to the cache entry 201 of FIG. 2, e.g., the status field 406 is similar to the status field 206 of FIG. 2.

FIG. 5 is an example block diagram illustrating the L2 cache 107 of FIG. 1 that employs PAPs to accomplish cache coherence in accordance with embodiments of the present disclosure. The DTLB 141 of FIG. 1 receives the virtual load/store address 321 of FIG. 2 and provides to the L2 cache 107 a physical memory line address PA[51:6] 521 that is the translation of the virtual load/store address 321. More specifically, physical memory line address 521 bits PA[51:12] are translated from the virtual load/store address 321 bits [63:12]. The physical memory line address 521 comprises a tag 522 portion and a set index 526 portion. In some respects, the L2 cache 107 of FIG. 5 is similar and operates similarly to the L1 data cache 103 of FIG. 3 in that it analogously includes a tag array 532, a data array 536, a comparator 544, a multiplexer 546, an allocate way input 508 for allocating an entry into the L2 cache 107, and a data in input 525 for writing data into the L2 cache 107. However, the L2 cache 107 does not analogously include the tag hash logic 312, hashed tag array 334, comparator 348, nor multiplexer 342 of FIG. 3. The L2 cache 107 is physically-indexed and physically-tagged. That is, tag 522 is the tag portion (e.g., bits [51:17]) of the physical memory line address 521, and the set index 526 is the index portion (e.g., bits [16:6]) of the physical memory line address 521. Finally, the comparator 544 compares the tag 522 with the tag 404 of all ways of the selected set. If there is a valid match, the hit signal 552 is true and a way select signal 542, which indicates the matching way, is provided to mux 546; otherwise, the hit signal 552 is false. As described herein, a cache line of memory associated with a physical memory line address can only reside in one entry 401 of the L2 cache 107, and a PAP points to the one entry 401 of the L2 cache 107 that holds the copy of the cache line associated with the physical memory line address for the which the PAP is a proxy.

FIG. 6 is an example block diagram of a cache subsystem 600 that employs PAPs to accomplish cache coherence in accordance with embodiments of the present disclosure. The cache subsystem 600 includes the L2 cache 107 of FIG. 5 that includes entries 401 of FIG. 4 and the L1 data cache 103 of FIG. 3 that includes entries 201 of FIG. 2. The cache subsystem 600 has an inclusive allocation policy such that each cache line of memory allocated into the L1 data cache 103 is also allocated into the L2 cache 107, and when the L2 cache 107 evicts the cache line, the L2 cache 107 also causes the L1 data cache 103 to evict the cache line. Because the L2 cache 107 is a physically-indexed physically-tagged cache, a cache line of memory may reside only in a single entry of the L2 cache 107. As described herein, each valid L1 entry 201 of the L1 data cache 103 includes a field, referred to as the dPAP 209 of FIG. 2. The dPAP 209, along with relevant bits of the L1 set index used to select the set of the L1 data cache 103 that includes the L1 entry 201, points to the entry 401 of the L2 cache 107 that holds a copy of the cache line of memory allocated into the L1 entry 201. The dPAP 209 along with the relevant bits of the L1 set index are referred to herein as the physical address proxy (PAP) 699 of FIG. 6, which may be considered a forward pointer to the L2 cache 107 that holds a copy of the cache line of memory allocated into the L1 entry 201. The PAP 699 is used to accomplish cache coherency in a more efficient manner, both in terms of timing and storage space, than using a full physical memory line address to accomplish cache coherency, as described herein. The inclusive allocation policy is further described with respect to FIG. 7.

In the embodiment of FIG. 6, the L2 cache 107 is a 512 KB 4-way set associative cache memory whose entries each store a 64-byte cache line. Thus, the L2 cache 107 includes an 11-bit L2 set index 602 that receives physical address bits PA[16:6] to select one of 2048 sets. However, other embodiments are contemplated in which the L2 cache 107 has a different cache line size, different set associativity, and different size. In the embodiment of FIG. 6, the L1 data cache 103 is a 64 KB 4-way set associative cache memory whose entries each store a 64-byte cache line. Thus, the L1 data cache 103 includes an 8-bit L1 set index 612 to select one of 256 sets. However, other embodiments are contemplated in which the L1 data cache 103 has a different cache line size, different set associativity, and different size. In the embodiment of FIG. 6, the lower six bits [5:0] of the L1 set index 612 receive physical address bits PA[11:6]. The upper two bits [7:6] are described in more detail below. In particular, in the example of FIG. 6, the lower six bits [5:0] of the L1 set index 612 correspond to untranslated virtual address bits VA[11:6] that are mathematically equivalent to untranslated physical address bits PA[11:6] which correspond to the lower six bits [5:0] of the L2 set index 602.

FIG. 6 illustrates aspects of processing of a snoop request 601 by the cache subsystem 600, which is also described in FIG. 8, to ensure cache coherency between the L2 cache 107, L1 data cache 103 and other caches of a system that includes the core 100 of FIG. 1, such as a multi-processor or multi-core system. The snoop request 601 specifies a physical memory line address PA[51:6], of which PA[16:6] correspond to the L2 set index 602 to select a set of the L2 cache 107. Comparators 604 compare a tag portion 603 of the snoop request 601 against the four tags 605 of the selected set. The tag portion 603 corresponds to physical address bits PA[51:17]. Each of the four tags 605 is tag 404 of FIG. 4, which is the physical address bits PA[51:17] stored during an allocation into the L2 cache 107. If there is a tag match of a valid entry 401, the hit entry 401 is indicated on an L2way number 606, which is preferably a two-bit value encoded to indicate one of four ways, which is provided to snoop forwarding logic 607. The snoop forwarding logic 607 forwards the snoop request 601 to the L1 data cache 103 as forwarded snoop request 611.

The forwarded snoop request 611 is similar to the snoop request 601 except that the physical memory line address PA[51:6] is replaced with the PAP 699. The PAP 699 points to the snoop request 601 hit entry 401 in the L2 cache 107. That is, the PAP 699 is the physical address bits PA[16:6] that select the set of the L2 cache 107 that contains the hit entry 401 combined with the L2way number 606 of the hit entry 401. The PAP 699 is significantly fewer bits than the physical memory line address PA[51:6], which may provide significant advantages such as improved timing and reduced storage requirements, as described in more detail below. In the embodiment of FIG. 6, the PAP 699 is thirteen bits, whereas the physical memory line address is 46 bits, for a saving of 33 bits per entry of the L1 data cache 103, although other embodiments are contemplated in which the different bit savings are enjoyed.

In the embodiment of FIG. 6, the untranslated address bits PA[11:6] are used as the lower six bits [5:0] of the L1 set index 612. During a snoop request, the upper two bits [7:6] of the L1 set index 612 are generated by the L1 data cache 103. More specifically, for the upper two bits [7:6] of the L1 set index 612, the L1 data cache 103 generates all four possible combinations of the two bits. Thus, four sets of the L1 data cache 103 are selected in the embodiment of FIG. 6. The upper two bits [7:6] of the L1 set index 612 for processing of the forwarded snoop request 611 correspond to virtual address bits VA[13:12] of a load/store address during an allocation or lookup operation. Comparators 614 compare a dPAP 613 portion of the PAP 699 of the forwarded snoop request 611 against the dPAPs 209 of each entry 201 of each way of each of the four selected sets of the L1 data cache 103. In the embodiment of FIG. 6, sixteen dPAPs 209 are compared. The dPAP 613 portion of the PAP 699 is physical address bits PA[16:12] used to select the set of the L2 cache 107 that contains the hit entry 401 combined with the L2way number 606 of the hit entry 401. The sixteen dPAPs 209 are the dPAPs 209 of the sixteen selected entries 201. If there is a dPAP match of one or more valid entries 201, the hit entries 201 are indicated on an L1 hit indicator 616, received by control logic 617, that specifies each way of each set having a hit entry 201. Because the L1 data cache 103 is a virtually-indexed virtually-tagged cache, it may be holding multiple copies of the cache line being snooped and may therefore detect multiple snoop hits. In one embodiment, the L1 hit indicator 616 comprises a 16-bit vector. The control logic 617 uses the L1 hit indicator 616 to reply to the L2 cache 107, e.g., to indicate a miss or to perform an invalidation of each hit entry 201, as well as a write back of any modified cache lines to memory.

In one embodiment, the multiple sets (e.g., four sets in the embodiment of FIG. 6) are selected in a time sequential fashion as are the tag comparisons performed by the comparators 614. For example, rather than having four set index inputs 612 as shown in FIG. 6, the L1 data cache 103 may have a single set index input 612, and each of the four L1 set index values corresponding to the four different possible values of the two VA[13:12] bits are used to access the L1 data cache 103 in a sequential fashion, e.g., over four different clock cycles, e.g., in a pipelined fashion. Such an embodiment may have the advantage of less complex hardware in exchange for potentially reduced performance.

The smaller PAP (i.e., smaller than the physical memory line address PA[51:6]), as well as even smaller dPAPs, may improve timing because the comparisons that need to be performed (e.g., by comparators 614) are considerably smaller than conventional comparisons. To illustrate, assume a conventional processor whose first-level data cache stores and compares physical address tags, e.g., approximately forty bits. In contrast, the comparisons of dPAPs may be much smaller, e.g., seven bits in the embodiment of FIG. 6. Thus, the comparisons made by the comparators 614 of the embodiment of FIG. 6 may be approximately an order of magnitude smaller and therefore much faster than a conventional processor, which may improve the cycle time for a processor that compares dPAPs rather than full physical addresses. Second, there may be a significant area savings due to less logic, e.g., smaller comparators, and less storage elements, e.g., seven bits to store a dPAP in an L1 cache entry 201 rather than a large physical address tag. Still further, the much smaller dPAP comparisons may be sufficiently faster and smaller to make feasible an embodiment in which the comparisons of the ways of multiple selected sets are performed in parallel (e.g., sixteen parallel comparisons in the embodiment of FIG. 6). Finally, the smaller PAPs may further improve timing and area savings in other portions of the core 100 in which PAPs may be used in place of physical memory line addresses for other purposes, such as in entries of the load/store queue 125 for making decisions whether to perform a speculative store-to-load forward operation and for performing store-to-load forwarding violation checking at load/store commit time, or in entries of the write combine buffer 109 to determine whether store data of multiple store operations may be combined in an entry of the write combine buffer 109.

FIG. 7 is an example flowchart illustrating operation of the cache subsystem 600 of FIG. 6 to process a miss in the L1 data cache 103 in furtherance of an inclusive cache policy in accordance with embodiments of the present disclosure. Operation begins at block 702.

At block 702, a virtual address (e.g., VA 321 of FIG. 2 of a load/store operation) misses in the L1 data cache 103. In response, the cache subsystem 600 generates a cache line fill request to the L2 cache 107. The fill request specifies a physical address that is a translation of the missing virtual address obtained from the DTLB 141 of FIG. 1, which obtains the physical address from the TWE 145 of FIG. 1 if the physical address is missing in the DTLB 141. Operation proceeds to block 704.

At block 704, the L2 cache 107 looks up the physical address to obtain the requested cache line that has been allocated into the L2 cache 107. (If the physical address is missing, the L2 cache 107 fetches the cache line at the physical address from memory (or from another cache memory higher in the cache hierarchy) and allocates the physical address into an entry 401 of the L2 cache 107.) The L2 cache 107 then returns a copy of the cache line to the L1 data cache 103 as well as the dPAP (e.g., dPAP 323 of FIG. 3) of the entry 401 of the L2 cache 107 into which the cache line is allocated. The L1 data cache 103 writes the returned cache line and dPAP into the respective cache line data 202 and dPAP 209 of FIG. 2 of the allocated entry 201. Operation proceeds to block 706.

At block 706, at some time later, when the L2 cache 107 subsequently evicts its copy of the cache line (e.g., in response to a snoop request or when the L2 cache 107 decides to replace the entry 401 and allocate it to a different physical address), the L2 cache 107 also causes the L1 data cache 103 to evict its copy of the cache line. Thus, in the manner of FIG. 7, the L2 cache 107 is inclusive of the L1 data cache 103. Stated alternatively, as long as the cache line remains in the L1 data cache 103, the L2 cache 107 also keeps its copy of the cache line.

FIG. 8 is an example flowchart illustrating operation of the cache subsystem 600 of FIG. 6 to process a snoop request in accordance with embodiments of the present disclosure. Operation begins at block 802.

At block 802, a physically-indexed physically-tagged set associative L2 cache (e.g., L2 cache 107 of FIG. 6) that is inclusive of a lower-level data cache (e.g., L1 data cache 103 of FIG. 6) receives a snoop request (e.g., snoop request 601) that specifies a physical memory line address. Operation proceeds to block 804.

At block 804, the L2 cache 107 determines whether the physical memory line address hits in any of its entries 401. If so, operation proceeds to block 806; otherwise, operation proceeds to block 805 at which the L2 cache 107 does not forward the snoop request to the L1 data cache 103.

At block 806, the snoop request is forwarded to the L1 data cache 103, e.g., as a forwarded snoop request (e.g., forwarded snoop request 611). The forwarded snoop request replaces the physical memory line address of the original snoop request (e.g., PA[51:6] of FIG. 6) with the PAP (e.g., PAP 699 of FIG. 6) of the entry 401 of the L2 cache 107 that was hit, i.e., the way number (e.g., L2way 606 of FIG. 6) and the set index (e.g., L2 set index 602 of FIG. 6) that together point to the hit entry 401 of the L2 cache 107. Operation proceeds to block 808.

At block 808, the L1 data cache 103 uses N bits of the PAP (e.g., N=6 untranslated address bits such as PA[11:6] of FIG. 6) as lower set index bits to select one or more (S) sets of the L1 data cache 103. As described above with respect to FIG. 6, for the upper bits of the set index (e.g., two upper bits in FIG. 6), the L1 data cache 103 generates all possible combinations of the upper bits. The upper bits correspond to translated virtual address bits that are used to allocate into the L1 data cache 103, e.g., during a load/store operation (e.g., VA [13:12] 321 of FIG. 3). The L1 data cache 103 also uses the remaining bits of the PAP (i.e., not used in the L1 set index), which is the dPAP 613 portion of the PAP 699 of FIG. 6, to compare against the dPAPs 209 stored in each valid entry 201 of the selected sets to determine whether any snoop hits occurred in the L1 data cache 103 in response to the forwarded snoop request (e.g., as indicated on L1 hit indicator 616 of FIG. 6). To process the forwarded snoop request, the L1 data cache 103 also performs an invalidation of each hit entry 201 as well as a write back of any modified cache lines to memory.

FIG. 9 is an example block diagram of a cache subsystem 900 that employs PAPs to accomplish cache coherence in accordance with embodiments of the present disclosure. The cache subsystem 900 of FIG. 9 is similar in many respects to the cache subsystem 600 of FIG. 6. However, in the cache subsystem 900 of FIG. 9, to process the forwarded snoop request 611, a single set of the L1 data cache 103 is selected rather than multiple sets. More specifically, the L1 data cache 103 uses untranslated bits (e.g., PA[11:6]) of the PAP 699 of the forwarded snoop request 611 that correspond to all bits of the L1 set index 912 to select a single set; the dPAP 613 is then used by comparators 614 to compare with the dPAPs 209 stored in each of the four ways of the single selected set to determine whether any snoop hits occurred in entries 201 of the L1 data cache 103 in response to the forwarded snoop request as indicated on L1 hit indicator 916, as described in block 1008 of FIG. 10 in which operation flows to block 1008 from block 806 of FIG. 8 (rather than to block 808). In one embodiment, the L1 hit indicator 616 comprises a 4-bit vector. The embodiment of FIG. 9 may be employed when the L1 data cache 103 is sufficiently small and its cache lines size and set associative arrangement are such that the number of set index bits 912 are less than or equal to the number of untranslated address bits (excluding the cache line offset bits) such that corresponding bits of the L1 and L2 set indices correspond to untranslated address bits of the L1 data cache 103 virtual address 321 and the L2 cache 107 physical memory line address 521 such that a single set of the L1 data cache 103 may be selected to process a snoop request. For example, in the embodiment of FIG. 9, the L1 data cache 103 is a 16 KB cache memory having 4 ways that each store a 64-byte cache line; therefore, the L1 data cache 103 has 64 sets requiring a set index 912 of 6 bits that correspond to untranslated virtual address bits VA[11:6] that are mathematically equivalent to untranslated physical address bits PA[11:6] that correspond to the lower 6 bits of the L2 set index 602.

FIG. 11 is an example block diagram of a cache subsystem 1100 that employs PAPs to accomplish cache coherence in accordance with embodiments of the present disclosure. The cache subsystem 1100 of FIG. 11 is similar in many respects to the cache subsystem 600 of FIG. 6. However, in the cache subsystem 1100 of FIG. 11, all bits of the PAP 699 are used as the dPAP 1113 for processing snoop requests. More specifically, the dPAP 209 stored in an allocated entry of the L1 data cache 103 (e.g., at block 704 of FIG. 7) is the full PAP, no bits of the PAP 699 are used in the L1 set index 1112 to select sets to process a forwarded snoop request 611, and all bits of the PAP 699 provided by the forwarded snoop request 611, i.e., the dPAP 1113, are used by comparators 614 to compare with the dPAP 209 stored in the entries 201 of the L1 data cache 103. That is, in the embodiment of FIG. 11, the dPAP and the PAP are equivalent. Furthermore, in the embodiment of FIG. 11, all bits of the PAP stored in the dPAP field 209 of FIG. 2 of all sets of the L1 data cache 103 are compared by comparators 614 with the dPAP 1113, which is the PAP 699 of the forwarded snoop request 611, and the L1 hit indicator 1116 specifies the hit entries 201, as described in block 1208 of FIG. 12 in which operation flows to block 1208 from block 806 of FIG. 8 (rather than to block 808). In one embodiment, the L1 hit indicator 1116 comprises a 1024-bit vector.

The embodiment of FIG. 11 may be employed when the address bits that correspond to the set index 326 used to access the L1 data cache 103 during an allocation operation (e.g., load/store operation) are not mathematically equivalent to the address bits that correspond to the set index 526 used to access the L2 cache 107. For example, the address bits that correspond to the set index 326 used to access the L1 data cache 103 during an allocation operation may be virtual address bits and/or a hash of virtual address bits or other bits such as a translation context of the load/store operation.

The embodiments described herein may enjoy the following advantages. First, the use of PAPs may improve timing because the comparisons that need to be performed are considerably smaller than conventional comparisons. To illustrate, assume a conventional processor that compares physical memory line address tags, e.g., on the order of forty bits. In contrast, the comparisons of PAPs or diminutive PAPs may be much smaller, e.g., single-digit number of bits. Thus, the comparisons may be much smaller and therefore much faster, which may improve the cycle time for a processor that compares PAPs or diminutive PAPs rather than physical cache line address tags. Second, there may be a significant area savings due to less logic, e.g., smaller comparators, and less storage elements, e.g., fewer bits to store a PAP or diminutive PAP rather than a physical memory line address in a cache entry, load/store queue entry, write combine buffer, etc.

Store-to-Load Forwarding Using PAPs

Embodiments are now described in which PAPs are used to make determinations related to store-to-load forwarding. Store-to-load forwarding refers to an operation performed by processors to increase performance and generally may be described as follows. Typically, when a load instruction is executed, the load unit looks up the load address in the cache, and if a hit occurs the cache data is provided to the load instruction. However, there may be an outstanding store instruction that is older than the load instruction and that has not yet written the store data to the cache for the same memory address as the load address. In this situation, if the cache data is provided to the load instruction it would be stale data. That is, the load instruction would be receiving the wrong data. One solution to solving this problem is to wait to execute the load instruction until all older store instructions have written their data to the cache. However, a higher performance solution is to hold the store data of outstanding store instructions (i.e., that have not yet written their store data into the cache) in a separate structure, typically referred to as a store queue. During execution of the load instruction the store queue is checked to see if the load data requested by the load instruction is present in the store queue. If so, the store data in the store queue is "forwarded" to the load instruction rather than the stale cache data.

Load and store instructions specify virtual load and store addresses. If forwarding is performed without comparing physical load and store addresses, i.e., forwarding based solely on virtual address comparisons, the forwarded store data may not be the correct requested load data since two different virtual addresses may be aliases of the same physical address. However, there are reasons to avoid comparing physical addresses for store-to-load forwarding purposes. First, the physical addresses are large and would require a significant amount of additional storage space per entry of the store queue. Second, timing is critical in high performance processors, and the logic to compare a large physical address is relatively slow. Historically, high performance processors speculatively perform store-to-load forwarding based on virtual address comparisons and use much fewer than the entire virtual addresses for fast comparisons, e.g., using only untranslated address bits of the virtual addresses. These high performance processors then perform checks later, either late in the execution pipeline or when the load instruction is ready to retire, to determine whether the incorrect data was forwarded to it. Third, even if the store physical addresses were held in the store queue, the load physical address is typically not available early in the load unit pipeline for use in comparing with the store physical addresses in the store queue thus resulting in a longer execution time of the load instruction, more specifically resulting in a longer load-to-use latency of the processor, which is highly undesirable with respect to processor performance.

FIG. 13 is an example block diagram of a store queue (SQ) entry 1301 of the SQ 125 of FIG. 1 that holds PAPs to accomplish store-to-load forwarding in accordance with embodiments of the present disclosure. The SQ entry 1301 includes store data 1302, a store PAP 1304, lower physical address bits PA[5:3] 1306, a byte mask 1308, and a valid bit 1309. The valid bit 1309 is true if the SQ entry 1301 is valid, i.e., the SQ entry 1301 has been allocated to a store instruction and its fields are populated with valid information associated with the store instruction. The store data 1302 is the data that is specified by the store instruction in be stored to memory. The store data is obtained from the register file 105 specified by the store instruction. The population of the SQ entry 1301 is described in more detail below with respect to FIG. 15.

The store PAP 1304 is a physical address proxy for a store physical line address to which the store data 1302 is to be written. The store instruction specifies a store virtual address. The store physical line address is a translation of a portion of the store virtual address, namely upper address bits (e.g., bits 12 and above in the case of a 4 KB page size). As described above, when a cache line is brought into the L2 cache 107 from a physical line address, e.g., by a load or store instruction, the upper address bits of the load/store virtual address specified by the load/store instruction are translated into a load/store physical line address, e.g., by the MMU 147 of FIG. 1. The cache line is brought into, i.e., allocated into, an entry of the L2 cache 107, which has a unique set index and way number, as described above.

The store PAP 1304 specifies the set index and the way number of the entry in the L2 cache 107 into which the cache line was allocated, i.e., the cache line specified by the physical line address of the load/store instruction that brought the cache line into the L2 cache 107, which physical line address corresponds to the store physical line address that is a translation of the upper bits of the store virtual address. The lower bits of the store virtual address (e.g., bits [11:0] in the case of a 4 KB page size) are untranslated address bits, i.e., the untranslated bits of the virtual and physical addresses are identical, as described above. The store physical address bits PA[5:3] 1306 correspond to the untranslated address bits [5:3] of the store virtual address. The store instruction also specifies a size of the store data to be written. In the example embodiment, the largest size of store data (and load data) is eight bytes. Hence, in the embodiment of FIG. 13, the size of the store data 1302 is up to eight bytes, and the store physical address bits PA[5:3] 1306 narrows down the location of the store data 1302 within a 64-byte cache line, for example. The store size and bits [2:0] of the store address may be used to generate the store byte mask 1308 that specifies, or encodes, which of the eight bytes are being written by the store instruction. Other embodiments are contemplated in which the bytes written by the store instruction are specified in a different manner, e.g., the size itself and bits [2:0] of the store address may be held in the SQ entry 1301 rather than the byte mask 1308.

Advantageously, each entry of the SQ 125 holds the store PAP 1304 rather than the full store physical line address, as described in more detail below. In the embodiment of FIG. 13, because in the example embodiment the L2 cache 107 is 4-way set associative, the store PAP 1304 specifies the 2 bits of the way number of the entry in the L2 cache 107 into which the cache line specified by the physical line address is allocated. Furthermore, in the embodiment of FIG. 13, because in the example embodiment the L2 cache 107 has 2048 sets, the store PAP 1304 specifies the eleven bits of the set index of the set of the entry in the L2 cache 107 into which the cache line specified by the physical line address is allocated, which corresponds to physical line address bits PA[16:6] in the embodiment. Thus, in the embodiment of FIG. 13, the store PAP 1304 is thirteen bits, in contrast to a full store physical line address, which may be approximately forty-six bits in some implementations, as described above, and in other implementations there may be more. Advantageously, a significant savings may be enjoyed both in terms of storage space within the SQ 125 and in terms of timing by providing the ability to compare PAPs rather than full physical line addresses when making store-to-load forwarding determinations, as described in more detail below.

FIG. 14 is an example block diagram of portions of the processor 100 of FIG. 1 used to perform store-to-load forwarding using PAPs in accordance with embodiments of the present disclosure. In the embodiment of FIG. 14, shown are the SQ 125, portions of the L1 data cache 103 (hashed tag array 334, tag hash logic 312, and comparator 348 (and mux, not shown, that is controlled based on the result of the comparator 348), e.g., of FIG. 3), byte mask logic 1491, a mux 1446, and forwarding decision logic 1499. The byte mask logic 1491, mux 1446, and forwarding decision logic 1499 may be considered part of the LSU 117 of FIG. 1. FIG. 14 illustrates the processing of a load instruction to which store data may be forwarded from an entry of the SQ 125. The load instruction specifies a load virtual address VA[63:0] 321 (e.g., of FIG. 3) and a load size 1489. The byte mask logic 1491 uses the load VA 321 and load size 1489 to generate a load byte mask 1493 that specifies the eight or less bytes of load data to be read from within an eight-byte aligned memory address range. The load byte mask 1493 is provided to the forwarding decision logic 1499. The load virtual address bits VA[5:3], which are untranslated and identical to the load physical address bits PA[5:3], are also provided to the forwarding decision logic 1499. The load virtual address bits VA[11:6], which are untranslated and identical to the load physical address bits PA[11:6], are also provided to the forwarding decision logic 1499.

As described above, the set index 326 portion of the load VA 321 selects a set of the hashed tag array 334, each way of the selected set is provided to comparator 348, and the tag hash logic 312 uses the load VA 321 to generate a hashed tag 324 provided to comparator 348 for comparison with each of the selected hashed tags 208 (of FIG. 2). Assuming a valid match, the comparator 348 provides the dPAP 209 (of FIG. 2) of the valid matching entry 201 of the L1 data cache 103, as described above. The dPAP 209 in conjunction with the load PA[11:6] bits form a load PAP 1495. In the embodiment of FIG. 13, the load PAP 1495 specifies the set index and the way number of the entry in the L2 cache 107 into which the cache line was allocated, i.e., the cache line specified by the physical line address of the load/store instruction that brought the cache line into the L2 cache 107, which physical line address corresponds to the load physical line address that is a translation of the upper bits of the load VA 321. The load PAP 1495 is provided to the forwarding decision logic 1499. If there is no valid match, then there is no load PAP available for comparison with the store PAP 1304 and therefore no store-to-load forwarding may be performed, and there is no valid L1 data out 327; hence, a cache line fill request is generated, and the load instruction is replayed when the requested cache line and dPAP are returned by the L2 cache 107 and written into the L1 data cache 103.

The SQ 125 provides a selected SQ entry 1399. The selected SQ entry 1399 may be selected in different manners according to different embodiments, e.g., according to the embodiments of FIGS. 18 and 19. The store data 1302 of the selected SQ entry 1399 is provided to mux 1446, which also receives the output data of the hitting entry of the L1 data cache 103, i.e., L1 data out 327, e.g., of FIG. 3. In the case of a hit in the L1 data cache 103, a control signal forward 1497 generated by the forwarding decision logic 1499 controls mux 1446 to select either the store data 1302 from the selected SQ entry 1399 or the L1 data out 327. The store PAP 1304, store PA[5:3] bits 1306, store byte mask 1308 and store valid bit 1309 of the selected SQ entry 1399 are provided to the forwarding decision logic 1499.

The forwarding decision logic 1499 determines whether the store data 1302 of the selected SQ entry 1399 overlaps the load data requested by the load instruction. More specifically, the SQ entry selection and forwarding decision logic 1499 generates a true value on the forward signal 1497 to control the mux 1446 to select the store data 1302 if the store valid bit 1309 is true, the load PAP 1495 matches the store PAP 1304, the load PA[5:3] matches the store PA[5:3] 1306, and the load byte mask 1493 and the store byte mask 1308 indicate the store data overlaps the requested load data, i.e., the requested load data is included in the valid bytes of the store data 1302 of the selected SQ entry 1399; otherwise, the forwarding decision logic 1499 generates a false value on the forward signal 1497 to control the mux 1446 to select the L1 data out 327. Stated alternatively, the store data overlaps the requested load data and may be forwarded if the following conditions are met: (1) the selected SQ entry 1399 is valid; (2) the load physical address and the store physical address specify the same N-byte-aligned quantum of memory, where N is the width of the store data field 1302 in a SQ entry 1301 (e.g., N=8 bytes wide), e.g., the load PAP 1495 matches the store PAP 1304 and the load PA[5:3] matches the store PA[5:3] 1306; and (3) the valid bytes of the store data 1302 of the selected SQ entry 1399 as indicated by the store byte mask 1308 overlap the load data bytes requested by the load instruction as indicated by the load byte mask 1493. To illustrate by example, assuming a valid selected SQ entry 1399, a PAP match and a PA[5:3]

match, assume the store byte mask 1308 is a binary value 00111100 and the load byte mask 1493 is a binary value 00110000; then the store data overlaps the requested load data and the store data will be forwarded. However, assume the load byte mask 1493 is a binary value 00000011; then the store data does not overlap the requested load data and the store data will be forwarded, and instead the L1 data out 327 will be selected. An example of logic that may perform the byte mask comparison is logic that performs a Boolean AND of the load and store byte masks and then indicates overlap if the Boolean result equals the load byte mask. Other embodiments are contemplated in which the entry 201 of the L1 data cache 103 also holds other information such as permissions associated with the specified memory location so that the forwarding decision logic 1499 may also determine whether it is permissible to forward the store data to the load instruction. Although an embodiment is described in which the width of the store queue data field 1302 equals the largest possible size specified by a store instruction, other embodiments are contemplated in which the width of the store queue data field 1302 is greater than the largest possible size specified by a store instruction.

Advantageously, the forwarding decision logic 1499 may compare load PAP 1495 against the store PAP 1304 since they are proxies for the respective load physical line address and store physical line address, which alleviates the need for the forwarding decision logic 1499 to compare the load physical line address and store physical line address themselves. Comparing the PAPs may result in a significantly faster determination (reflected in the value of the forward control signal 1497) of whether to forward the store data 1302 and may even improve the load-to-use latency of the processor 100. Additionally, each SQ entry 1301 holds the store PAP 1304 rather than the store physical line address, and each L1 data cache 103 entry 201 holds the load PAP 1495 (or at least a portion of it, i.e., the dPAP 209) rather than the load physical line address, which may result in a significant savings in terms of storage space in the processor 100. Finally, unlike conventional approaches that, for example, make forwarding decisions based merely on partial address comparisons (e.g., of untranslated address bits and/ or virtual address bits), the embodiments described herein effectively make a full physical address comparison using the PAPs.

Further advantageously, the provision of the load PAP by the virtually-indexed virtually-tagged L1 data cache 103 may result in a faster determination of whether to forward the store data because the load PAP is available for comparison with the store PAP sooner than in a physically-accessed cache design in which the virtual load address is first looked up in a translation lookaside buffer. Still further, using the hashed tag array 334 to hold and provide the PAP for the load instruction may result in the load PAP being available for comparison with the store PAP sooner than if a full tag comparison is performed, again which may result in a faster determination of whether to forward the store data. Finally, a faster determination of whether to forward the store data may be obtained because the SQ 125 provides a single selected SQ entry 1399 which enables the load PAP to be compared against a single store PAP rather than having to perform a comparison of the load PAP with multiple store PAPs. These various speedups in the store forwarding determination may, either separately or in combination, improve the load-to-use latency of the processor 100, which is an important parameter for processor performance.

FIG. 15 is an example flowchart illustrating processing of a store instruction, e.g., by the processor 100 of FIG. 14, that includes writing a store PAP into a store queue entry in accordance with embodiments of the present disclosure. As described above, the L2 cache 107 is inclusive of the L1 data cache 103 such that when a cache line is brought into an entry of the L1 data cache 103, the cache line is also brought into an entry of the L2 cache 107 (unless the cache line already resides in the L2 cache 107). As described above, e.g., with respect to FIG. 7, when the cache line is brought into the entry 401 of the L2 cache 107, the dPAP 209 used to specify the allocated L2 entry 401 is written into the entry 201 allocated into the L1 data cache 103. As described above, the dPAP 209 is the PAP that specifies the L2 entry 401 less any bits of the L2 set index of the PAP used in the set index of the L1 data cache 103. Stated alternatively, the dPAP is the L2 way number of the L2 entry 401 along with any bits of the L2 set index of the entry 401 not used in the set index of the L1 data cache 103. Operation begins at block 1502.

At block 1502, the decode unit 112 of FIG. 1 encounters a store instruction and allocates a SQ entry 1301 for the store instruction and dispatches the store instruction to the instruction schedulers 121 of FIG. 1. The store instruction specifies a register of the register file 105 of FIG. 1 that holds the store data to be written to memory. The store instruction also specifies a store virtual address, e.g., store VA 321 of FIG. 3 (the store VA 321 may include all 64 bits, i.e., including bits [5:0], even though FIG. 3 only indicates bits [63:6]) and a size of the data, e.g., one, two, four, or eight bytes. Operation proceeds to block 1504.

At block 1504, the LSU 117 executes the store instruction. The store virtual address 321 hits in the L1 data cache 103, at least eventually. If the store virtual address 321 initially misses in the L1 data cache 103 (e.g., at block 702 of FIG. 7), a cache line fill request will be generated to the L2 cache 107, which involves the DTLB 141 translating the store virtual address 321 into a store physical address. A portion of the store physical address is the store physical line address, e.g., store PA[51:6] that is used in the lookup of the L2 cache 107 to obtain the requested cache line and, if missing in the L2 cache 107 (and missing in any other higher levels of the cache hierarchy, if present), used to access memory to obtain the cache line. The L2 cache 107 returns the cache line and the PAP that is a proxy for the store physical line address. More specifically, the PAP specifies the way number and set index that identifies the entry 401 of the L2 cache 107 that is inclusively holding the requested cache line. The dPAP portion of the PAP is written along with the cache line to the entry of the L1 data cache 103 allocated to the store instruction (e.g., at block 704 of FIG. 7). The store instruction is replayed when the requested cache line and dPAP are returned by the L2 cache 107 and written into the L1 data cache 103. Upon replay, the store virtual address 321 hits in the L1 data cache 103. The hitting entry 201 of the L1 data cache 103 provides the store dPAP 209 that is used along with untranslated bits of the store virtual address 321 (e.g., VA[11:6], which are identical to store physical address bits PA[11:6]) to form a store PAP that is a physical address proxy of the store physical line address, i.e., the store PAP points to the entry 401 of the L2 cache 107 that holds the copy of the cache line held in the entry 201 of the L1 data cache 103 hit by the store virtual address 321. The store physical line address is the upper bits (e.g., [51:6]) of the store physical address. Operation proceeds to block 1506.

At block 1506, the LSU 117 obtains the store data from the register file 105 and writes it into the store data field 1302 of the SQ entry 1301 allocated at block 1502. The LSU 117 also forms the store PAP using the store dPAP 209 obtained from the L1 data cache 103 at block 1504 and lower untranslated address bits of the store virtual address 321 (e.g., store VA[11:6]). The LSU 117 then writes the store PAP into the store PAP field 1304 of the allocated SQ entry 1301. Finally, the LSU 117 writes into the allocated SQ entry 1301 additional information that determines the store physical address and store data size, which in the embodiment of FIGS. 13 and 14 includes writing store address bits [5:3] into the PA[5:3] field 1306 and writing a store byte mask into the byte mask field 1308. The store byte mask indicates which bytes within an eight-byte-aligned quantum of memory the store data are to be written in an embodiment in which the store byte mask if eight bits. As described above, the SQ entry 1301 is configured to hold the store PAP 1304 rather than the full store physical line address, which advantageously may reduce the amount of storage needed in the SQ 125.

FIG. 16 is an example flowchart illustrating processing of a load instruction, e.g., by the processor 100 of FIG. 14, that includes using a load PAP and a store PAP from a store queue entry to decide whether to forward store data to the load instruction from the store queue entry in accordance with embodiments of the present disclosure. Operation begins at block 1602.

At block 1602, a load instruction is issued to the LSU (e.g., 117). The LSU looks up the load virtual address (e.g., 321) in the L1 data cache (e.g., 103). In the embodiment of FIG. 14 (and FIGS. 18 and 19), the lookup includes looking up the load virtual address in the hashed tag array (e.g., 334). In the embodiment of FIG. 20, the lookup includes looking up the load virtual address in the tag array. Similar to the manner described above with respect to block 1504, the load virtual address eventually hits in the L1 data cache. The hit entry (e.g., 201) provides the dPAP (e.g., 209) for the load instruction. The load dPAP along with untranslated bits of the load virtual address (e.g., VA[11:6], which are identical to the load physical address PA[11:6]) are used to form the load PAP (e.g., 1495), e.g., as shown in FIG. 14. Additionally, a load byte mask (e.g., 1493 of FIG. 14) is generated (e.g., by byte mask logic 1491 of FIG. 14) from the load data size (e.g., 1489 of FIG. 14) and the lowest address bits (e.g., VA[2:0], which are identical to the load physical address PA[2:0]), e.g., as shown in FIG. 14. Operation proceeds to block 1604.

At block 1604, the SQ 125 provides a selected SQ entry (e.g., 1399), which includes the store data (e.g., 1302), store PAP (e.g., 1304), store lower physical address bits (e.g., PA[5:3]), store byte mask (e.g., 1308), and store valid bit (e.g., 1309), e.g., as shown in FIG. 14. As described with respect to FIG. 14, the SQ entry may be selected in different manners according to different embodiments, e.g., according to the embodiments of FIGS. 18 and 19. Operation proceeds to block 1606.

At block 1606, the store PAP and load PAP are used (e.g., by forwarding logic 1499 of FIG. 14)—along with additional information, e.g., the store lower address bits 1306 and load lower address bits (e.g., PA[5:3]) and store byte mask 1308 and load byte mask 1493 of FIG. 14—to determine whether to forward the store data (e.g., 1302) from the selected SQ entry to the load instruction or whether instead the cache data (e.g., L1 data out 327) is provided to the load instruction. That is, the store PAP and load PAP and the additional information are used to determine whether the store data of the selected SQ entry overlaps the load data requested by the load instruction. If the store data of the selected SQ entry overlaps the requested load data, then the store data is forwarded; otherwise, the data out of the L1 data cache is provided for the load instruction. Embodiments described herein use the load and store PAPs as proxies for the load and store physical line addresses to determine that the load and store have the same physical line address, which is required for the store data to overlap the requested load data. In contrast, conventional designs may forego a full physical line address comparison because of timing delays (e.g., instead making forwarding decisions based merely on partial address comparisons, e.g., of untranslated address bits and/or virtual address bits), whereas the embodiments described herein effectively make a full physical address comparison using the PAPs, but at a smaller timing cost because of the smaller PAP comparisons.

Figures 17, 18:
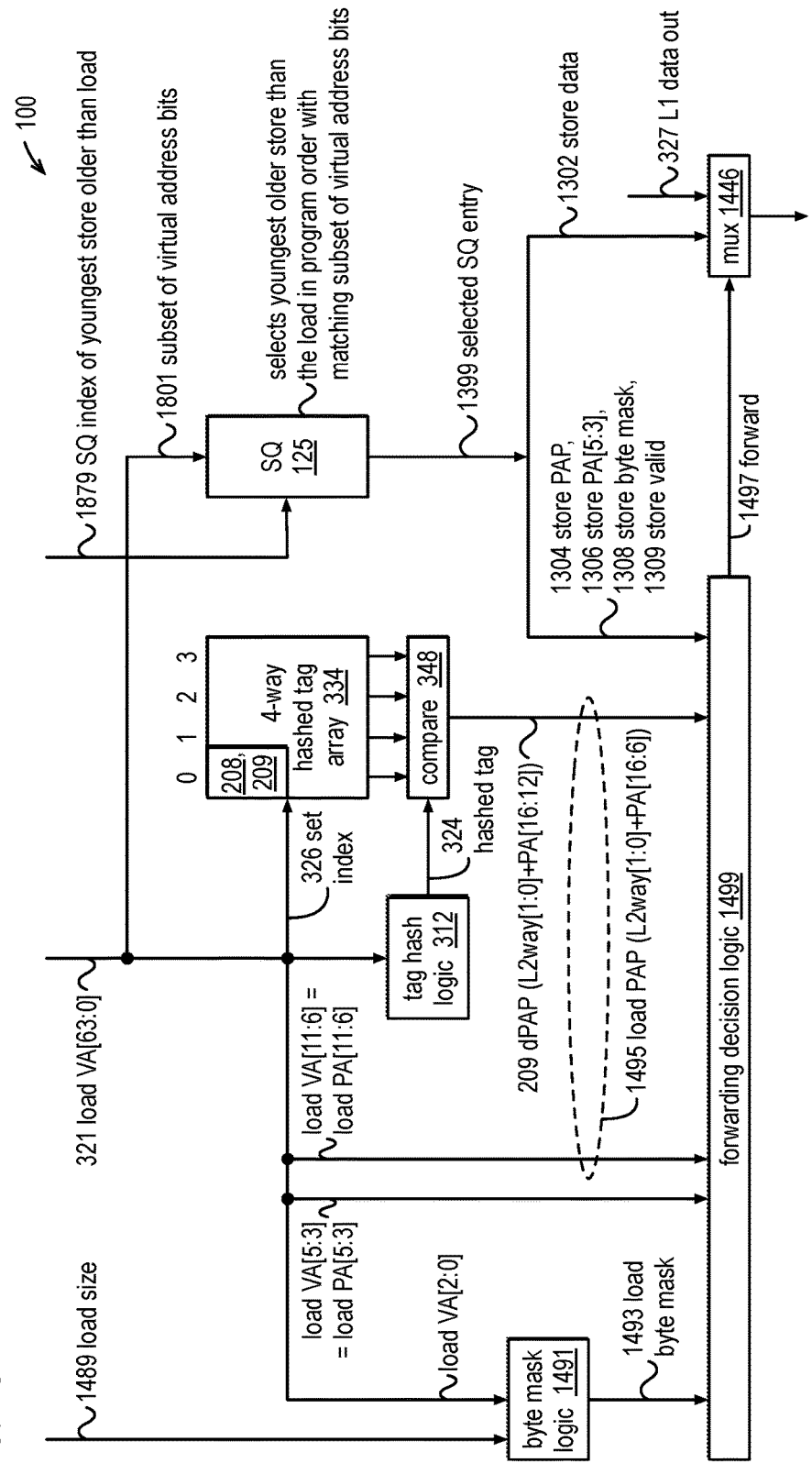
FIG. 17 is an example block diagram of a store queue entry of the store queue (SQ) of FIG. 1 that holds PAPs to accomplish store-to-load forwarding in accordance with embodiments of the present disclosure.
FIG. 18 is an example block diagram of portions of the processor of FIG. 1 used to perform store-to-load forwarding using PAPs in accordance with embodiments of the present disclosure.

FIG. 17 is an example block diagram of a SQ entry 1701 of the SQ 125 of FIG. 1 that holds PAPs to accomplish store-to-load forwarding in accordance with embodiments of the present disclosure. The SQ entry 1701 of FIG. 17 is similar in many respects to the SQ entry 1301 of FIG. 13. However, the SQ entry 1701 of FIG. 17 further includes a subset of virtual address bits 1711. In the embodiment of FIG. 18, the subset of virtual address bits 1711 is written, along with the other information of the SQ entry 1701 according to the operation of FIG. 15. That is, during execution of the store instruction the LSU 117 writes a corresponding subset of bits of the store virtual address 321 to the subset of virtual address bits field 1711 of the allocated SQ entry 1701, e.g., at block 1506, for subsequent use as described below with respect to FIG. 18.

FIG. 18 is an example block diagram of portions of the processor 100 of FIG. 1 used to perform store-to-load forwarding using PAPs in accordance with embodiments of the present disclosure. The embodiment of FIG. 18 is similar in many respects to the embodiment of FIG. 14, except that each entry 1701 of the SQ 125 also includes the subset of virtual address bits 1711 of FIG. 17. Additionally, in the embodiment of FIG. 18, the selected SQ entry 1399 (described with respect to FIG. 14) is selected using a subset of virtual address bits 1801 of the load virtual address 321, as shown. That is, the subset of the load virtual address bits 1801 are compared with the subset of virtual address bits 1711 of each valid entry of the SQ 125 for matches. If no matches are found, then no store-to-load forwarding is performed. The SQ 125 receives an indicator that indicates which entries 1701 of the SQ 125 are associated with store instructions that are older than the load instruction. Using the indicator, if one or more matches are found that are older in program order than the load instruction, logic within the SQ 125 selects the selected SQ entry 1399 the youngest in program order from among the older matching SQ entries 1701. In one embodiment, the decode unit 112, which dispatches instructions—including all load and store instructions—to the execution units 114 in program order, generates and provides to the SQ 125, as the indicator, a SQ index 1879 for each load instruction which is the index into the SQ 125 of the SQ entry 1701 associated with the youngest store instruction that is older in program order than the load instruction. In an alternate embodiment, the index of the store instruction within the ROB 122 is held in each entry 1701 of the SQ 125, and the index of the load instruction within the ROB 122 (rather than the SQ index 1879) is provided to the SQ 125, as the indicator, for use, in conjunction with the ROB indices of the SQ entries 1701, in selecting the SQ entry 1701 associated with the matching youngest store instruction older in program order than the load instruction, i.e., selected SQ entry 1399. The SQ 125 provides the selected SQ entry 1399 to the forwarding decision logic 1499 and to the mux 1446, e.g., according to block 1604 of FIG. 16. That is, FIG. 18 describes an embodiment for selecting the selected SQ entry 1399, i.e., using virtual address bits and the indicator, and otherwise operation proceeds according to the manner described with respect to FIGS. 14 and 16, advantageously that the load and store PAPs, rather than full load and store physical line addresses, are used to determine whether the store data of the selected SQ entry 1399 overlaps the requested load data and may thus be forwarded. In an alternate embodiment, the load byte mask 1493 is provided to the SQ 125 (rather than to the forwarding decision logic 1499), and the logic within the SQ 125 compares the load byte mask 1493 against the store byte mask 1308 of each valid SQ entry 1701 to determine whether there is overlap of the requested load data by the store data 1302 of SQ entries 1701 whose subsets of virtual address bits 1711 match the load subset of virtual address bits 1801. That is, the logic within the SQ 125 additionally uses the byte mask compares to select the selected SQ entry 1399. In one embodiment, the subset of virtual address bits 1711 may be a hash of bits of the store virtual address 321 of the store instruction to which the SQ entry 1701 is allocated, and the subset of load virtual address bits 1801 used to compare with each valid entry 1701 of the SQ 125 may be a hash of bits of the load virtual address 321.

Figure 19:
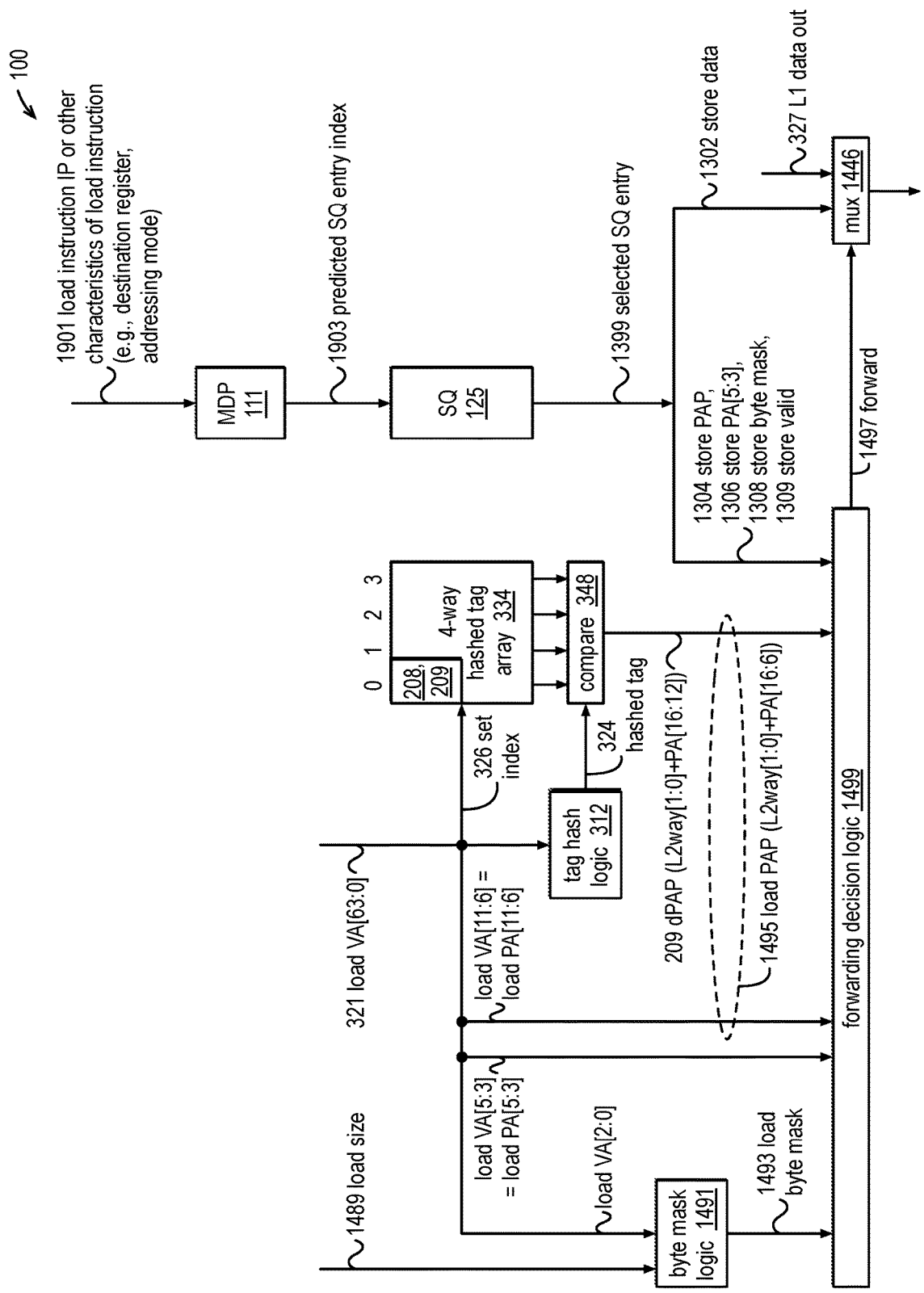
FIG. 19 is an example block diagram of portions of the processor of FIG. 1 used to perform store-to-load forwarding using PAPs in accordance with embodiments of the present disclosure.
Figure 20:
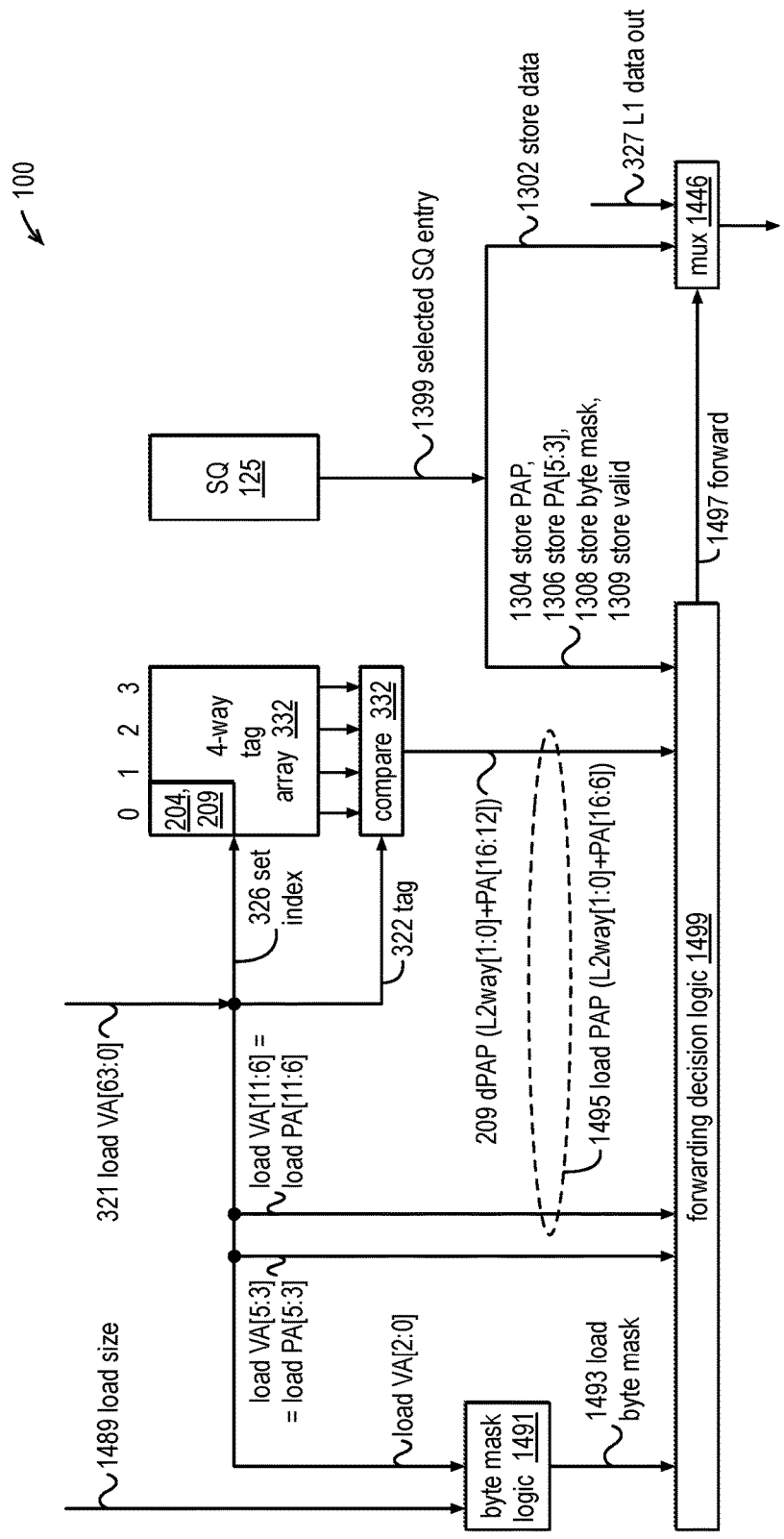
FIG. 20 is an example block diagram of portions of the processor of FIG. 1 used to perform store-to-load forwarding using PAPs in accordance with embodiments of the present disclosure.

FIG. 19 is an example block diagram of portions of the processor 100 of FIG. 1 used to perform store-to-load forwarding using PAPs in accordance with embodiments of the present disclosure. The embodiment of FIG. 19 is similar in many respects to the embodiment of FIG. 14, except that the embodiment of FIG. 19 uses the memory dependence predictor (MDP) 111 of FIG. 1 to provide a prediction of a store instruction from which to forward store data to the load instruction. In one embodiment, the MDP 111 receives an instruction pointer (IP) 1901 value of the load instruction, i.e., the address in memory from which the load instruction is fetched. In another embodiment, the MDP 111 receives information specifying other characteristics 1901 of the load instruction, such as a destination register of the store instruction or an addressing mode of the store instruction, i.e., a characteristic of the store instruction that may be used to distinguish the store instruction from other store instructions. The MDP 111 uses the received load instruction-specific information 1901 to generate a prediction of the store instruction from which store data should be forwarded to the load instruction. In the embodiment of FIG. 19, the prediction may be an index 1903 into the SQ 125 of the entry 1301 allocated to the predicted store instruction. The predicted SQ entry index 1903 is provided to the SQ 125 to select the selected SQ entry 1399. The SQ 125 provides the selected SQ entry 1399 to the forwarding decision logic 1499 and to the mux 1446, e.g., according to block 1604 of FIG. 16. That is, FIG. 19 describes an embodiment for selecting the selected SQ entry 1399, i.e., using the MDP 111, and otherwise operation proceeds according to the manner described with respect to FIGS. 14 and 16, advantageously that the load and store PAPs, rather than full load and store physical line addresses, are used to determine whether the store data of the selected SQ entry 1399 overlaps the requested load data and may thus be forwarded.

FIG. 20 is an example block diagram of portions of the processor 100 of FIG. 1 used to perform store-to-load forwarding using PAPs in accordance with embodiments of the present disclosure. The embodiment of FIG. 20 is similar in many respects to the embodiment of FIG. 14. However, the embodiment is absent in a hashed tag array 334. Instead, in the embodiment of FIG. 20, the tag array 332 holds the dPAPs 209, and the tag 322 of the load VA 321 is compared with each of the selected tags 204 (of FIG. 2) to determine which dPAP 209 to provide for formation into the load PAP 1495. Otherwise, operation proceeds according to the manner described with respect to FIGS. 14 and 16, advantageously that the load and store PAPs, rather than full load and store physical line addresses, are used to determine whether the store data of the selected SQ entry 1399 overlaps the requested load data and may thus be forwarded.

Figure 21:
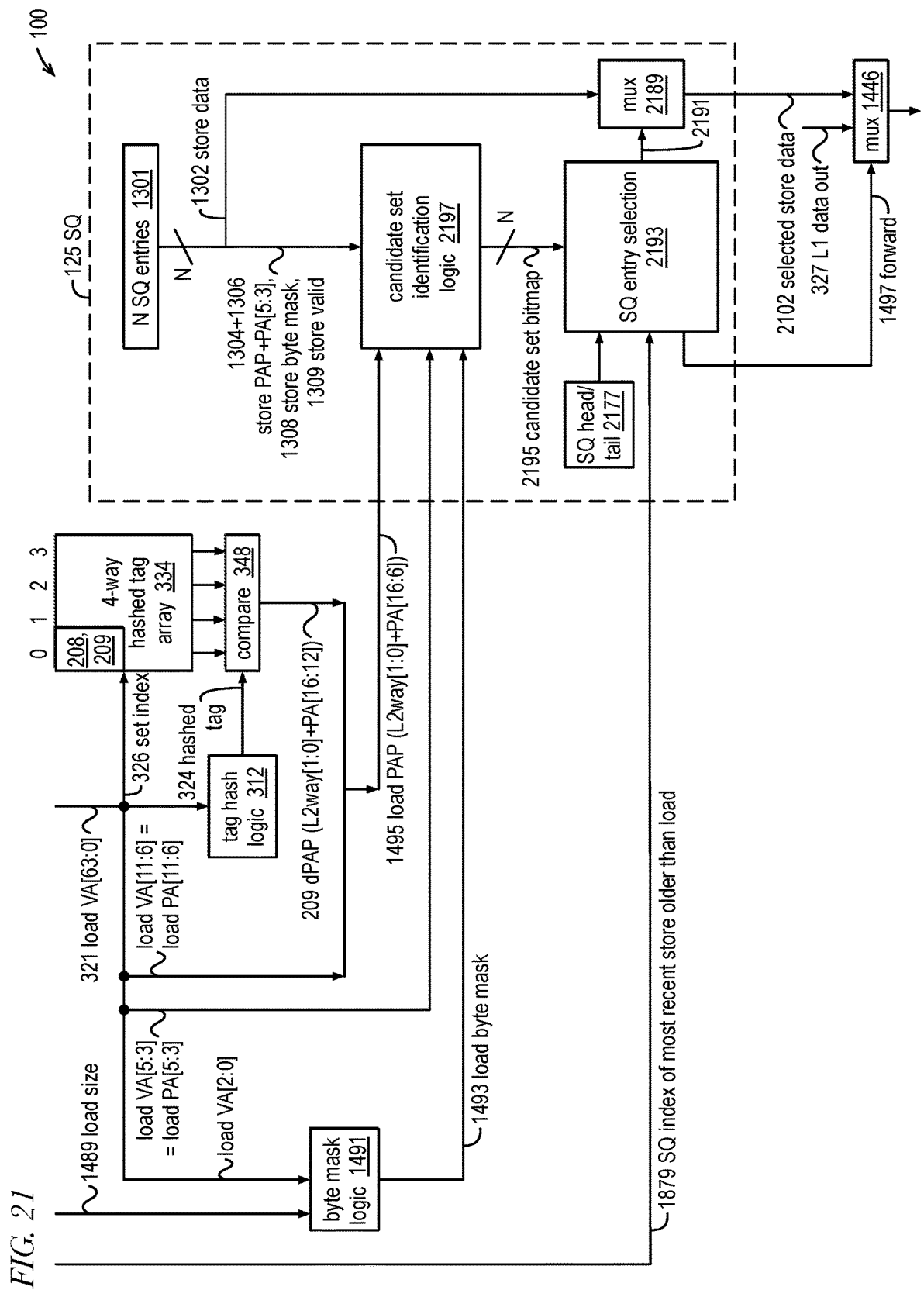
FIG. 21 is an example block diagram of portions of the processor of FIG. 1 used to perform store-to-load forwarding using PAPs in accordance with embodiments of the present disclosure.

FIG. 21 is an example block diagram of portions of the processor 100 of FIG. 1 used to perform store-to-load forwarding using PAPs in accordance with embodiments of the present disclosure. The embodiment of FIG. 21 is similar in many respects to the embodiment of FIG. 14, except that rather than using the load PAP to compare with a store PAP of a single selected SQ entry 1399 to determine whether the store data of the single selected SQ entry 1399 overlaps with the requested load data as in FIGS. 14 through 20, instead the load PAP is used to compare with the store PAP of all valid entries 1301 of the SQ 125 to select a SQ entry 1301 from which to forward store data to the load instruction.

The embodiment of FIG. 21 includes similar elements to FIG. 14 and additionally includes a SQ head/tail 2177 (i.e., the head and tail pointers that identify the set of valid SQ entries 1301), candidate set identification logic 2197, SQ entry selection logic 2193, and a mux 2189. The storage that stores all the SQ entries 1301 is also shown, the number of entries 1301 being denoted N in FIG. 21. The mux 2189 receives the store data 1302 of all N of the SQ entries 1301 and selects the store data indicated by a control signal 2191 generated by the SQ entry selection logic 2193 as described in more detail below. The candidate set identification logic 2197 receives all N SQ entries 1301 of the SQ 125. The candidate set identification logic 2197 also receives the load PAP 1495, the load lower address bits PA[5:3], and the load byte mask 1493. The candidate set identification logic 2197 compares the load PAP 1495 and load lower address bits PA[5:3] and load byte mask 1493 with the respective store PAP 1304 and store lower address bits PA[5:3] 1306 and store byte mask 1308 of each of the N entries 1301 of the SQ 125 to generate a candidate set bit vector 2195. The candidate set bit vector 2195 includes a bit for each of the N SQ entries 1301. A bit of the bit vector 2195 associated with a SQ entry 1301 is true if its store PAP 1304 and store lower address bits PA[5:3] 1306 match the load PAP 1495 and load lower address bits PA[5:3] and the store byte mask 1308 overlaps the load byte mask 1493.

The SQ entry selection logic 2193 receives the candidate set bit vector 2195, head and tail pointers 2177 of the SQ 125, and the SQ index of the most recent store older than the load 1879. Using the head and tail pointers 2177 of the SQ 125 and the SQ index of the most recent store older than the load 1879, the SQ entry selection logic 2193 selects, and specifies on mux 2189 control signal 2191, the SQ entry 1301 associated with the youngest store instruction in program order from among the SQ entries 1301 whose associated bit of the candidate set bit vector 2195 is true that is older in program order than the load instruction, if such a SQ entry 1301 exists. If such a SQ entry 1301 exists, the SQ entry selection logic 2193 generates the forward control signal 1497 to select the selected store data 2102 out of the mux 1446; otherwise, the mux 1446 selects the L1 data out 327.

In an alternate embodiment, the index of the load instruction within the ROB 122 (rather than the SQ index 1879) is provided, similar to the description with respect to FIG. 18, for use by the SQ entry selection logic 2193 in generating the mux 2189 control signal 2191 to select the store data 1302 from the SQ entry 1301 associated with the youngest store instruction older in program order than the load instruction from among the SQ entries 1301 whose associated bit of the candidate set bit vector 2195 is true.

Figure 22:
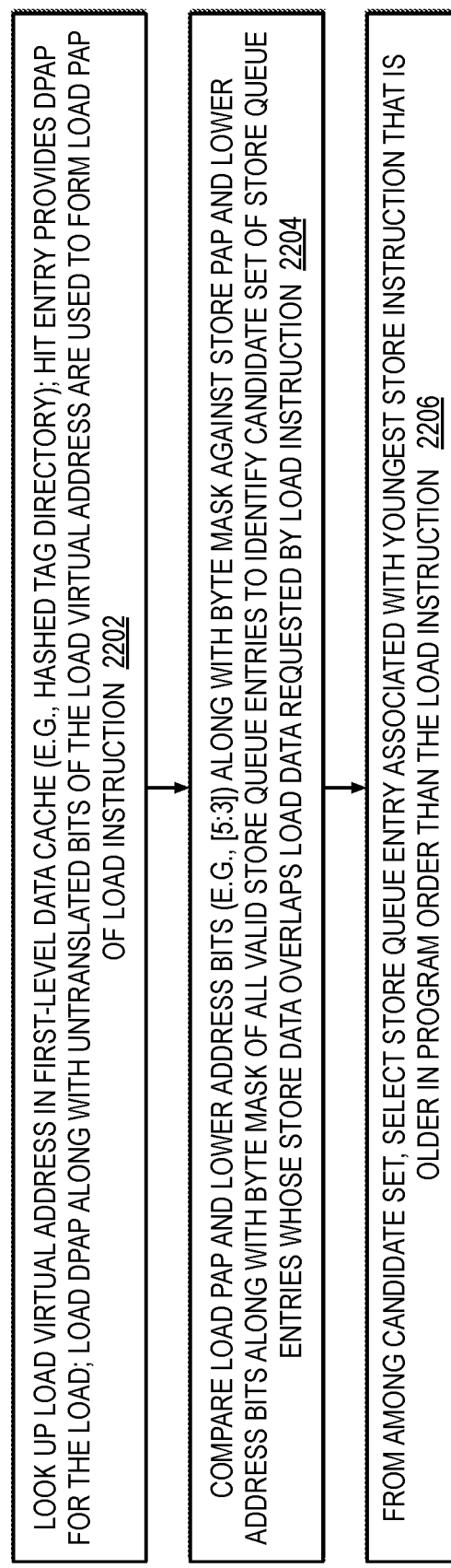
FIG. 22 is an example flowchart illustrating processing of a load instruction by the processor of FIG. 21 that includes using a load PAP and a store PAP of each entry of the store queue to decide whether to forward store data to the load instruction from a store queue entry in accordance with embodiments of the present disclosure.

FIG. 22 is an example flowchart illustrating processing of a load instruction by the processor 100 of FIG. 21 that includes using a load PAP and a store PAP of each entry of the store queue to decide whether to forward store data to the load instruction from a store queue entry in accordance with embodiments of the present disclosure. Operation begins at block 2202.

At block 2202, operation is similar to the operation described at block 1602 of FIG. 16. Operation proceeds to block 2204.

At block 2204, the load PAP (e.g., 1495) and load lower address bits (e.g., PA[5:3]) along with the load byte mask (e.g., 1493) are compared (e.g., by candidate set identification logic 2197 of FIG. 21) with the store PAP (e.g., 1304) and store lower physical address bits (e.g., PA[5:3]) along with the store byte mask (e.g., 1308) of each valid SQ entry (e.g., 1301) to identify a candidate set of SQ entries whose store data (e.g., 1302) overlaps the load data requested by the load instruction (e.g., indicated by candidate set bit vector 2195). Operation proceeds to block 2206.

At block 2206, from among the set of candidate SQ entries is selected (e.g., by mux 2189 controlled by SQ entry selection logic 2193) the store data from the SQ entry associated with youngest store instruction that is older in program order than the load instruction. Assuming such a SQ entry is found, the selected store data is forwarded to the load instruction; otherwise, the cache data (e.g., L1 data out 327) is provided to the load instruction. That is, the store PAP and load PAP and additional information (e.g., load and store lower address bits [5:3] and byte masks) are used to determine whether the store data of any of the SQ entries overlaps the load data requested by the load instruction. If the store data of the store instruction associated with one or more SQ entries overlaps the requested load data, and at least one of the overlapping store instructions is older than the load instruction, then the store data from the youngest of the older store instructions is forwarded; otherwise, the data out of the L1 data cache is provided for the load instruction. Embodiments described herein use the load and store PAPs as proxies for the load and store physical line addresses to determine that the load and candidate stores have the same physical line address, which is required for the store data to overlap the requested load data. In contrast, conventional designs may forego a full physical line address comparison because of timing delays (e.g., instead making forwarding decisions based merely on partial address comparisons, e.g., of untranslated address bits and/or virtual address bits), whereas the embodiments described herein effectively make a full physical address comparison using the PAPs, but at a smaller timing cost because of the smaller PAP comparisons.

Write Combining Using PAPs

One of the most precious resources in the processor is the cache memories. More specifically, the demand for access to the cache memories may often be very high. For this reason, a cache generally includes one or more wide data buses to read and write the cache, e.g., 16, 32, 64 bytes wide. However, the caches must also support the writing of small data, i.e., down to a single byte. This is because the size of the store data specified by some store instructions may be small, e.g., a single byte or two bytes, i.e., smaller than the wide busses to the cache. Furthermore, a program may perform a burst of small store instructions that specify addresses that are substantially sequential in nature. If each of these small store data is written individually to the cache, each tying up the entire wide cache bus even though only a single byte is being written on the bus, then the bus resources may be used inefficiently and congestion may occur at the cache, which may have a significant negative performance impact.

To alleviate the congestion and to improve the efficiency of the cache and of the processor, a technique commonly referred to as write-combining is often employed in high performance processors. Rather than writing each of the small store data to the cache individually, the store data are first written into a buffer before being written from the buffer to the cache. The processor looks for opportunities to combine the individual small store data into a larger block of data within the buffer that can be written from the buffer to the cache, thereby more efficiently using the wide cache bus and reducing congestion at the cache by reducing the number of writes to it. More specifically, the processor looks at the store addresses of the individual store data to determine whether the store addresses are in close enough proximity to be combined into an entry of the buffer. For example, assume a data block in an entry in the buffer is sixteen bytes wide and is expected to be aligned on a 16-byte boundary. Then individual store instructions whose store addresses and store data sizes are such that their store data falls within the same 16-byte aligned block, i.e., 16-byte aligned memory range, may be combined into a given buffer entry.

More specifically, the store addresses that must be examined to determine whether they can be combined must be physical addresses because the combined blocks within the buffer are ultimately written to physical memory addresses. As described above, physical addresses can be very large, and comparison of physical addresses may be relatively time consuming and cause an increase in the processor cycle time, which may be undesirable. Additionally, in the case of a processor having a virtually-indexed virtually-tagged first-level data cache memory, conventionally the store addresses held in the store queue are virtual addresses. Consequently, the store physical address is not conventionally available when a decision needs to be made about whether the store data may be combined with other store data in the buffer. As a result, conventionally the store virtual address may need to be translated to the store physical address in order to make the write combining decision.

Figure 23:
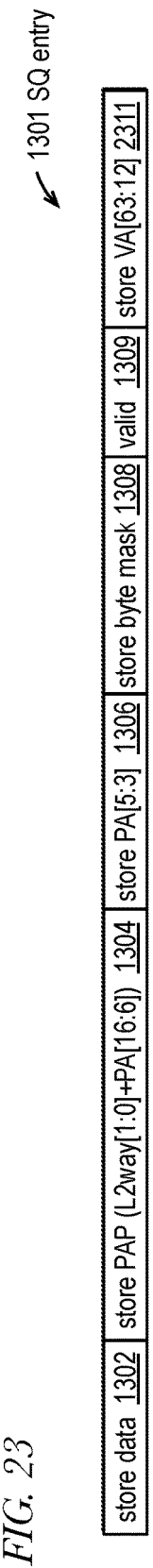
FIG. 23 is an example block diagram of a store queue entry of the store queue (SQ) of FIG. 1 that holds PAPs to accomplish write-combining in accordance with embodiments of the present disclosure.

FIG. 23 is an example block diagram of a store queue entry 1301 of the store queue (SQ) 125 of FIG. 1 that holds PAPs to accomplish write-combining in accordance with embodiments of the present disclosure. The SQ entry 1301 is similar to the SQ entry 1301 of FIG. 13; however, the SQ entry 1301 of FIG. 23 also includes a store virtual address VA[63:12] field 2311. The store VA[63:12] field 2311 is populated with store VA[63:12] 321 of FIG. 3 when the store instruction is executed by the LSU 117. The store VA[63:12] field 2311 is subsequently used when the store instruction is committed, as described in more detail below. As described above, a store instruction is ready to be committed when there are no older instructions (i.e., older in program order than the store instruction) that could cause the store instruction to be aborted and the store instruction is the oldest store instruction (i.e., store instructions are committed in order), and a store instruction is committed when the store data 1302 held in the associated SQ entry 1301 is written into the L1 data cache 103 based on the store virtual address VA[63:12], PA[11:6] of the store PAP 1304, store PA[5:3] 1306, and the store byte mask 1308 held in the SQ entry 1301. A store instruction is being committed when the LSU 117 is writing the store data 1302 to the L1 data cache 103 and to the WCB 109, as described in more detail below. In one embodiment, only load and store instructions may be committed, whereas all other types of instructions commit and retire simultaneously.

Figure 24:
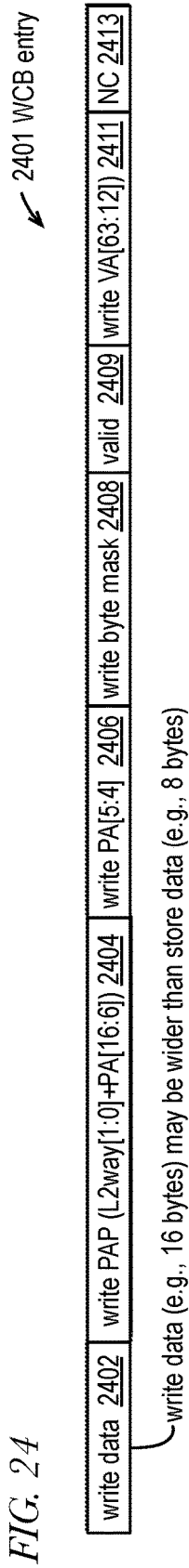
FIG. 24 is an example block diagram of a write combining buffer (WCB) entry of the WCB of FIG. 1 that holds PAPs to accomplish write combining in accordance with embodiments of the present disclosure.

FIG. 24 is an example block diagram of a write combining buffer (WCB) entry 2401 of the WCB 109 of FIG. 1 that holds PAPs to accomplish write combining in accordance with embodiments of the present disclosure. The WCB entry 2401 includes write data 2402, a write PAP 2404, lower physical address bits write PA[5:4] 2406, a write byte mask 2408, a valid bit 2409, a write VA[63:12] 2411 (virtual write address), and a non-combinable (NC) flag 2413. The population of the WCB entry 2401 is described in detail below with respect to FIGS. 25 through 28. The valid bit 2409 is true if the WCB entry 2401 is valid. A WCB entry 2401 is valid if the relevant information of one or more committed store instructions has been written to the WCB entry 2401, and the WCB entry 2401 has not yet been pushed out to the L2 cache 107. The relevant information of a store instruction written to the WCB entry 2401 is the store data 1302, store PAP 1304, store PA[5:4] 1306, store byte mask 1308 and store VA[63:12] 2311 of FIG. 23, which are written to the write data 2402, write PAP 2404, write PA[5:4] 2406, write byte mask 2408 and write VA[63:12] 2411 of the WCB entry 2401, respectively, e.g., at block 2812 of FIG. 28, and the valid bit 2409 is set to a true value. Furthermore, at block 2806 of FIG. 28, the store data 1302 is merged into the write data 2402, the store byte mask 1308 is merged into the write byte mask 2408, and none of the other fields of the WCB entry 2401 need be updated. That is, the bytes of the store data 1302 whose corresponding bit of the store byte mask 1308 is true overwrite the relevant bytes of the write data 2402 (and the other bytes of the write data 2402 are not updated), and a Boolean OR of the store byte mask 1308 is performed with the appropriate portion of the write byte mask 2408, as described below with respect to block 2806, which accomplishes correct operation because store instructions are committed in program order.

The write data 2402 is the combined store data 1302 from the committed one or more store instructions. The write data 2402 is obtained by the WCB 109 from the LSU 117 when a store instruction is committed.

The write PAP 2404 is a physical address proxy for a write physical line address to which the write data 2402 is to be written. The write physical line address is a physical address aligned to the width of a cache line. The write physical line address is the physical memory address from which a cache line was inclusively brought into the L2 cache 107 when a copy of the cache line was brought into the L1 data cache 103, e.g., during execution of a load or store instruction, as described above. The cache line is brought into, i.e., allocated into, an entry of the L2 cache 107, which has a unique set index and way number, as described above. The write PAP 2404 specifies the set index and the way number of the entry 401 in the L2 cache 107 into which the cache line was allocated, i.e., the cache line specified by the physical line address of the load/store instruction that brought the cache line into the L2 cache 107. The store PAP 1304 of each of the store instructions combined into a WCB entry 2401 is identical since, in order to be combined, the store data 1302 of each of the store instructions must be written to the same cache line of the L2 cache 107, i.e., have the same store physical line address, and the store PAP 1304 is a proxy for the store physical line address. Thus, the WCB entry 2401 is able to include a single write PAP 2404 to hold the identical store PAP 1304 of all of the combined store instructions.

Figure 25:
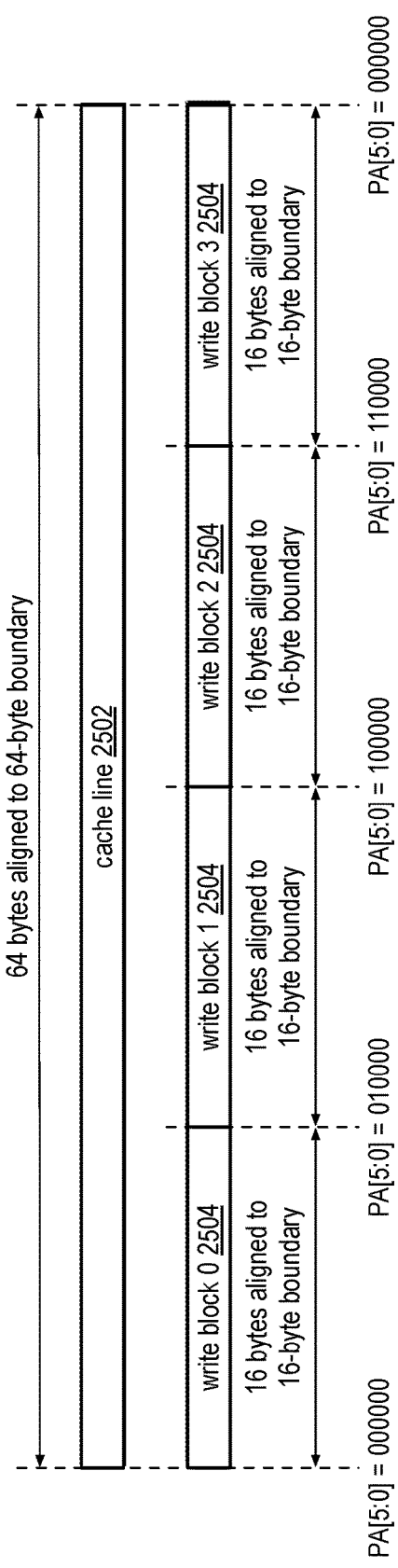
FIG. 25 is an example block diagram illustrating a relationship between a cache line and write blocks as used in performing writing combining using PAPs in accordance with one embodiment of the present disclosure.

Referring briefly to FIG. 25, an example block diagram illustrating a relationship between a cache line and write blocks as used in performing writing combining using PAPs in accordance with one embodiment of the present disclosure is shown. Shown in FIG. 25 is a cache line 2502 within which are four write blocks 2504, denoted write block 0 2504, write block 1 2504, write block 2 2504, and write block 3 2504. In the example of FIG. 25, a cache block 2502 is 64 bytes wide and is aligned on a 64-byte boundary such that bits PA[5:0] of the physical line address that specifies the cache line 2502 are all zero. In the example of FIG. 25, a write block 2504 is sixteen bytes wide and is aligned on a 16-byte boundary such that bits PA[3:0] of the physical address that specifies the write block 2504, referred to as a "physical block address," are all zero. Furthermore, bits PA[5:4] of the physical block address specify which of the four write block locations within the cache line 2502 the write block 2504 belongs. More specifically, write block 0 2504 has PA[5:4]=00, write block 1 2504 PA[5:4]=01, write block 2 2504 PA[5:4]=10, and write block 3 2504 PA[5:4]=11, as shown.

Generally, the width in bytes of the write data 2402 in a WCB entry 2401 corresponds to the width in bytes of a write block and is referred to herein as 2^W (i.e., 2 to the power W), and the width in bytes of a cache line of the L2 cache 107 is referred to herein as 2^C. In the embodiment of FIGS. 24 and 25, W is four and C is six, i.e., the width 2^W of the write data 2402 is sixteen bytes and the width 2^C of a cache line in the L2 cache 107 is 64 bytes, although other embodiments are contemplated in which W is different than four, e.g., five or six, and C is different than six, e.g., seven or eight. However, W is less than or equal to C, and the memory address to which write data 2402 is written is 2^W-byte aligned. As may be observed, in embodiments in which W is less than C, the write data 2402 may belong in one of multiple write blocks of a cache line, as in the example of FIG. 25. More specifically, if W is four and C is six, when the write data 2402 is written through to the L2 cache 107, there are four possible 16-byte-aligned 16-byte blocks within the cache line to which the write data 2402 may be written. The possible aligned W-width blocks within the C-width cache line are referred to herein as "write blocks," and the physical address of a write block is referred to herein as a "physical block address." In the example embodiment of FIGS. 24 and 25 in which W is four and C is six, there are four possible write blocks and the combination of the write PAP 2404 and write PA[5:4] 2406 is a proxy for the write physical block address within the L2 cache 107, although other embodiments are contemplated as stated above. That is, the write block within the cache line is determined by the write PA[5:4] 2406. Because W is less than or equal to C, each store data 2402 combined into the write data 2402 of a WCB entry 2401 has the same write physical line address and belongs within the same cache line and has the same write physical block address and belongs within the same write block. In one embodiment, W is equal to C, i.e., the width of a WCB entry 2401 is the same as a cache line, in which case the write PA [5:4] bits 2406 are not needed to specify a write block within a cache line.

Referring again to FIG. 24, as described above, the write PA[5:4] 2406 is written with the store PA[5:4] 1306 of the store instruction for which the WCB entry 2401 is allocated, i.e., at block 2812. As described above, the write PA[5:4] specifies which of the four write blocks (e.g., 16-byte write blocks) within the cache line (e.g., 64-byte cache line) specified by the write PAP 2404 into which the write data 2402 is to be written. As described above, store PA[5:4] 1306 correspond to the untranslated address bits [5:4] of the store virtual address. The store PA[5:4] 1306 of each of the store instructions combined into a WCB entry 2401 is identical since, in order to be combined, the store data 1302 of each of the store instructions must be written to the same write block within the same cache line of the L2 cache 107, i.e., have the same store physical block address. Thus, the WCB entry 2401 is able to include a single write PA[5:4] 2406 to hold the identical store PA[5:4] 1304 of all of the combined store instructions.

The write byte mask 2408 indicates, or encodes, which bytes of the write data 2402 are valid. That is, the write byte mask 2408 indicates which bytes of the write data 2402 are to be written to the L2 cache 107. In the example embodiment, the size of a write block is sixteen bytes. Hence, in the embodiment of FIG. 24, the width W of the write data 2402 is sixteen bytes, the write byte mask 2408 is a 16-bit field, the width C of a cache line is 64 bytes, and the write byte mask 2408 specifies which bytes within a write block of a cache line of the L2 cache 107 the write data 2402 is to be written, and the write block of the cache line of the L2 cache 107 is specified by the write PA[5:4], as described above. As described above, the write byte mask 2408 is initially written at block 2812 of FIG. 28 with the store byte mask 1308 of the store instruction being committed, and the write byte mask 2408 may be subsequently merged at block 2806 of FIG. 28 with the store byte mask 1308 of a combining store instruction.

The NC flag 2413 is set to a true value if the WCB entry 2401 is not allowed to be combined with a store instruction. That is, a store instruction that is being committed may not be combined with a WCB entry 2401 whose NC flag 2413 is true. The NC flag 2413 may be set to true because a store instruction, or some other instruction in the program, indicates that the processor 100 may not weakly-order writes with respect to the store instruction. In other words, the processor 100 needs to enforce the order in which the store data of the store instruction is written to memory relative to the store data of preceding and/or following store instructions. More specifically, the processor 100 needs to enforce write ordering to some degree beyond merely enforcing writes in program order that are to the same physical memory address. For example, an instruction that performs an atomic read-modify-write operation may require strict write ordering, e.g., an instruction that atomically adds a value to a memory location. For another example, a fence instruction may indicate that all stores older than the fence must be written before all stores younger than the fence. For another example, the store instruction may indicate that it is to a noncacheable region of memory (in which case its store data 1302 will not be written to the L1 data cache 103 nor to the L2 cache 107) and should therefore be written in program order with respect to preceding and/or following store instructions. Weakly-ordered writes from the WCB 109 are described in more detail below with respect to FIG. 26.

If the store instruction or other program instruction indicates that the processor 100 may not weakly-order writes with respect to the store instruction, the WCB 109 allocates a WCB entry 2401 for the store instruction and sets to true the NC flag 2413 in the allocated WCB entry 2401. The WCB 109 does not attempt to combine a committed store instruction with a WCB entry 2401 whose NC flag 2413 is true. Additionally, a true value of the NC flag 2413 also operates as a fence to prevent the WCB 109 from combining a committed store instruction with any WCB entry 2401 that is older than the youngest WCB entry 2401 whose NC flag 2413 is true. Stated alternatively, the WCB 109 only combines a committed store instruction with WCB entries 2401 that are younger than the youngest WCB entry 2401 whose NC flag 2413 is true. The age of a WCB entry 2401 is described in more detail below, but generally refers to the temporal order in which a WCB entry 2401 is allocated and de-allocated, rather than to the program order of one or more store instructions written into the WCB entry 2401. In one embodiment, the NC flag 2413 may also be set to true when the entry 401 of the L2 cache 107 that is pointed to by the write PAP 2404 is filled with a new cache line, which may have a physical line address that is different from the physical line address for which the write PAP 2404 is a proxy.

Advantageously, each entry of the WCB 109 holds the write PAP 2404 rather than the full physical line address associated with the combined store instructions, as described in more detail below. In the embodiment of FIG. 24, because in the example embodiment the L2 cache 107 is 4-way set associative, the write PAP 2404 specifies the 2 bits of the way number of the entry in the L2 cache 107 into which the cache line specified by the physical line address is allocated. Furthermore, in the embodiment of FIG. 24, because in the example embodiment the L2 cache 107 has 2048 sets, the write PAP 2404 specifies the eleven bits of the set index of the set of the entry in the L2 cache 107 into which the cache line specified by the physical line address is allocated, which correspond to physical line address bits PA[16:6] in the embodiment. Thus, in the embodiment of FIG. 24, the write PAP 2404 is thirteen bits, in contrast to a full physical line address, which may be approximately forty-six bits in some implementations, as described above, and in other implementations there may be more. Advantageously, a significant savings may be enjoyed both in terms of storage space within the WCB 109 and in terms of timing by providing the ability to compare PAPs rather than full physical line addresses when making write-combining determinations, as described in more detail below.

Figure 26:
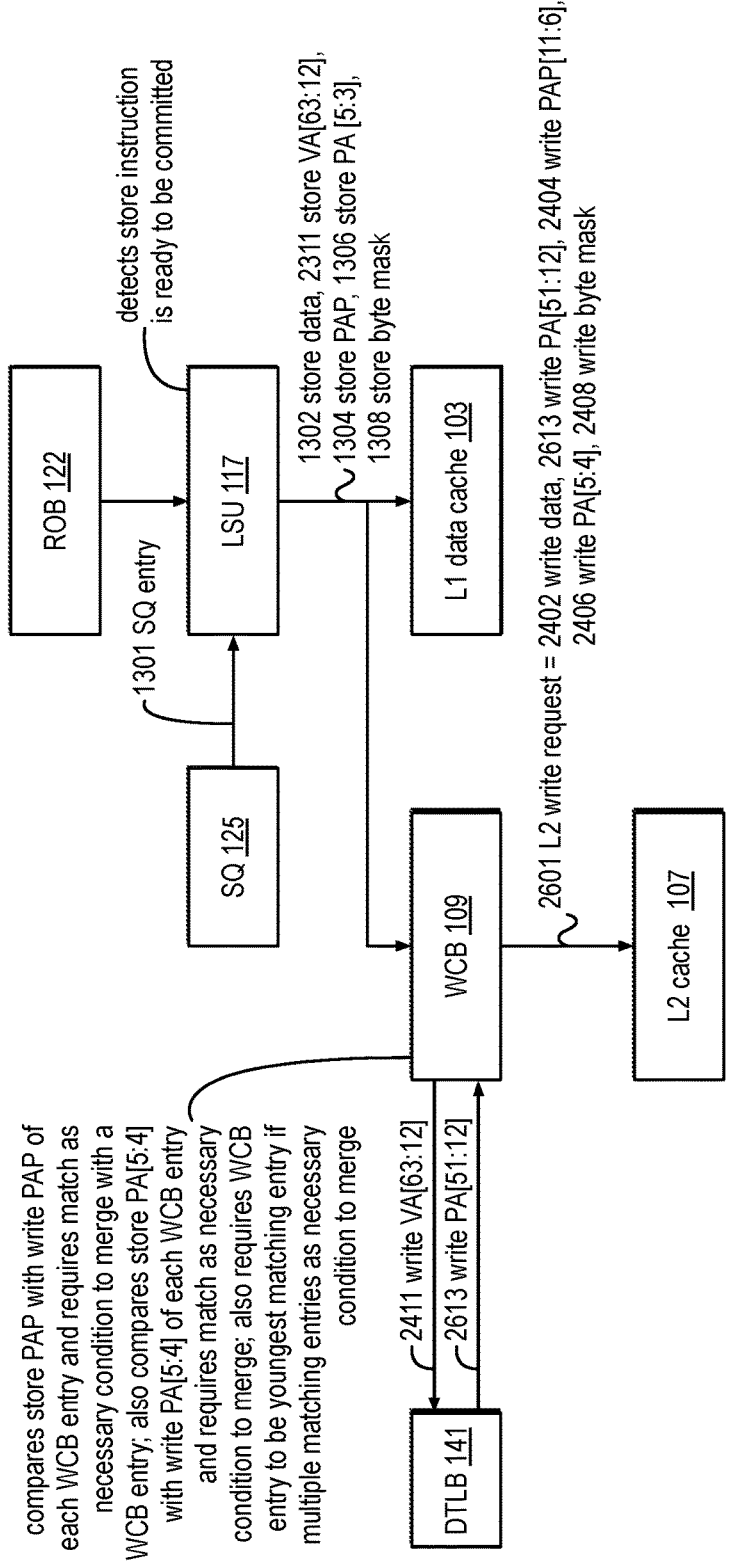
FIG. 26 is an example block diagram illustrating portions of the processor of FIG. 1 that perform writing combining using PAPs in accordance with embodiments of the present disclosure.

FIG. 26 is an example block diagram illustrating portions of the processor 100 of FIG. 1 that perform writing combining using PAPs in accordance with embodiments of the present disclosure. FIG. 26 includes the ROB 122, LSU 117, SQ 125, L1 data cache 103, WCB 109, DTLB 141, and L2 cache 107 of FIG. 1. As described above, the ROB 122 keeps track of the state of processing of each pending instruction and is used to retire instructions in program order. The LSU 117 is in communication with the ROB 122 to obtain the state of load and store instructions. More specifically, the LSU 117 includes logic that detects when load and store instructions are ready to be committed. As described above, a store instruction is ready to be committed when there are no older instructions in program order than the store instruction that could cause the store instruction to be aborted. The LSU 117 commits a store instruction by writing its store data 1302 to memory. In one embodiment, writing the store data 1302 to memory means writing the store data 1302 to the L1 data cache 103 and writing the store data 1302 through to the L2 cache 107. The store data 1302 is written through to the L2 cache 107 via the WCB 109, and the write to the WCB 109 is performed using the store PAP 1304 and write PAPs 2404, as described herein. In one embodiment, the L1 data cache 103 is a write-through cache, and if the cache line implicated by the store instruction that is being committed is no longer present in the L1 data cache 103, the L1 data cache 103 is not updated with the store data 1302. That is, the LSU 117 does not generate a fill request for the implicated cache line and does not update the L1 data cache 103 with the store data 1302. In one embodiment, the L2 cache 107 is a write-back cache, and if the cache line implicated by the store instruction that is being committed is no longer present in the L2 cache 107, the L2 cache 107 generates a fill request to fill the implicated cache line and then updates the filled cache line with the store data 1302.

The LSU 117 obtains from the SQ 125 the SQ entry 1301 associated with the store instruction that is being committed and then writes the store data 1302 to the L1 data cache 103. In the embodiment of FIG. 26, the LSU 117 provides the store VA[63:12] 2311, untranslated address bits PA[11:6] of the store PAP 1302, untranslated store bits PA[5:3], and the store byte mask 1308 to the L1 data cache 103. write the store data 1302 to memory.

The LSU 117 also writes the store data 1302 to the L2 cache 107 via the WCB 109. In the embodiment of FIG. 26, the LSU 117 provides the store data 1302, store PAP 1304, store PA[5:3] 1306, store byte mask 1308, and store VA[63:12] 2311 to the WCB 109 for either writing into the respective write data 2402, write PAP 2404, write PA[5:4] 2406, write byte mask 2408, and write VA[63:12] 2411 fields of a newly allocated WCB entry 2401 (e.g., at block 2812 of FIG. 28), or for merging the store data 1302 and store byte mask 1308 into the respective write data 2402 and write byte mask 2408 fields of a matching WCB entry 2401 (e.g., at block 2806 of FIG. 28).

The WCB 109 writes out WCB entries 2401 to the L2 cache 107 based on the age of the valid WCB entries 2401. That is, when the WCB 109 decides to write out a WCB entry 2401 to the L2 cache 107, the WCB 109 writes out the oldest WCB entry 2401. The age of a WCB 109 is determined by the order in which it was allocated. In one embodiment, the WCB 109 is configured as a first-in-first-out (FIFO) buffer with respect to the age of each WCB entry 2401. The age of a WCB entry 2401 within the WCB 109 does not (necessarily) correspond to the age in program order of the one or more store instructions merged into it, but instead corresponds to the order in which the WCB entry 2401 was allocated relative to the other valid WCB entries 2401 in the WCB 109. To illustrate by example, assume three store instructions A, B and C which have the program order A, B, C (which is also the same order in which the LSU 117 commits them). Assume the WCB 109 is empty, and A and C are to the same write block, but B is to a different write block. Assume that when A is committed, the WCB 109 allocates an entry 0 for A, and when B is committed, the WCB 109 allocates entry 1 for B. When C is committed, the WCB 109 will combine C with A into entry 0. Now entry 0 has the merged store data of both A and C. That is, even though B is ahead of C in program order, C effectively jumps ahead of B in write order, since entry 0 will be written to the L2 cache 107 before entry 1. This paradigm of weakly-ordered writes is supported by many instruction set architectures such as RISC-V, x86, and others. That is, writes to different addresses can be performed out of program order unless otherwise indicated by the program, e.g., unless a store instruction specifies that the write of its store data to memory must not be reordered with respect to earlier or later stores in program order. However, writes to the same address must be performed in program order, i.e., may not be weakly ordered.

The WCB 109 compares the store PAP 1304 of the store instruction being committed with the write PAP 2404 of each WCB entry 2401 (e.g., at block 2802 of FIG. 28) and requires a match as a necessary condition for combining the store instruction with a WCB entry 2401. In embodiments in which the width of the write data 2402 of a WCB entry 2401 is less than the width of a cache line (e.g., as in the embodiment of FIGS. 24 through 26), the WCB 109 compares the store PA[54] 1306 of the store instruction being committed with the write PA[5:4] 2406 of each WCB entry 2401 and requires a match as a necessary condition for combining the store instruction with a WCB entry 2401. Additionally, the WCB 109 requires as a necessary condition that a matching WCB entry 2401 is combinable (e.g., at decision block 2804 of FIG. 28). More specifically, to be combinable, the NC flag 2413 of the WCB entry 2401 must be false and there must not be any younger WCB entries 2401 whose NC flag 2413 is true. That is, a store instruction being committed is not allowed to skip over a WCB entry 2401 whose NC flag 2413 is true in order to combine with a WCB entry 2401 older than the WCB entry 2401 whose NC flag 2413 is true. Still further, if there are multiple matching and combinable WCB entries 2401, the WCB 109 requires as a necessary condition that the WCB entry 2401 into which the store data 1302 is merged is a youngest of the multiple matching WCB entries 2401 (e.g., at block 2806 of FIG. 28). If there is exactly one matching and combinable WCB entry 2401, it is the youngest matching and combinable entry. Finally, the WCB 109 requires as a necessary condition that the store instruction itself is combinable (e.g., at decision block 2801 of FIG. 28), e.g., that strict write ordering is not required for the store instruction. If any of the necessary conditions are not met, then the WCB 109 allocates a WCB entry 2401 for the store instruction being committed (e.g., at block 2812 of FIG. 28).

Once the WCB 109 is ready to write the oldest WCB entry 2401 to the L2 cache 107, the WCB 109 sends the write VA[63:12] 2411 from the oldest WCB entry 2401 to the DTLB 141 for translation into a write PA[51:12] 2613, which the DTLB 141 provides to the WCB 109 (e.g., at block 2814 of FIG. 2). The WCB 109 then generates an L2 write request 2601 to the L2 cache 107 that includes the write data 2402, the write PA[51:12], bits PA[11:6] of the write PAP 2404, the write PA[5:4] 2406, and the write byte mask 2408 of the oldest WCB entry 2401 (e.g., at block 2816 of FIG. 2).

Figure 27:
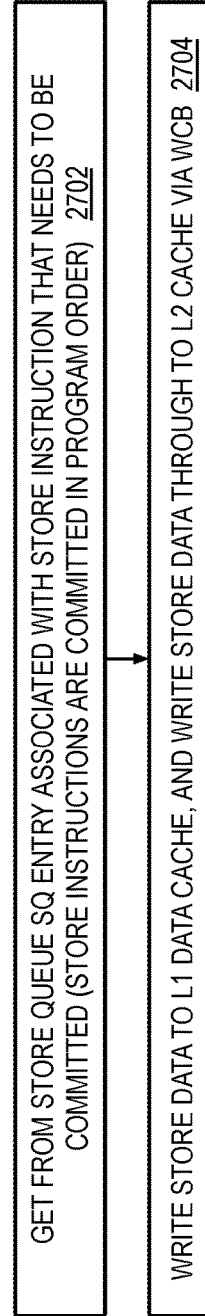
FIG. 27 is an example flowchart illustrating operation of the processor of FIG. 26 to commit a store instruction in accordance with embodiments of the present disclosure.

FIG. 27 is an example flowchart illustrating operation of the processor 100 of FIG. 26 to commit a store instruction in accordance with embodiments of the present disclosure. As described above, when a store instruction is executed, information about the store instruction is placed into an entry 1301 in the SQ 125. Typically, the store data is not immediately written to the L1 data cache 103. One reason is the store instruction may have been speculatively executed, i.e., the possibility exists that a subsequent event will require the store instruction to be flushed. For example, the processor 100 may detect that a branch instruction older than the store instruction was mis-predicted, or detect that incorrect data was forwarded to a load instruction that may then have been incorrectly consumed by the store instruction. So, the store instruction is held in an entry 1301 of the SQ 125 until the store instruction is ready to be committed, i.e., until there is no longer any possibility that the store instruction will need to be flushed. Store instructions that are ready to be committed are committed in program order. Operation begins at block 2702.

At block 2702, a store instruction needs to be committed. In one embodiment, logic within the LSU 117 detects that the store instruction associated with a SQ entry 1301 needs to be committed. The logic may receive information from the ROB 122 that indicates the store instruction is ready to be committed. The logic commits store instructions in program order. The LSU 117 obtains the SQ entry 1301 associated with the store instruction that is being committed. In one embodiment, the LSU 117 uses an index into the SQ 125 to obtain the SQ entry 1301 associated with the store instruction that is being committed. Operation proceeds to block 2704.

At block 2704, the LSU 117 writes the store data 1302 from the SQ entry 1301 to the L1 data cache 103, e.g., as data in 325 of FIG. 3. Additionally, the LSU 117 writes through the store data 1302 to the L2 cache 107 via the WCB 109, which is described in more detail below with respect to FIG. 28.

Figure 28:
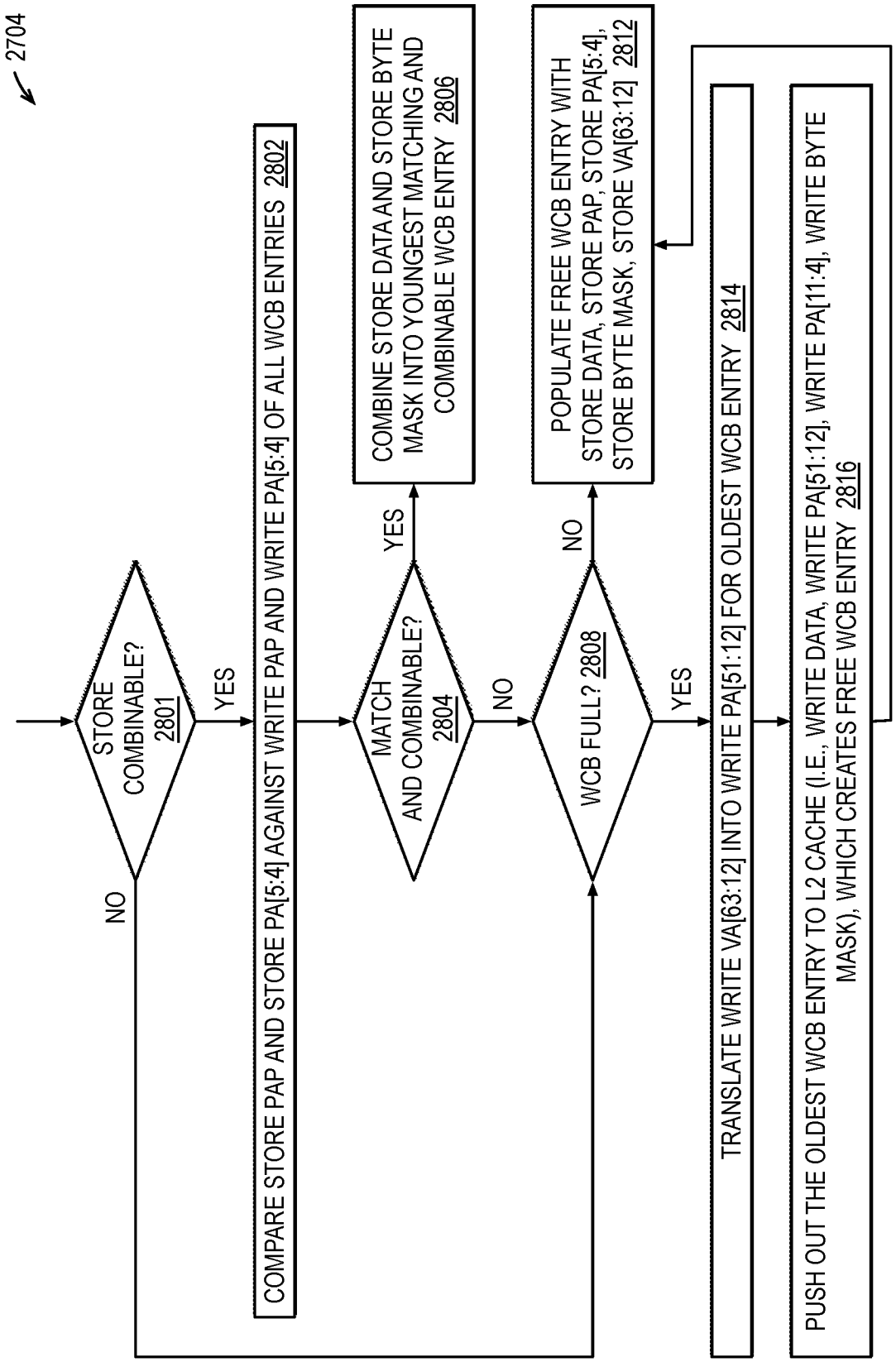
FIG. 28 is an example flowchart illustrating operation of the WCB of FIG. 26 to use PAPs to perform write combining in accordance with embodiments of the present disclosure.

FIG. 28 is an example flowchart illustrating operation of the WCB 109 of FIG. 26 to use PAPs to perform write combining in accordance with embodiments of the present disclosure. More specifically, FIG. 28 illustrates in more detail the portion of block 2704 of FIG. 27 in which the store data is written through to the L2 cache 107 via the WCB 109. Operation begins at decision block 2801.

At decision block 2801, if the store instruction indicates it is not combinable, e.g., needs to be ordered, operation proceeds to decision block 2808; otherwise, Operation proceeds to block 2802.

At block 2802, the WCB 109 compares the store PAP 1304 and store PA[5:4] with the write PAP 2404 and write PA[5:4] of each valid entry of the WCB 109. Operation proceeds to decision block 2804.

At decision block 2804, if the store PAP 1304 and store PA[5:4] match the write PAP 2404 and write PA[5:4] of one or more combinable valid entries 2401 of the WCB 109, operation proceeds to block 2806; otherwise, operation proceeds to decision block 2808. That is, in addition to the PAP and PA[5:4] matches, an additional condition required for operation to proceed to block 2806 is that a matching WCB entry 2401 be combinable. A WCB entry 2401 is combinable if the NC flag 2413 is false and there are no younger WCB entries 2401 whose NC flag 2413 is true.

At block 2806, the youngest matching and combinable WCB entry 2401 is selected for combining with the store instruction. If there is exactly one matching and combinable WCB entry 2401, it is selected as the youngest matching and combinable entry. The WCB 109 combines the store data 1302 with the selected WCB entry 2401 by writing each byte of the store data 1302 having a true-valued corresponding bit of the store byte mask 1308 to the corresponding byte of the appropriate half of the write data 2402, and the WCB 109 combines the store byte mask 1308 with the selected WCB entry 2401 by performing a Boolean OR with the write byte mask 2408.

At decision block 2808, if the WCB 109 is full (i.e., all entries 2401 of the WCB 109 are currently valid), operation proceeds to block 2814 to free an entry in the WCB 109; otherwise, operation proceeds to block 2812.

At block 2812, the WCB 109 allocates and populates a free WCB entry 2401 by writing the store data 1302, store PAP 1304, store PA[5:4] 1306, store byte mask 1308, and store VA[63:12] to the write data 2402, write PAP 2404, write PA[5:4] 2406, write byte mask 2408, and write VA[63:12]. If the store instruction, or some other instruction in the program, indicated the store instruction is not combinable (e.g., at decision block 2801), the WCB 109 sets the NC flag 2413 to true.

At block 2814, room needs to be made in the WCB 109 for the store instruction that is being committed. Therefore, the oldest entry 2401 in the WCB 109 needs to be pushed out to the L2 cache 107. The WCB 109 provides the write VA[63:12] 2411 from the oldest WCB entry 2401 to the DTLB 141 for translation into a write PA[51:12] 2613, which the DTLB 141 provides to the WCB 109. Operation proceeds to block 2816.

At block 2816, the WCB 109 pushes out the oldest entry 2401 of the WCB 109 to the L2 cache 107. That is, the WCB 109 writes the write data 2402 to the L2 cache 107 at the physical address specified by the write PA[51:12] 2613, the write PA[11:6] (i.e., bits [11:6] of the write PAP 1304), write PA[5:4] 2406, and the write byte mask 2408. The oldest/pushed out WCB entry 2401 is now free for use by a new store instruction that is to be committed. Operation proceeds to block 2812 to populate the newly freed WCB entry 2401 (which is now the youngest entry 2401 in the WCB 109) with the store instruction that is being committed. In one embodiment, each WCB entry 2401 also includes a timeout value (not shown) that is initially set to zero and that is periodically incremented (or alternatively initially set to a predetermined value and periodically decremented). When the timeout value of an entry (i.e., the oldest entry) exceeds a predetermined value (or alternatively reaches zero), the WCB 109 requests the DTLB 141 to translate the write VA 2411 of the oldest entry 2401 into the write PA 2613 as described above with respect to block 2814, and the WCB 109 pushes the entry 2401 out of the WCB 109 to the L2 cache 107 per block 2816.

As may be observed from the foregoing, holding write PAPs in the WCB to facilitate write-combining may provide various advantages over conventional solutions. First, the comparisons of the write PAPs with the store PAP to make write combining determinations may be significantly faster than the full physical line address comparisons performed by a conventional processor. Second, the write PAPs held in the WCB consume less storage space than a full physical line address. Third, holding write PAPs in the WCB to facilitate write-combining may enable the employment of a virtually-indexed virtually-tagged first level cache, which may have significant advantages, particularly in terms of performance. For example, one solution a conventional processor with a virtual cache may employ is to compare the virtual line address of the store instruction with the virtual line address stored in each entry of the conventional WCB. However, such as solution is burdened with the requirement to deal with the possibility that the multiple virtual line addresses held in the WCB entries may be synonyms of a single physical line address. In contrast, the embodiments described that hold the write PAPs are not burdened with that requirement. For another example, another solution a conventional processor with a virtual cache may employ is to hold physical line addresses in each WCB entry and to translate the store virtual line address to a store physical line address each time a store instruction is being committed to compare the store physical line address with the physical line address held in each WCB entry. In contrast, embodiments described herein facilitate the translation of a single write virtual line address (which is the same as the store virtual line address of each store instruction combined into the WCB entry) when the WCB entry is ready to be written to memory, rather than requiring a virtual to physical translation each time a store instruction is being committed. This is particularly advantageous in that it may reduce the amount of power consumed by the TLB and may be less complex than the conventional solution.

Using PAPs to Perform Store-to-Load Forwarding Correctness Checks

Embodiments will now be described in which PAPs are used to perform store-to-load forwarding correctness checks (also referred to herein as forwarding correctness checks). Embodiments are described in which the LSU 117 executes a load instruction, which involves making a store-to-load forwarding decision (e.g., using PAPs as described above), and subsequently as store instructions older than the load instruction are committed, a check is made at each store instruction commit—using PAP comparisons rather than full physical memory line address comparisons—to determine whether the forwarding decision was correct for the load instruction relative to the store instruction being committed. Forwarding correctness state within the load queue entry associated with each load instruction may be updated based on the correctness check made for each store instruction as it commits. Once all older store instructions have been committed, a final determination of the correctness of the forwarding decision can be observed from the final state of the forwarding correctness state based on the individual forwarding correctness checks associated with the commits of the older store instructions. Advantageously, comparisons of the PAPs rather than full physical memory line address comparisons may provide significant savings in terms of storage space within the load queue (LQ) 125 and in terms of timing when making store-to-load forwarding checks.

Figure 29:
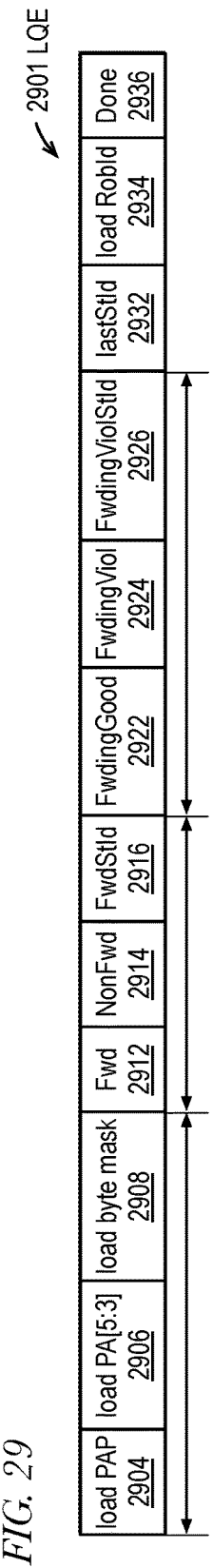
FIG. 29 is an example block diagram of a load queue (LQ) entry of the LQ of FIG. 1 in accordance with embodiments of the present disclosure.

FIG. 29 is an example block diagram of a load queue (LQ) entry 2901 of the LQ 125 of FIG. 1 in accordance with embodiments of the present disclosure. Each LQ entry 2901 holds a PAP to accomplish store-to-load forwarding correctness checks as described in detail below. The LQ entry 2901 includes the following fields which are described in more detail below: load PAP 2904, load PA[5:3] 2906, load byte mask 2908, Fwd flag 2912, NonFwd flag 2914, FwdStId 2916, FwdingGood flag 2922, FwdingViol flag 2924, FwdingViolStId 2926, lastStId 2932, load RobId 2934, and Done flag 2936. The load PAP 2904, load PA[5:3] 2906, and load byte mask 2908 are referred to collectively as the load address/size information. The Fwd flag 2912, NonFwd flag 2914, and FwdStId 2916 are referred to collectively as the forwarding behavior information. The FwdingGood flag 2922, FwdingViol flag 2924, and FwdingViolStId 2926 are referred to collectively as the forwarding correctness information. The forwarding behavior information and the forwarding correctness information are referred to collectively as the forwarding information.

As described above, the load and store queues 125 of FIG. 1 may be separate memory queue structures or they may be combined into a single memory queue structure rather than separate memory queue structures; hence, the term load/store queue may refer to a combined embodiment, and the term load/store queue may also refer to a separate load queue or a separate store queue. A load instruction loads load data received from the L1 data cache 103 or forwarded from a SQ entry 1301 into a physical register of the physical register file 105 that is the destination register specified by in the load instruction. The population of some fields the LQ entry 2901 is performed prior to dispatch of the load instruction, other fields during execution of the load instruction, and other fields while one or more store instructions older than the load instruction are being committed, as described in more detail below.

The load instruction specifies a load virtual address, e.g., load VA 321 of FIG. 3. The load PAP 2904 is a physical address proxy for a load physical memory line address that is a translation of the load virtual memory line address (i.e., load VA[63:6] 321) and specifies the set index and way of the entry 401 of the L2 cache 107 into which a cache line specified by the load physical memory line address is allocated. More specifically, the load physical memory line address is a translation of a memory page address portion of the load virtual address, namely upper address bits (e.g., bits 12 and above in the case of a 4 KB page size), along with the remaining untranslated address bits that specify a memory line within the memory page (e.g., VA[11:6]). As described above, when a cache line is brought into the L2 cache 107 from a physical memory line address, e.g., by a load or store instruction, the upper address bits of the load/store virtual address specified by the load/store instruction are translated into a load/store physical memory line address, e.g., by the MMU 147 of FIG. 1. The cache line is brought into, i.e., allocated into, an entry of the L2 cache 107, which has a unique set index and way number, as described above.

The load PAP 2904 specifies the set index and the way number of the entry 401 in the L2 cache 107 into which the cache line was allocated, i.e., the cache line specified by the physical memory line address of the load/store instruction that brought the cache line into the L2 cache 107. The lower bits of the load virtual address (e.g., bits [11:0] in the case of a 4 KB page size) are untranslated address bits, i.e., the untranslated bits of the virtual and physical addresses are identical, as described above. The load physical address bits PA[5:3] 2906 correspond to the untranslated address bits [5:3] of the load virtual address. The load instruction also specifies a size of the load data to be read. In the example embodiment, the largest size of load data is eight bytes. Hence, in the embodiment of FIG. 29, the size of the load data is up to eight bytes, and the load physical address bits PA[5:3] 2906 narrows down the location of the load data within a 64-byte cache line, for example. That is, the address bits PA[5:3] 2906 specify the offset of an eight byte-aligned eight-byte data word with a 64-byte-aligned 64-byte memory line. The load size and bits [2:0] of the load address may be used to generate the load byte mask 2908 that specifies, or encodes, which of the eight bytes are being read by the load instruction. Other embodiments are contemplated in which the bytes read by the load instruction are specified in a different manner, e.g., the size itself and bits [2:0] of the load address may be held in the LQ entry 2901 rather than the load byte mask 2908.

Advantageously, each entry of the LQ 125 holds the load PAP 2904 rather than the full load physical memory line address. In the embodiment of FIG. 29, because in the example embodiment the L2 cache 107 is 4-way set associative, the load PAP 2904 specifies the 2 bits of the way number of the entry in the L2 cache 107 into which the cache line specified by the physical memory line address is allocated. Furthermore, in the embodiment of FIG. 29, because in the example embodiment the L2 cache 107 has 2048 sets, the load PAP 2904 specifies the eleven bits of the set index of the set of the entry in the L2 cache 107 into which the cache line specified by the physical memory line address is allocated, which corresponds to physical memory line address bits PA[16:6] in the embodiment. Thus, in the embodiment of FIG. 29, the load PAP 2904 is thirteen bits, in contrast to a full load physical memory line address, which may be approximately forty-six bits in some implementations, as described above, and in other implementations there may be more. Advantageously, a significant savings may be enjoyed both in terms of storage space within the LQ 125 and in terms of timing by providing the ability to compare PAPs rather than full physical memory line addresses when making store-to-load forwarding checks.

The Fwd flag 2912 is true if the LSU 117 forwarded store data to the load instruction from a SQ entry 1301 and is false otherwise. The NonFwd flag 2914 is true if the LSU 117 tried to forward store data to the load instruction but failed and instead provided the load data from the L1 data cache 103, as described in more detail below with respect to FIG. 30, and is false otherwise. The LSU 117 only sets to true one of Fwd 2912 and NonFwd 2914, never both. If the LSU 117 did not try to forward from a store instruction, Fwd 2912 and NonFwd 2914 are both false. The FwdStId 2916 specifies the SQ entry 1301 from which the LSU 117 forwarded or tried to forward store data to the load instruction. In one embodiment, the FwdStId 2916 is valid if either the Fwd flag 2912 or the NonFwd flag 2914 is true. That is, even if the LSU 117 tried but failed to forward store data and instead provided the load data from the L1 data cache 103, the FwdStId 2916 specifies the SQ entry 1301 from which the LSU 117 tried to forward but failed.

The FwdingGood flag 2922, FwdingViol flag 2924, and FwdingViolStId 2926 may be updated each time a store instruction is committed that is older than the load instruction. The FwdingGood flag 2922, if true, tentatively indicates correct forwarding behavior by the load instruction based on the commit of all the older store instructions committed thus far. The FwdingViol flag 2924, if true, tentatively indicates incorrect forwarding behavior by the load instruction based on the commit of all the older store instructions committed thus far. As described in more detail below, the FwdingGood flag 2922 and FwdingViol flag 2924 may not accurately indicate correct/incorrect forwarding until all older store instructions have committed. The LSU 117 only sets to true one of FwdingGood 2922 and FwdingViol 2924, never both. The FwdingGood flag 2922 and FwdingViol flag 2924 are set to false when the LQ entry 2901 is allocated. In one embodiment, at execution of the load instruction, the FwdingGood flag 2922 is set to true and the FwdingViol flag 2924 is set to false. At store commit time, if one of the FwdingGood flag 2922 and FwdingViol flag 2924 is updated to a value, then the other is also updated with the opposite value. The FwdingViolStId 2926, if the FwdingViol flag 2924 is true, specifies the SQ entry 1301 of the relevant store instruction associated with the store-to-load forwarding violation. In one embodiment, the FwdingViolStId 2926 may be used to update the predictor that makes store-to-load forwarding predictions.

The lastStId 2932 is populated with the identifier of the SQ entry 1301 allocated to the youngest store instruction in program order that is older than the load instruction. The load RobId 2934 is populated with the entry in the ROB 122 allocated to the load instruction. In one embodiment, the lastStId 2932 and load RobId 2934 are populated by the decode unit 112 before the load instruction is dispatched to the scheduler 121. The LSU 117 sets the Done flag 2936 when the LSU 117 completes execution of the load instruction, which includes populating the load address/size information and the forwarding behavior information and providing load data for the load instruction, e.g., via the output of mux 1446 of FIG. 18. In one embodiment, a LQE 2901 is valid when it has been allocated for a load instruction and not yet deallocated (which in one embodiment is determined by head and tail pointers of the load queue 125) and its Done flag 2926 is true.

Figure 30:
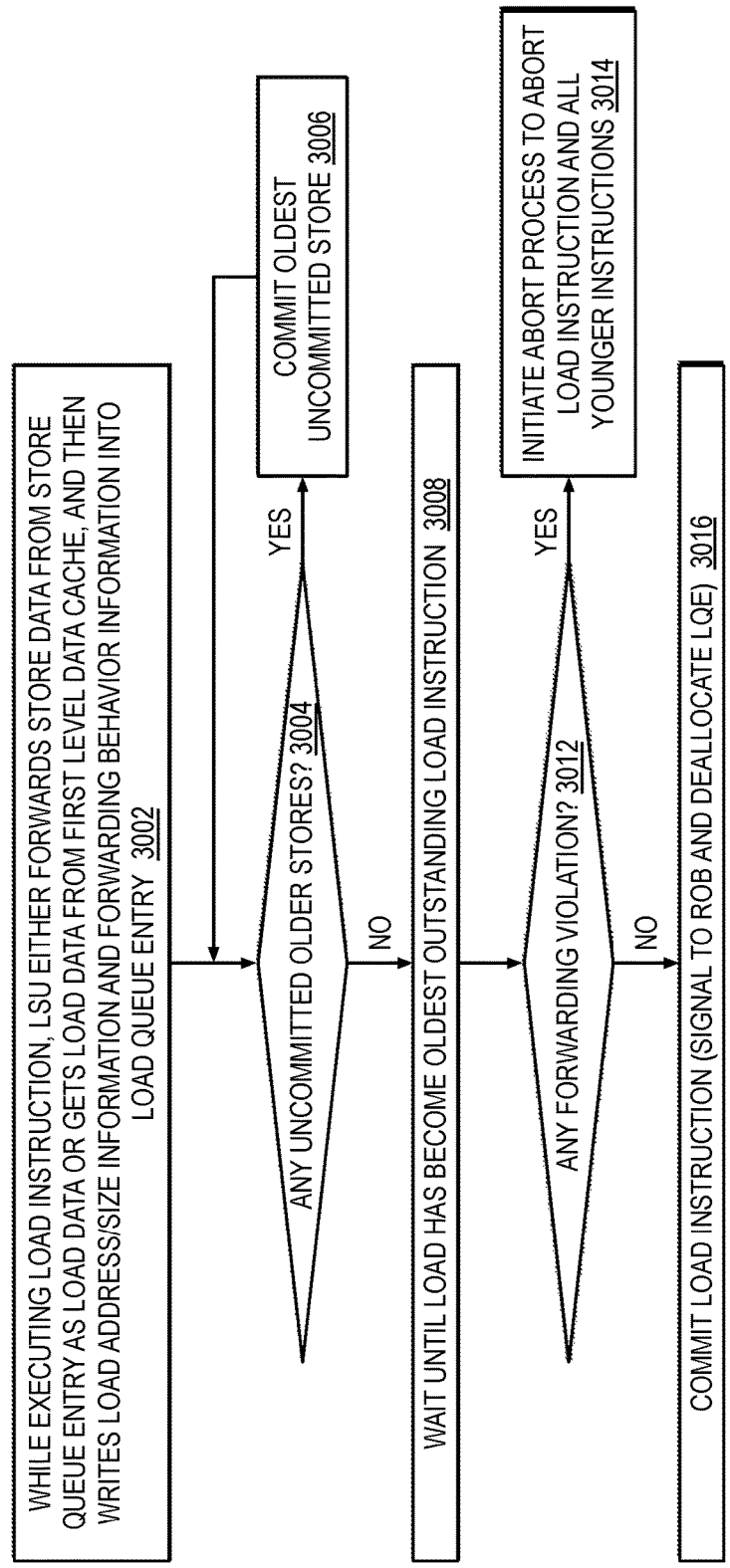
FIG. 30 is an example flowchart illustrating operation of the LSU to process a load instruction in accordance with embodiments of the present disclosure.

FIG. 30 is an example flowchart illustrating operation of the LSU 117 to process a load instruction in accordance with embodiments of the present disclosure. To simplify for the purpose of clarity, operation of the LSU 117 is described in FIG. 30 from the perspective of a given load instruction; however, as described above, the LSU 117 may execute multiple load and store instructions concurrently, speculatively, and out-of-order. Operation begins at block 3002.

At block 3002, the LSU 117 executes a load instruction. The LSU 117 either obtains the load data for the load instruction from the L1 data cache 103 or forwards store data from a SQ entry 1301 to the load instruction as the load data. The latter operation is store-to-load forwarding, as described in detail above. In one embodiment, as described above, a predictor (e.g., MDP 111) makes a forwarding prediction for each load instruction that indicates either that no store-to-load forwarding should be performed, or that the load instruction should check for and try to forward from a suitable older store instruction. The LSU 117 then writes the load address/size information and forwarding behavior information to the LQE 2901 associated with the load instruction. The load PAP 2904 is populated with the load PAP 1495 provided by the L1 data cache 103 in response to the virtual load address 321 specified by the load instruction, the load PA[5:3] 2906 is populated with load VA[5:3] specified by the load instruction, and the load byte mask 2908 is populated with the load byte mask 1493, which are described with respect to FIG. 14, for example. If the forwarding prediction indicates the LSU 117 should forward from a store instruction and the LSU 117 actually forwards store data to the load instruction from a SQ entry 1301, the LSU 117 sets the Fwd flag 2912 to true and populates the FwdStId 2916 with the identifier of the SQ entry 1301 from which the store data was forwarded; otherwise, the LSU 117 sets the Fwd flag 2912 to false. If the forwarding prediction indicates the LSU 117 should forward from a store instruction and the LSU 117 tries to forward from an older store instruction and fails because it determines the store instruction is not suitable and instead provides the load data from the L1 data cache 103, the LSU 117 sets the NonFwd flag 2914 to true and populates the FwdStId 2916 with the identifier of the SQ entry 1301 from which the LSU 117 tried to forward store data but failed; otherwise, the LSU 117 sets the NonFwd flag 2914 to false. An example situation in which the LSU 117 tries to forward from the predicted store instruction and fails because it determines the store instruction is not suitable and instead provides the load data from the L1 data cache 103 is when the store data of the predicted store instruction does not overlap the load data requested by the load instruction. As described above, e.g., with respect to FIG. 14, the store data overlaps the requested load data if the selected SQ entry 1399 is valid, the load PAP 1495 matches the store PAP 1304 and the load PA[5:3] matches the store PA[5:3] 1306, and the valid bytes of the store data 1302 of the selected SQ entry 1399 as indicated by the store byte mask 1308 overlap the load data bytes requested by the load instruction as indicated by the load byte mask 1493, i.e., for each true bit of the load byte mask 1493, the corresponding bit of the store byte mask 1308 is also true. Another example situation in which the LSU 117 tries to forward from the predicted store instruction and fails because it determines the store instruction is not suitable and instead provides the load data from the L1 data cache 103 is when the SQ entry 1301 the LSU 117 is trying to forward from is not valid (e.g., the valid bit 1309 is clear, i.e., there is no valid store data 1302 and no valid store PAP 1304, store PA 1306 and store byte mask 1308 to compare) when the load instruction is successfully executed. In one embodiment, the FwdStId 2916 is simply populated with the SQ entry 1301 identifier associated with the store instruction that the load instruction tried to forward from. In one embodiment, at execution of the load instruction, the FwdingGood flag 2922 is set to true and the FwdingViol flag 2924 is set to false. Operation proceeds to decision block 3004.

At decision block 3004, the LSU 117 determines whether there are any uncommitted store instructions older than the load instruction. If so, operation proceeds to block 3006; otherwise, operation proceeds to block 3008.

Figure 31:
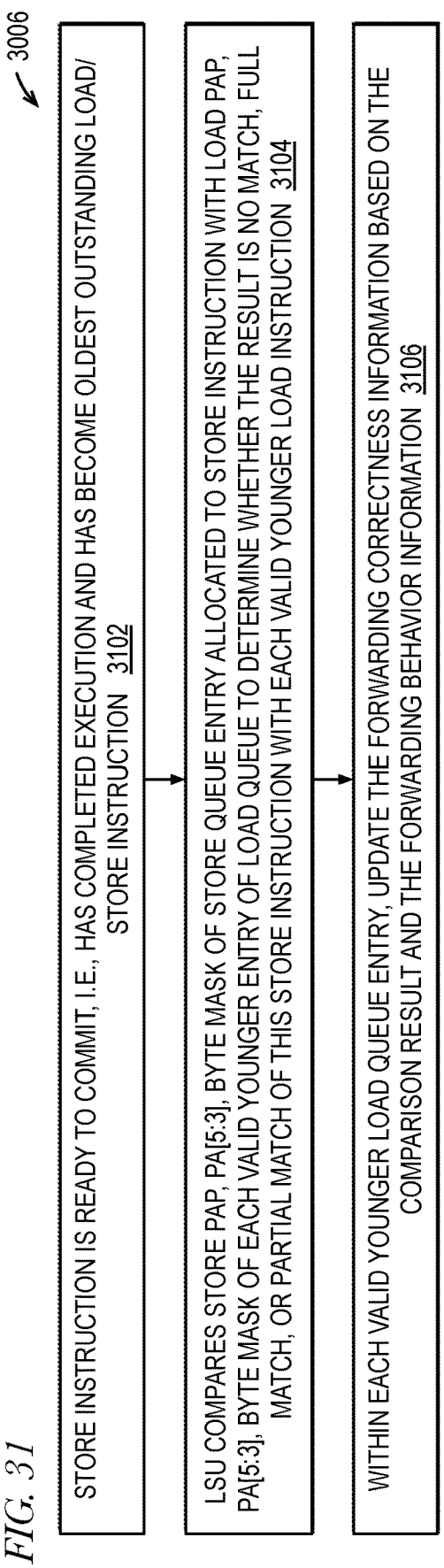
FIG. 31 is an example flowchart illustrating operation of the LSU to commit a store instruction that is oldest in program order in accordance with embodiments of the present disclosure.

At block 3006, the LSU 117 commits the oldest uncommitted store instruction, as described in detail with respect to FIG. 31. Briefly, committing the oldest uncommitted store instruction includes using PAP comparisons—rather than full physical memory line address comparisons—to make a forwarding correctness check and, in most cases, to update the forwarding correctness fields of the LQ entry 2901 based on the forwarding correctness check.

At block 3008, the LSU 117 waits until the load instruction has become the oldest outstanding load instruction. In one embodiment, each clock cycle the LSU 117 checks the LSQ 125 head and tail pointers and the entries 1301/2901 at the head pointers to determine whether there is an outstanding load/store instruction that is ready to be committed. Thus, although the operations at decision block 3004 and block 3008 are shown as occurring sequentially, they may be performed concurrently. For example, as soon as the load instruction executes, it may be that there are no outstanding older load/store instructions, in which case the load instruction immediately becomes ready to commit. In one embodiment, the load instruction may be among a group of oldest load instructions that are committed together in the same clock cycle. Operation proceeds to decision block 3012.

At decision block 3012, the LSU 117 examines the forwarding correctness information to determine whether any forwarding violation occurred. If so, operation proceeds to block 3014; otherwise, operation proceeds to block 3016. In one embodiment, the LSU 117 determines that a forwarding violation occurred if the FwdViol flag 2924 is true.

At block 3014, the LSU 117 signals to the PCL 132 the need for an abort of the load instruction and all instructions younger than the load instruction. In response, the PCL 132 initiates an abort process to flush the load instruction and all instructions younger than the load instruction. Subsequently, the PCL 132 restarts instruction fetch at the load instruction so that the load instruction (and subsequent instructions) may be re-executed. The store-to-load forwarding predictor may also be updated, e.g., based on the forwarding correctness fields from the LQ entry 2901. Upon re-execution of the load instruction, typically the store-to-load forwarding behavior will be correct, e.g., since the predictor will have been updated based on the incorrect forwarding behavior of the earlier execution instance of the load instruction. In an alternate embodiment, even if the load instruction has not yet become the oldest outstanding load instruction at block 3008, if a forwarding violation occurred with respect to the load instruction and a forwarding violation occur did not occur for all older load instructions, if any, then the LSU 117 signals to the PCL 132 the need for an abort.

At block 3016, the LSU 117 commits the load instruction. In one embodiment, committing the load instruction includes signaling to the PCL 132 (e.g., to update the ROB 122 entry associated with the load instruction) and deallocating the LQ entry 2901 previously allocated to the load instruction. In one embodiment, committing and retiring the load instruction are not separate events, in which case committing the load instruction also includes committing to architectural state of the physical register in the register file 105 of FIG. 1 specified as the destination register of the load instruction.

FIG. 31 is an example flowchart illustrating operation of the LSU 117 to commit a store instruction that is oldest in program order in accordance with embodiments of the present disclosure. Operation begins at block 3102.

At block 3102, a store instruction is ready to be committed. That is, the store instruction has completed execution, does not need to be aborted, and has become the oldest load/store instruction among all outstanding load and store instructions. Committing the store instruction includes the LSU 117 writing the store data 1302 from the SQ entry 1301 to the L1 data cache 103, e.g., as described above with respect to block 2704 of FIG. 27. Operation proceeds to block 3104.

At block 3104, the store instruction that is being committed still has an allocated SQ entry 1301. The LSU 117 compares the store PAP 1304, store PA[5:3], and store byte mask 1308 from the SQ entry 1301 with the load PAP 2904, load PA[5:3] 2906, and load byte mask 2908 of each valid entry 2901 of the load queue 125 associated with a load instruction that is younger in program order than the store instruction that is being committed. In one embodiment, the result of the comparison indicates either no match, a full match, or a partial match. A no match result means none of the bytes to be read by the load instruction are available in the store data 1302 of the SQ entry 1301. A no match result may occur because the store PAP 1304 and the load PAP 2904 do not match. A no match result may occur because the store PA[5:3] 1306 and the load PA[5:3] 2906 do not match. A no match result may occur because none of the true bits of the load byte mask 2908 have a corresponding true bit in the store byte mask 1308. A full match result means all the bytes to be read by the load instruction are available in the store data 1302 of the SQ entry 1301. A full match result occurs when the store PAP 1304 and the load PAP 2904 match, the store PA[5:3] 1306 and the load PA[5:3] 2906 match, and all of the true bits of the load byte mask 2908 have a corresponding true bit in the store byte mask 1308. A partial match result means at least one but less than all the bytes to be read by the load instruction are available in the store data 1302 of the SQ entry 1301. A partial match result occurs when the store PAP 1304 and the load PAP 2904 match, the store PA[5:3] 1306 and the load PA[5:3] 2906 match, and at least one but not all of the true bits of the load byte mask 2908 have a corresponding true bit in the store byte mask 1308. In one embodiment, the LSU 117 is configured such that store-to-load forwarding is not allowed if the store instruction is not able to provide all the requested load data. In such an embodiment, when the load instruction is being executed, if the LSU 117 detects a partial match result between the predicted store PAP 1304, store PA[5:3] 1306, and store byte mask 1308 and the load PAP 1495, load PA[5:3] and load byte mask 1493, then the LSU 117 replays the load instruction (i.e., the load instruction does not complete its execution) and a memory dependence operand is created in the scheduler 121 that causes the scheduler 121 to wait to re-issue the load instruction for execution until the predicted store instruction has committed its store data to the L1 data cache 103 (or in an alternate embodiment, until the youngest store instruction older than the load instruction has committed its store data to the L1 data cache 103). Advantageously, the comparisons are performed using the store PAP 1304 of the store instruction being committed and the load PAP 2902 of each valid younger LQE 2901. Comparisons of PAPs are performed rather than comparisons of physical memory line addresses, which has the advantages of reduced storage space within the LSQ 125 over an implementation that stores the full load/store physical memory line address and PAP comparisons that are faster than full physical memory line address comparisons, as described above. Operation proceeds to block 3106.

At block 3106, for each valid younger LQ entry 2901, the LSU 117 updates the forwarding correctness information, as needed, based on the result of the associated comparison made at block 3104 and based on the forwarding behavior information. Recall that for a given load instruction associated with a valid younger LQ entry 2901, the whole operation 3006 of FIGS. 30 and 31, including the operation at block 3106 to update the forwarding correctness information, may be performed multiple times since multiple older store instructions may be committed before the load instruction becomes the oldest load/store instruction and is committed. Consequently, the forwarding correctness information may be updated with each store instruction commit, e.g., FwdingViol 2924 may be set to true and FwdingGood 2912 may be set to false as the operation at block 3106 is performed for a first older store instruction that is committed, however FwdingViol 2924 may be set to false and FwdingGood 2912 may be set to true as the operation at block 3106 is performed for a second older store instruction that is committed, and then FwdingViol 2924 may be set to true and FwdingGood 2912 may be set to false as the operation at block 3106 is performed for a third older store instruction that is committed, and this updating may occur multiple times until all older store instructions have been committed. However, it is the resting state of the forwarding correctness information that is ultimately used at block 3012 of FIG. 30 to determine whether a forwarding violation occurred. Updating of the forwarding correctness information for a LQE 2901 will now be described according to one embodiment.

If the comparisons at block 3104 indicate no match, then the LQ entry 2901 forwarding correctness fields are not updated. This is because the LSU 117 will not have forwarded from, although it may have tried to forward from (i.e., the prediction may have indicated to try to forward from), this store instruction because at execution of the load instruction the LSU 117 will have detected no match. If the comparisons at block 3104 indicate a full match or a partial match, then the LSU 117 checks for either a forwarding violation or no forwarding violation situation, as described in the next paragraph, by examining Fwd 2912 and NonFwd 2914 and comparing FwdStId 2916 with the SQ entry 1301 identifier of the store instruction being committed (which is referred to henceforth as CmtStId). The comparison of FwdStId 2916 and CmtStId may indicate the LSU 117 forwarded from this store, i.e., from store instruction being committed (FwdStId 2916 matches CmtStId), the LSU 117 forwarded from a younger store than the store instruction being committed (FwdStId 2916 is younger than CmtStId), or the LSU 117 forwarded from an older store than the store instruction being committed (FwdStId 2916 is older than CmtStId). In the case of a forwarding violation, the LSU 117 sets FwdingGood 2922 to false, FwdingViol 2924 to true, and FwdingViolStId 2926 to CmtStId. If the forwarding violation check indicates no forwarding violation, then the LSU 117 sets FwdingGood 2922 to true and FwdingViol 2924 to false, although in some cases the LSU 117 simply does not update the LQ entry 2901, as described below.

If the comparisons at block 3104 indicate a full match or a partial match, then the following checks are performed. If Fwd 2912 and NonFwd 2914 are both false, then a forwarding violation has been detected. If Fwd 2912 is true and FwdStId 2926 matches CmtStId, then no forwarding violation is detected. If NonFwd 2914 is true and FwdStId 2926 matches CmtStId, then no forwarding violation is detected. This is because, as described above with respect to block 3104, the LSU 117 detected the store instruction is not able to provide all the requested load data (i.e., detected a partial match), set NonFwd 2914 to true, and replayed the load instruction. If Fwd 2912 or NonFwd 2914 is true and the LSU 117 forwarded from an older store than the store instruction being committed, then a forwarding violation is detected. If NonFwd 2914 is true and the LSU 117 forwarded from a younger store than the store instruction being committed, then a forwarding violation is detected. If Fwd 2912 is true and the LSU 117 forwarded from a younger store than the store instruction being committed, then the LSU 117 does not update the forwarding correctness information since the forwarding correctness information will be updated when the younger store instruction is committed.

Using PAPs to Execute Load/Store Instructions that Straddle a Cache Line Boundary without Performance Penalty As described above, load and store instructions specify a size of the load/store data to be read/written and a load/store address from/to which the load/store data is to be read/written. As also described above, cache memories hold copies of lines of memory. The lines of memory have a size. For example, embodiments are described above in which the size of a cache line is 64 bytes. The cache line memory addresses are aligned to the size of a cache line, e.g., a physical memory line address is 64-byte aligned in the case of a 64-byte cache line.

The boundary between two adjacent lines of memory may be referred to herein as a cache line boundary. In some instances of a load/store instruction, the load/store address and size of the load/store data cause the load/store data to straddle a cache line boundary. That is, a first portion of the load/store data is to be read/written from/to a first line of memory, and a second portion of the load/store data is to be read/written from/to a second line of memory adjacent to the first line of memory. That is, the two portions of the load/store data reside in different lines of memory and therefore, also reside in different cache lines of the cache memory. Consequently, the two portions of the load/store data are read/written from/to the two different cache lines in the cache memory, in contrast to a load/store instruction whose load/store data resides in a single cache line of the cache memory.

Conventional processors have dealt with instances of a cache-line boundary-straddling load/store instruction in different ways. One conventional approach is to detect the cache-line boundary-straddling condition at some stage of the execution unit (e.g., load/store unit) pipeline and stall execution of instructions behind the pipeline stage so that a second operation may be inserted into the pipeline that handles the second portion of the load/store data, and the original, or first, operation is modified to handle the first portion of the load/store data. In this manner, the execution unit effectively splits the load/store instruction into two constituent operations. A performance penalty incurred by this first conventional approach is that it does not maintain single cycle throughput throughout the execution of the load/store instruction because two constituent operations flow down the pipeline of the execution unit after the stage that detects the cache-line boundary-straddling condition thus consuming two cycles of throughput in stages of the pipeline subsequent to the detecting stage. Another performance penalty incurred by the first conventional approach is that it requires stalling the pipeline, which can create difficult timing problems that are prohibitive of the goal of a high-performance microprocessor design, e.g., the need to fan out a stall signal to potentially relatively distant blocks of the microprocessor may require lengthening of the microprocessor clock cycle.

A second conventional approach is to cancel the load/store instruction when the cache-line boundary-straddling condition is detected, record the cache-line boundary-straddling condition, and then retry execution of the load/store instruction with the recorded condition in mind. In such an approach, the scheduler may issue the load/store instruction as first and second operations that handle the first and second constituent portions of the load/store data, similar to the first conventional approach. The second conventional approach avoids the performance penalty of stalling the execution pipeline; however, it incurs the performance penalty of consuming three cycles of throughput of the execution pipeline: one during the pass through the execution pipeline that is canceled, and one for each of the passes through the execution pipeline of the two constituent operations. That is, the second approach also does not maintain single-cycle throughput for the execution of the load/store instruction.

A third conventional approach is similar to the second approach but re-circulates the cache-line boundary-straddling load/store instruction back to the beginning of the execution pipeline, without sending it back to the scheduler, and injects the second operation after the re-circulation of the first operation. This approach also incurs the performance penalty of consuming three cycles of throughput of the execution pipeline and may also require canceling an instruction that has already been issued and is about to enter the execution pipeline. Thus, the third approach also does not maintain single-cycle throughput for the execution of the load/store instruction. Embodiments are described herein that advantageously avoid the performance penalties of the conventional approaches described above to maintain single-cycle throughput throughout the execution of the cache line boundary-straddling load/store instruction.

Figure 32:
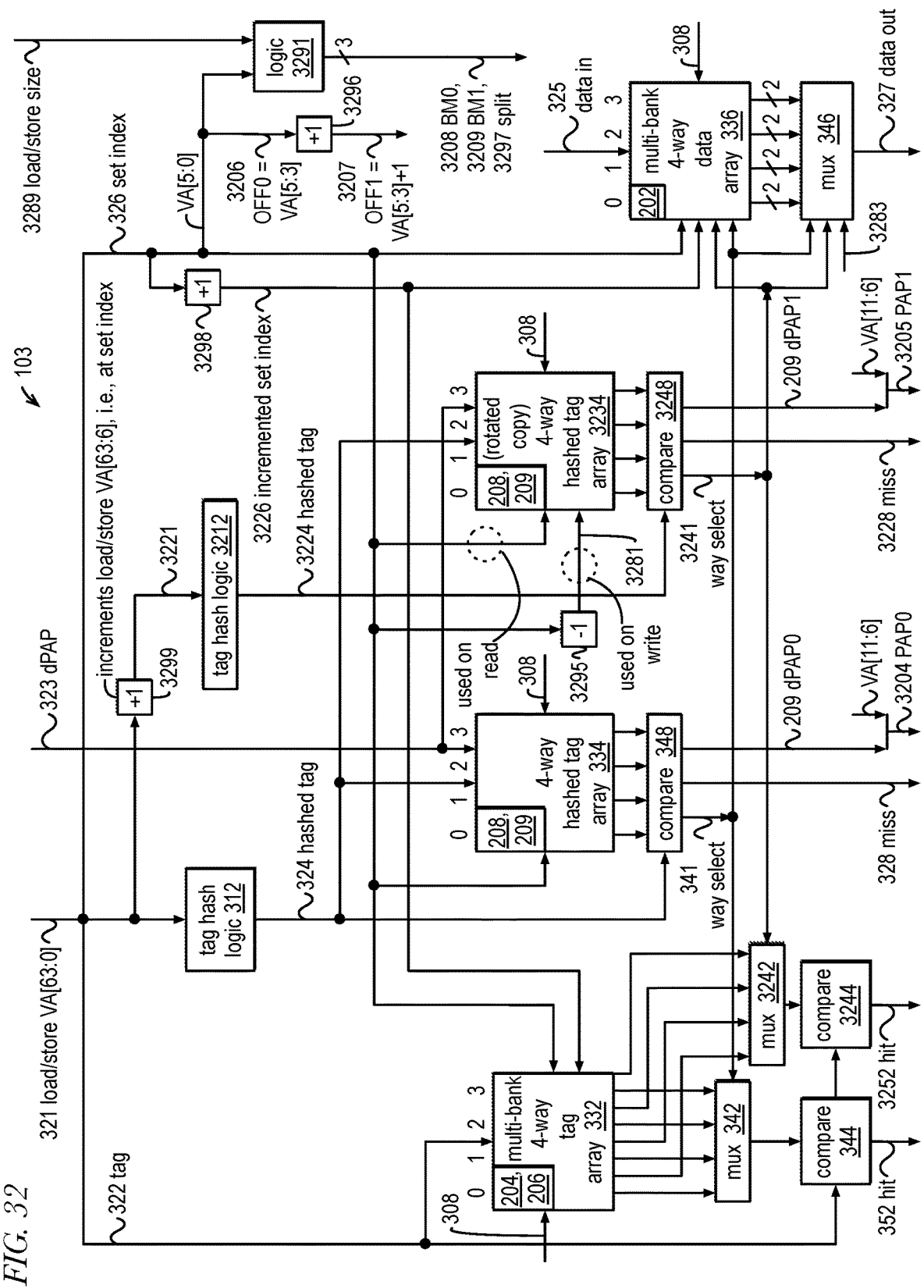
FIG. 32 is an example block diagram illustrating the L1 data cache of FIG. 1 that employs PAPs to accomplish performance-penalty-less execution of cache-line boundary-straddling load/store instructions in accordance with embodiments of the present disclosure.

FIG. 32 is an example block diagram illustrating the L1 data cache 103 of FIG. 1 that employs PAPs to accomplish performance-penalty-less execution of cache-line boundary-straddling load/store instructions in accordance with embodiments of the present disclosure. The embodiment of FIG. 32 is similar in many respects to the embodiment of FIG. 3. However, the embodiment of FIG. 32 includes logic 3291, a second tag hash logic 3212 that generates a second hashed tag 3224, a second comparator 3244, a second mux 3242 that selects a second tag/status 204/206 for provision to the second comparator 3244, a second hashed tag array 3234, and a second comparator 3248 that produces a second way select 3241 and a second miss indicator 3228 and a second dPAP1 209. The embodiment of FIG. 32 also includes a decrementor 3295, an incrementor 3296, an incrementor 3298, and an incrementor 3299. In FIG. 32 and subsequent Figures, "OFF" refers to the offset of an 8-byte address aligned block within a cache line, which is specified by bits VA[5:3] of a virtual address. Incrementor 3296 receives bits VA[5:3] of the load/store virtual address 321 which corresponds to a first offset OFF0 3206. The incrementor 3296 increments the first OFF0 3206 to generate a second OFF1 3207.

The load/store instruction being executed by the LSU 117 specifies a load/store virtual address 321 a load/store size 3289 that specifies the size in bytes of the load/store data of the load/store instruction. In some instances, the load/store instruction is a cache-line straddling load/store instruction. That is, the load/store instruction specifies a load/store virtual address 321 and load/store size 3289 that requires a first portion of the load/store data to be read/written from/to a first line of memory and a second portion of the load/store data to be read/written from/to a second line of memory. As described above, a line of memory is a block of memory that is the size of a cache line, and that is specified by a physical memory line address, which is aligned to the size of a cache line. For example, assume a store instruction indicates a store size 3289 of eight bytes and a store virtual address 321 that is three bytes before a cache line boundary (e.g., VA[5:0]=binary 111101). In that instance, the first three bytes of the store data are to be written to a first line of memory and the second/remaining five bytes of the store data are to be written to a second line of memory. The first line of memory is specified by a first physical memory line address that is a translation of a virtual memory line address portion of the store virtual address 321, and the second line of memory is specified by a second physical memory line address that is a translation of the virtual memory line address portion of a version of the store virtual address 321 that is incremented at the cache line boundary (e.g., at VA[6] in the case of a 64-byte cache line).

Logic 3291 receives bits VA[5:0] of the load/store virtual address 321. Logic 3291 also receives the load/store size 3289. The logic 3291 generates a split indicator 3297 that is set to true if the load/store data straddles an 8-byte aligned address boundary. If the load/store data straddles an 8-byte aligned address boundary (i.e., the split indicator 3297 is true) and the load/store data begins in the last 8-byte aligned block of the cache line (i.e., VA[5:3]=binary 111), then the load/store data also straddles a cache line boundary. In the embodiment in which the size of a cache line is 64 bytes, a load/store instruction straddles a cache line boundary if the sum of VA[5:0] and the load/store size 3289 overflows and is non-zero.

The logic 3291 also generates a first byte mask BM0 3208 and a second byte mask BM1 3209. A bit of the first byte mask BM0 3208 or second byte mask BM1 is true if, based on VA[2:0] and the load/store size 3289, the corresponding byte is to be read in the case of a load or written in the case of a store. In the case of a load/store instruction that straddles an 8-byte aligned address boundary, the second byte mask BM1 3209 is valid.

The incrementor 3298 increments the set index 326 to produce an incremented set index 3226. Thus, in the case of a cache line-straddling load/store instruction, the set index 326 is the set index associated with the first portion of the load/store data, and the incremented set index 3226 is the set index associated with the second portion of the load/store data. The incremented set index 3226 is provided to the tag array 332 along with the set index 326. The tag array 332 is banked such that adjacent sets (i.e., set N and set N+1) reside in different banks, which enables two adjacent sets to be read from the tag array 332 concurrently and provided to the respective first mux 342 and second mux 3242. Accordingly, during a load/store instruction access of the L1 data cache 103, the tag 322 portion of the load/store virtual address 321 may be looked up in both the set indexed by the set index 326 associated with the first portion of the load/store data and the set indexed by the incremented set index 3226 associated with the second portion of the load/store data.

As described above with respect to FIG. 3, the first mux 342 selects the tag 204 of the way indicated by the first way select 341, and the selected tag 204 is then compared with the tag 322 by the first comparator 344 to generate the first hit indicator 352. During execution of a cache line-straddling load/store instruction, the first hit indicator 352 specifies whether or not the cache line associated with the first portion of the load/store data is present in the L1 data cache 103. Similarly, the second mux 3242 selects the tag 204 of the way indicated by the second way select 3241, and the selected tag 204 is then compared with the tag 322 by the second comparator 3244 to generate the second hit indicator 3252. During execution of a cache line-straddling load/store instruction, the second hit indicator 3252 specifies whether or not the cache line associated with the second portion of the load/store data is present in the L1 data cache 103.

Additionally, the incremented set index 3226 is provided to the data array 336 along with the set index 326. The data array 336 is also banked such that adjacent sets (i.e., set N and set N+1) reside in different banks, which enables first and second adjacent sets to be read from the data array 336 concurrently and provided to the mux 346, as shown. From the first set selected by the set index 326 and from the second set selected by the incremented set index 3236, the mux 346 respectively selects the cache line data 202 of the way indicated by the first way select 341 and the cache line data 202 of the way indicated by the second way select 3241. In the case of a cache line-straddling load instruction, the first cache line data 202 includes the first portion of the load data, and the second cache line data 202 includes the second portion of the load data. The mux 346 also receives a third control input 3283 that indicates which bytes of the first and/or second cache lines to select for provision as the data out 327. The third control input 3283 may be generated based on the first BM0 3208, the second BM1 3209, split indicator 3297, and VA[5:3]. During execution of a cache line-straddling load instruction, the mux 346 uses the third control input 3283 to select the appropriate bytes from each of the first and second cache lines of data 202 to include the first and second portions of the load data on the data out 327.

During commit of a cache line-straddling load instruction, the first and second portions of the store data 1302 of the SQ entry 1301 can be written as data in 325 to first and second adjacent sets of the data array 336 specified respectively by the set index 326 and the incremented set index 3226. The way of the first set to be written is provided from the first store L1Dway0 field 1322 of the SQ entry 1301, and the way of the second set to be written is provided from the second store L1Dway1 field 1323 of the SQ entry 1301, which are populated during execution of the store instruction, as described below with respect to FIG. 33.

The second incrementor 3299 increments the load/store virtual address 321 at the least significant bit of the set index (e.g., increments load/store VA[63:6] 321) to generate an incremented load/store virtual address 3221 that is provided to the second tag hash logic 3212. Thus, in the case of a cache line-straddling load/store instruction, the incremented load/store virtual address 3221 is the virtual address associated with the second portion of the load/store data, i.e., the portion of the load/store data in the second cache line, and the load/store virtual address 321 is the virtual address associated with the first portion of the load/store data, i.e., the portion of the load/store data in the first cache line. The second tag hash logic 3212 hashes the incremented load/store virtual address 3221 to generate a second hashed tag 3224. Thus, the second hashed tag 3224 is similar to the first hashed tag 324 but is generated from the incremented load/store virtual address 3221, which is the virtual address of the second portion of the load/store data of a cache line-straddling load/store instruction, rather than from the load/store virtual address 321. That is, the second hashed tag 3224 is the hashed tag associated with the second cache line that includes the second portion of the load/store data.

The decrementer 3295 decrements the set index 326 to produce a decremented set index 3281 that is also provided to the second hashed tag array 3234 as a second set index for use when the second hashed tag array 3234 is written. The normal set index 326 is used when reading the second hashed tag array 3234, e.g., for an access to the L1 data cache 103 during execution of a load/store instruction. In this manner, the second hashed tag array 3234 is maintained as a single-set rotated copy of the first hashed tag array 334. That is, during allocation of an entry 201 into a way of the L1 data cache 103, the LSU 117 writes information (i.e., the hashed tag 324 is written to the hashed tag field 208, and the dPAP 323 is written to the dPAP field 209) to the first hashed tag array 334 into the way of a set indexed by the set index 326, and the LSU 117 writes the same information to the second hashed tag array 3234 into the same way but in the set indexed by the decremented set index 3281 rather than the set index 326. As a result, during execution of a load/store instruction that straddles a cache line boundary, when the LSU 117 uses the set index 326 to read both the first hashed tag array 334 and the second hashed tag array 3234, if the first hashed tag 324 hits in the first hashed tag array 334 (i.e., first miss 328 is false) then the first hashed tag array 334 will provide a first dPAP0 209 that is concatenated with VA[11:6] of the load/store virtual address 321 to form a first PAP0 3204, and if the second hashed tag 3224 hits in the second hashed tag array 3234 (second miss 3228 is false) then the second hashed tag array 3234 will provide a second dPAP1 209 that is concatenated with VA[11:6] of the load/store virtual address 321 to form a second PAP. In the embodiment of FIG. 32, each of the hashed tag arrays 334/3234 may be implemented as a single-ported RAM. In an alternate embodiment, a single dual-ported hashed tag array may be indexed concurrently by both the set index 326 and the incremented set index 3226.

The first formed PAP 3204 is a proxy for a first physical memory line address, and the second formed PAP 3205 is a proxy for a second physical memory line address. The first PAP comprises the set index and way number of the entry 401 of the L2 cache 107 that holds a copy of a first cache line at the first physical memory line address and which is implicated by the first portion of the cache line-straddling load/store instruction, and the second PAP comprises the set index and way number of the entry 401 of the L2 cache 107 that holds a copy of a second cache line at the second physical memory line address and which is implicated by the second portion of the cache line-straddling load/store instruction. In the case of a load/store instruction that does not straddle a cache line boundary, the second hit 3252, second way select 3241, second miss 3228, and second PAP1 3205 are effectively don't care values, i.e., they are not used by the LSU 117 to execute the load/store instruction.

Figure 33:
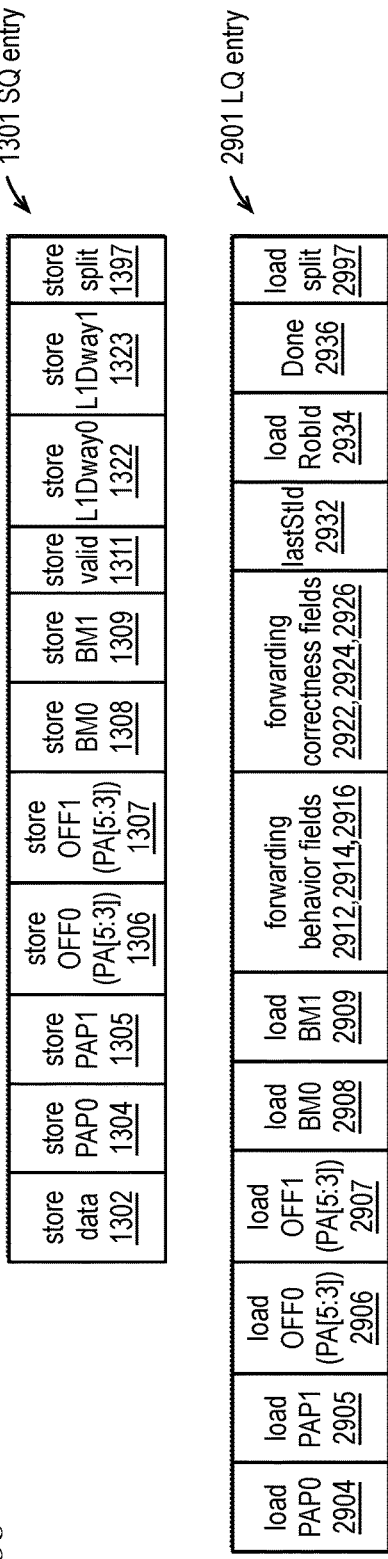
FIG. 33 is an example block diagram of a store queue (SQ) entry of the store queue of FIG. 1 that holds two PAPs and an example block diagram of a load queue (LQ) entry of the load queue of FIG. 1 that holds two PAPs to accomplish performance penalty-less execution of load/store instructions in accordance with embodiments of the present disclosure.

FIG. 33 is an example block diagram of a store queue (SQ) entry 1301 of the SQ 125 of FIG. 1 that holds two PAPs and an example block diagram of a load queue (LQ) entry 2901 of the LQ 125 of FIG. 1 that holds two PAPs to accomplish performance penalty-less execution of load/store instructions in accordance with embodiments of the present disclosure.

The SQ entry 1301 of FIG. 33 is similar in many respects to the SQ entry 1301 of FIG. 13. However, the SQ entry 1301 of FIG. 33 includes additional storage for storing a second store PAP1 1305, a second store offset (OFF1) 1307 which is untranslated store physical (and virtual) address bits [5:3], a second store byte mask (BM1) 1309, a first store L1Dway0 field 1322, a second store L1Dway1 field 1323, and a store split indicator 1397. In the example of FIG. 33, the store PAP 1304 of FIG. 13 is referred to as the first store PAP0 1304, the store PA[5:3] 1306 of FIG. 13 is referred to as the first store OFF0 1306, and the store BM 1308 of FIG. 13 is referred to as the first store BM0 1308. Population of the SQ entry 1301 of FIG. 33 is similar in many respects to the population described above with respect to FIGS. 13 and 15. However, the population of the second store PAP1 1305, second store OFF1 1307, second store BM1 1309, first store L1Dway0 1322, second store L1Dway1 1323, and store split indicator 1397 of the SQ entry 1301 of FIG. 33 are described with respect to FIG. 37. Having storage for a second store PAP1 1305 (and second store OFF1 1307, second store BM1 1309, and second store L1Dway1 1323) in the SQ entry 1301 enables the LSU 117 to maintain single-cycle throughput throughout the execution of the store instruction, in contrast to the conventional approaches described above.

The LQ entry 2901 of FIG. 33 is similar in many respects to the LQ entry 2901 of FIG. 29. However, the LQ entry 2901 of FIG. 33 includes additional storage for storing a second load PAP1 2905, a second load offset (OFF1) 2907 which is untranslated load physical (and virtual) address bits [5:3], a second load byte mask (BM1) 2909, and a load split indicator 2997. In the example of FIG. 33, the load PAP 1304 of FIG. 29 is referred to as the first load PAP0 2904, the load PA[5:3] 1306 of FIG. 29 is referred to as the first load OFF0 2906, and the load BM 2908 of FIG. 29 is referred to as the first load BM0 2908. Population of the LQ entry 2901 of FIG. 33 is similar in many respects to the population described above with respect to FIGS. 29 and 30. However, the population of the second load PAP1 2905, second load OFF1 2907, second load BM1 2909, and load split indicator 2997 of the LQ entry 2901 of FIG. 33 are described with respect to FIG. 38. Having storage for a second load PAP1 2905 (and second load OFF1 2907 and second load BM1 2909) in the SQ entry 1301 enables the LSU 117 to maintain single-cycle throughput throughout the execution of the load instruction, in contrast to the conventional approaches described above.

Figure 34:
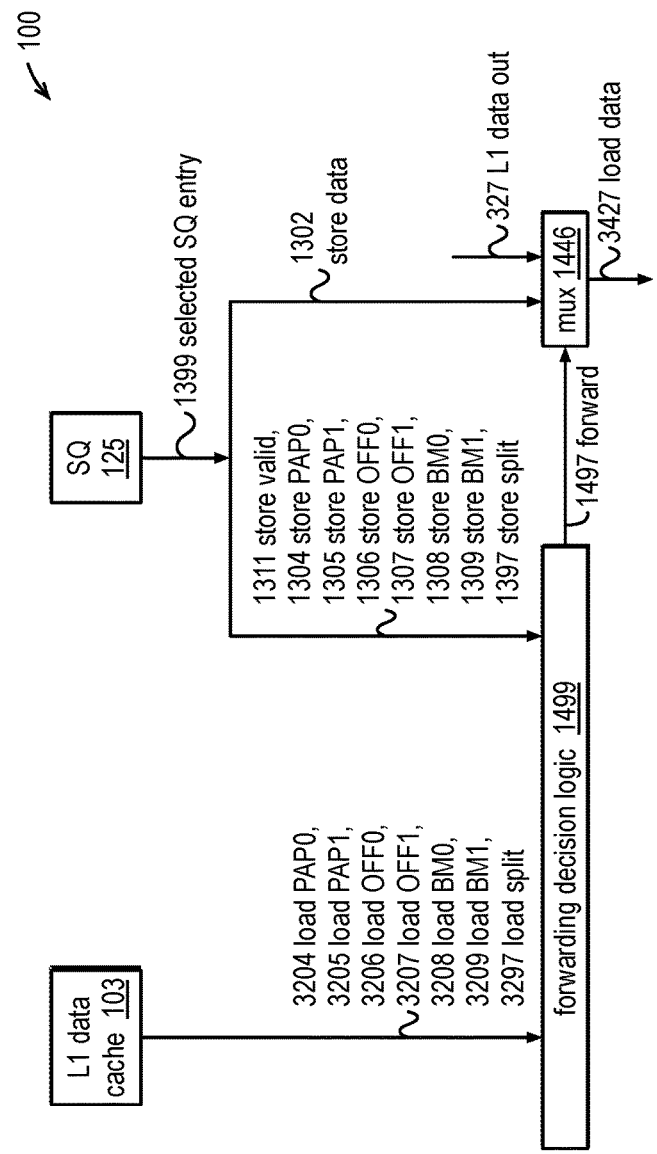
FIG. 34 is an example block diagram of portions of the processor of FIG. 1 used to execute a load instruction, including performing store-to-load forwarding using two PAPs of the load instruction that may straddle a cache line boundary and/or two PAPs of a store instruction that may straddle a cache line boundary in accordance with embodiments of the present disclosure.

FIG. 34 is an example block diagram of portions of the processor 100 of FIG. 1 used to execute a load instruction, including performing store-to-load forwarding using two PAPs of the load instruction that may straddle a cache line boundary and/or two PAPs of a store instruction that may straddle a cache line boundary in accordance with embodiments of the present disclosure. The processor 100 portions of FIG. 34 are similar in many respects to those of FIG. 14. However, the selected SQ entry 1399 of FIG. 34 includes the fields of the SQ entry 1301 of FIG. 33. Therefore, the forwarding decision logic 1499 also receives the second store PAP1 1305, second store OFF1 1307, second store BM1 1309, and store split indicator 1397 of the SQ entry 1301 of FIG. 33. Additionally, the L1 data cache 103 shown in FIG. 34 subsumes the byte mask logic 1491, the hashed tag array 334, tag hash logic 312, and comparator 348 of FIG. 14. The L1 data cache 103 provides a first load PAP0 3204 (i.e., first PAP0 3204 of FIG. 32), a second load PAP1 3205 (i.e., second PAP1 3205 of FIG. 32), a first load OFF0 3206 (i.e., first OFF0 3206 of FIG. 32), a second load OFF1 3207 (i.e., second OFF1 3207 of FIG. 32), a first load BM0 3208 (i.e., first BM0 3208 of FIG. 32), a second load BM1 3209 (i.e., second BM1 3209 of FIG. 32), and a load split indicator 3297 (i.e., split indicator 3297 of FIG. 32), whose values are generated according to the description of FIGS. 32 and 38 for writing into the LQ entry 2901. Similar to the description of FIG. 14, the forwarding decision logic 1499, based on its inputs, controls the mux 1446 via forward indicator 1497 to select either the store data 1302 of the selected SQ entry 1399 or the L1 data 327 as load data 3427. More specifically, the forwarding decision logic 1499 of FIG. 34 generates the forward indicator 1497 to make the forwarding decision based on the comparison results of four cross-product comparisons, as described with respect to FIG. 35, rather than based on a single comparison of the load and store PAP/OFF/BM as described with respect to FIG. 14.

Figure 35:
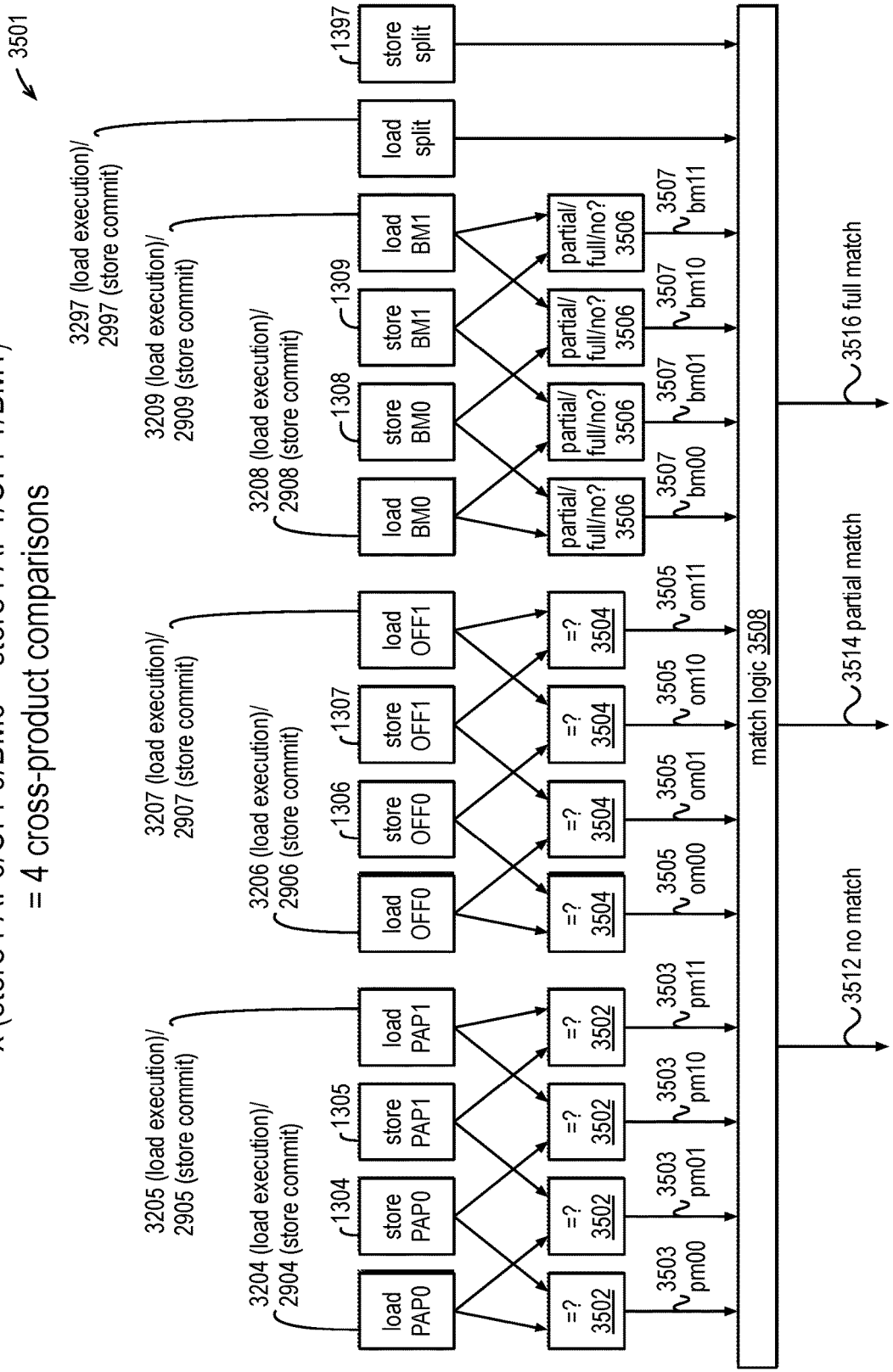
FIG. 35 is an example block diagram of four cross-product comparison logic to perform four cross-product comparisons for use in making a store-to-load forwarding decision and for use in making a store-to-load forwarding correctness check in accordance with embodiments of the present disclosure.

FIG. 35 is an example block diagram of four cross-product comparison logic 3501 to perform four cross-product comparisons for use in making a store-to-load forwarding decision and for use in making a store-to-load forwarding correctness check in accordance with embodiments of the present disclosure. The four comparisons are referred to as a cross-product because they are performed with respect to a load instruction and a store instruction, each of which has two sets of address information. The load instruction has a first set of load address information load PAP0/OFF0/BM0 and a second set of load address information load PAP1/OFF1/BM1. The store instruction has a first set of store address information store PAP0/OFF0/BM0 and a second set of store address information store PAP1/OFF1/BM1. The four comparisons are: (1) a comparison of the first load PAP0/OFF0/BM0 with the first store PAP0/OFF0/BM0, (2) a comparison of the first load PAP0/OFF0/BM0 with the second store PAP1/OFF1/BM1, (3) a comparison of the second load PAP1/OFF1/BM1 with the first store PAP0/OFF0/BM0, and (4) a comparison of the second load PAP1/OFF1/BM1 with the second store PAP1/OFF1/BM1.

The four cross-product comparison logic 3501 includes four comparators 3502 that perform four cross-product comparisons of a first load PAP0 3204/2904, a second load PAP1 3205/2905, a first store PAP0 1304, and a second store PAP1 1305. The first store PAP0 1304 and second store PAP1 1305 are from a SQ entry 1301. In the case of a load instruction execution during which a store-to-load forwarding decision is made (e.g., by forwarding decision logic 1499 of FIG. 34 according to the operation of FIG. 38), the first load PAP0 3204 and second load PAP1 3205 are provided by the L1 data cache 103 as described with respect to FIG. 32. In the case of a store instruction commit during which a store-to-load forwarding correctness check is made (e.g., according to the operation of FIG. 39), the first load PAP0 2904 and second load PAP1 2905 are provided by the LQ entry 2901 of FIG. 33 that is being checked. The first comparator 3502 generates a true value on a first PAP match indicator pm00 3503 if the first load PAP0 equals the first store PAP0. The second comparator 3502 generates a true value on a second PAP match indicator pm01 3503 if the first load PAP0 equals the second store PAP1. The third comparator 3502 generates a true value on a third PAP match indicator pm10 3503 if the second load PAP1 equals the first store PAP0. The fourth comparator 3502 generates a true value on a fourth PAP match indicator pm11 3503 if the second load PAP1 equals the second store PAP1. The four PAP match indicators pm00, pm01, pm10, and pm11 are provided to match logic 3508.

The four cross-product comparison logic 3501 also includes four comparators 3504 that perform four cross-product comparisons of a first load OFF0 3206/2906, a second load OFF1 3205/2905, a first store OFF0 1306, and a second store OFF1 1307. The first store OFF0 1306 and second store OFF1 1307 are from a SQ entry 1301. In the case of a load instruction execution during which a storeto-load forwarding decision is made (e.g., by forwarding decision logic 1499 of FIG. 34 according to the operation of FIG. 38), the first load OFF0 3206 and second load OFF1 3207 are provided by the L1 data cache 103 as described with respect to FIG. 32. In the case of a store instruction commit during which a store-to-load forwarding correctness check is made (e.g., according to the operation of FIG. 39), the first load OFF0 2906 and second load OFF1 2907 are provided by the LQ entry 2901 of FIG. 33 that is being checked. The first comparator 3504 generates a true value on a first offset match indicator om00 3505 if the first load OFF0 equals the first store OFF0. The second comparator 3504 generates a true value on a second offset match indicator om01 3505 if the first load OFF0 equals the second store OFF1. The third comparator 3504 generates a true value on a third offset match indicator om10 3505 if the second load OFF1 equals the first store OFF0. The fourth comparator 3504 generates a true value on a fourth offset match indicator om11 3505 if the second load OFF1 equals the second store OFF1. The four offset match indicators om00, om01, om10, and om11 are provided to match logic 3508.

The four cross-product comparison logic 3501 also includes four byte mask comparators 3506 that perform four cross-product byte mask comparisons of a first load BM0 3208/2908, a second load BM1 3207/2907, a first store BM0 1308, and a second store BM1 1309. The first store BM0 1308 and second store BM1 1309 are from a SQ entry 1301. In the case of a load instruction execution during which a store-to-load forwarding decision is made (e.g., by forwarding decision logic 1499 of FIG. 34 according to the operation of FIG. 38), the first load BM0 3208 and second load BM1 3209 are provided by the L1 data cache 103 as described with respect to FIG. 32. In the case of a store instruction commit during which a store-to-load forwarding correctness check is made (e.g., according to the operation of FIG. 39), the first load BM0 2908 and second load BM1 2909 are provided by the LQ entry 2901 of FIG. 33 that is being checked. Unlike the PAP comparators 3502 and the OFF comparators 3504 that test for equality, each byte mask comparator 3506 includes Boolean logic that performs bit-wise comparisons as follows.

Each of the byte mask comparators 3506 generates a respective byte mask comparison that indicates one of three possible conditions with respect to a load BM and a store BM: (1) all true bits of the load BM are a subset of the true bits of the store BM, (2) none of the true bits of the load BM are a subset of the true bits of the store BM, or (3) some but not all true bits of the load BM are a subset of the true bits of the store BM. In other words, the first condition (1) indicates the requested portion of the load data specified by the load BM is included in the valid bytes of the portion of the store data 1302 of the selected SQ entry 1399 specified by the store BM, assuming the corresponding load and store PAP match and the corresponding load and store OFF match. The second condition (2) indicates none of the requested portion of the load data specified by the load BM is included in the valid bytes of the portion of the store data 1302 of the selected SQ entry 1399 specified by the store BM. The third condition (3) indicates some but not all the requested portion of the load data specified by the load BM is included in the valid bytes of the portion of the store data 1302 of the selected SQ entry 1399 specified by the store BM, assuming the corresponding load and store PAP match and the corresponding load and store OFF match.

The first byte mask comparator 3506 generates a first byte mask comparison indicator bm00 3507 that indicates one of the three possible conditions (1), (2), or (3) with respect to the first load BM0 and the first store BM0. The second byte mask comparator 3506 generates a second byte mask comparison indicator bm01 3507 that indicates one of the three possible conditions with respect to the first load BM0 and the second store BM1. The third byte mask comparator 3506 generates a third byte mask comparison indicator bm10 3507 that indicates one of the three possible conditions with respect to the second load BM1 and the first store BM0. The fourth byte mask comparator 3506 generates a fourth byte mask comparison indicator bm11 3507 that indicates one of the three possible conditions with respect to the second load BM1 and the second store BM1. The four byte mask comparison indicators bm00, bm01, bm10, and bm11 are provided to match logic 3508.

Each time the four cross-product comparison logic 3501 performs a four cross-product comparison for use by the LSU 117 in making a store-to-load forwarding decision or a store-to-load forwarding correctness check, the match logic 3508 generates a true value on one and only one of a no match indicator 3512, a partial match indicator 3514, and a full match indicator 3516, whose meanings are explained below. There are four possible combinations the match logic 3508 considers when generating the match indicators 3512/3514/3516: the first load-first store (FLFS) combination based on pm00, om00, and bm00; the first load-second store (FLSS) combination based on pm01, om01, and bm01; the second load-first store (SLFS) combination based on pm10, om10, and bm10; and the second load-second store (SLSS) combination based on pm11, om11, and bm11.

Depending upon the value of the store split indicator 1397 and the load split indicator 2997/3297, the match logic 3508 considers one, two or four of the four possible combinations. If the store split indicator 1397 and the load split indicator 2997/3297 are both true, the match logic 3508 considers all four of the four possible combinations: FLFS, FLSS, SLFS, and SLSS. If the store split indicator 1397 is true and the load split indicator 2997/3297 is false, the match logic 3508 considers only two of the four possible combinations: FLFS and FLSS. If the store split indicator 1397 is false and the load split indicator 2997/3297 is true, the match logic 3508 considers only two of the four possible combinations: FLFS and SLFS. If the store split indicator 1397 and the load split indicator 2997/3297 are both false, the match logic 3508 considers only one of the four possible combinations: FLFS.

The match logic 3508 generates the match indicators 3512/3514/3516 as follows. The match logic 3508 generates a true value on a full match indicator 3516 if the pm and om indicators are true for at least one of the considered combinations, and for each combination of the considered combinations the following is true: if the pm and om indicators are true for the combination, then the bm indicator for the combination indicates condition (1) above. The match logic 3508 generates a true value on a no match indicator 3512 if for all considered combinations the pm and/or om indicator is false, or for each combination of the considered combinations the following is true: if the pm and om indicators are true for the combination, then the bm indicator for the combination indicates condition (2) above. The match logic 3508 generates a true value on a partial match indicator 3514 if the pm and om indicators are true for at least one of the considered combinations, and for any combination of the considered combinations the following is true: if the pm and om indicators are true for the combination, then the bm indicator for the combination indicates condition (3) above.

Figure 36:
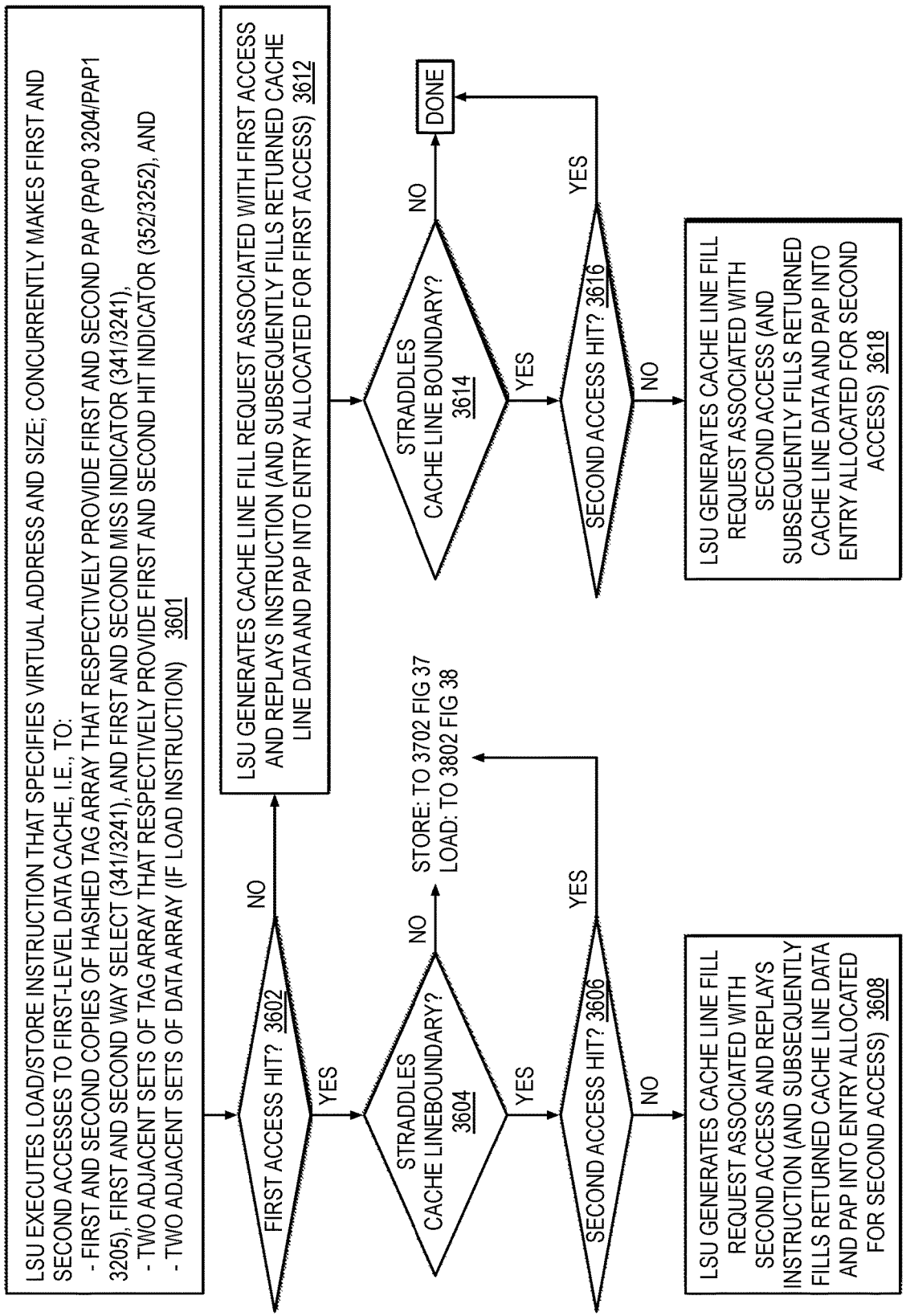
FIG. 36 is an example flowchart illustrating operation of the processor of FIG. 1 to execute a load/store instruction that straddles a cache line boundary in accordance with embodiments of the present disclosure.
Figure 38:
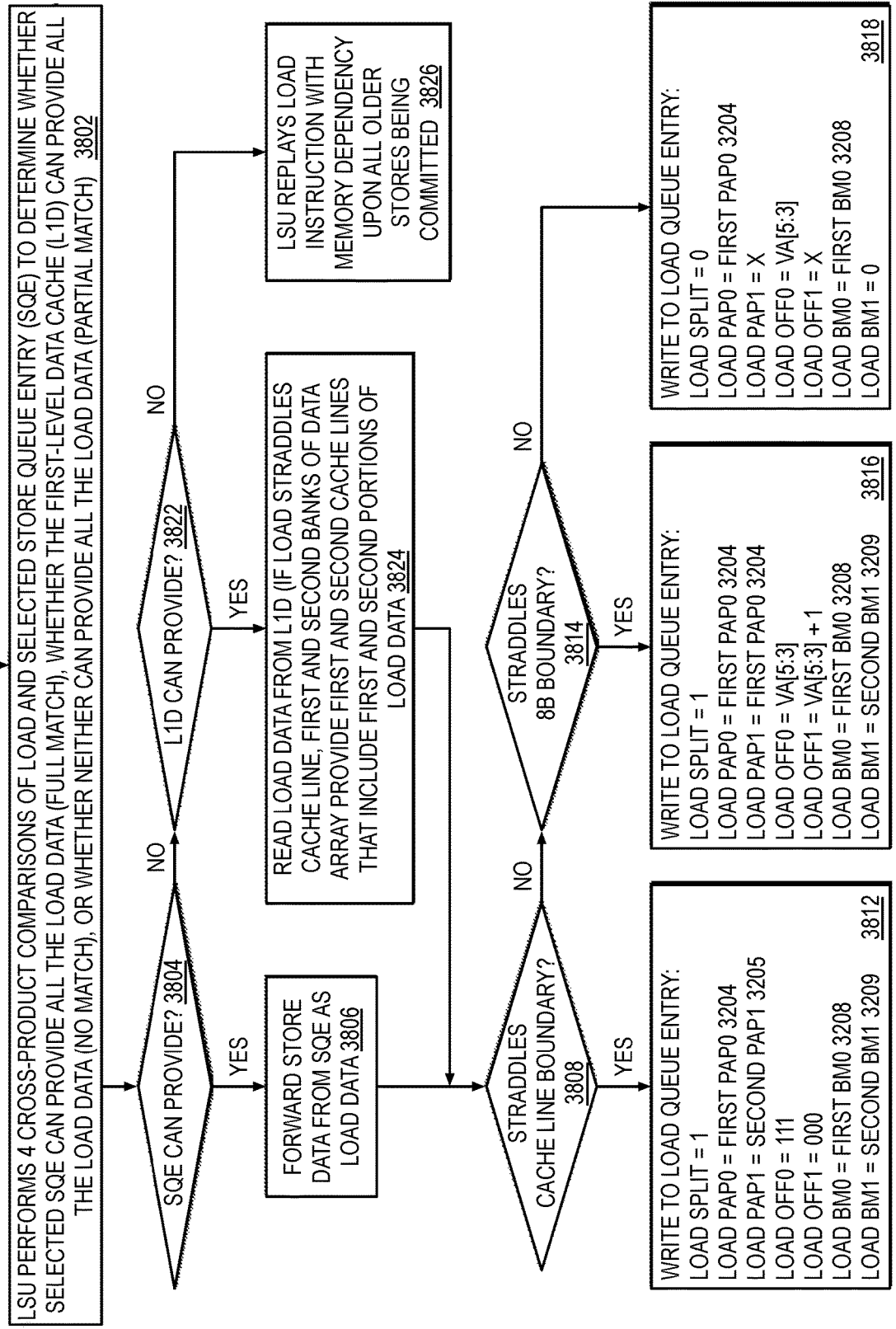
FIG. 38 is an example flowchart illustrating execution continued from FIG. 36 of a load instruction that includes writing two load PAPs into a load queue entry in accordance with embodiments of the present disclosure.
Figure 39:
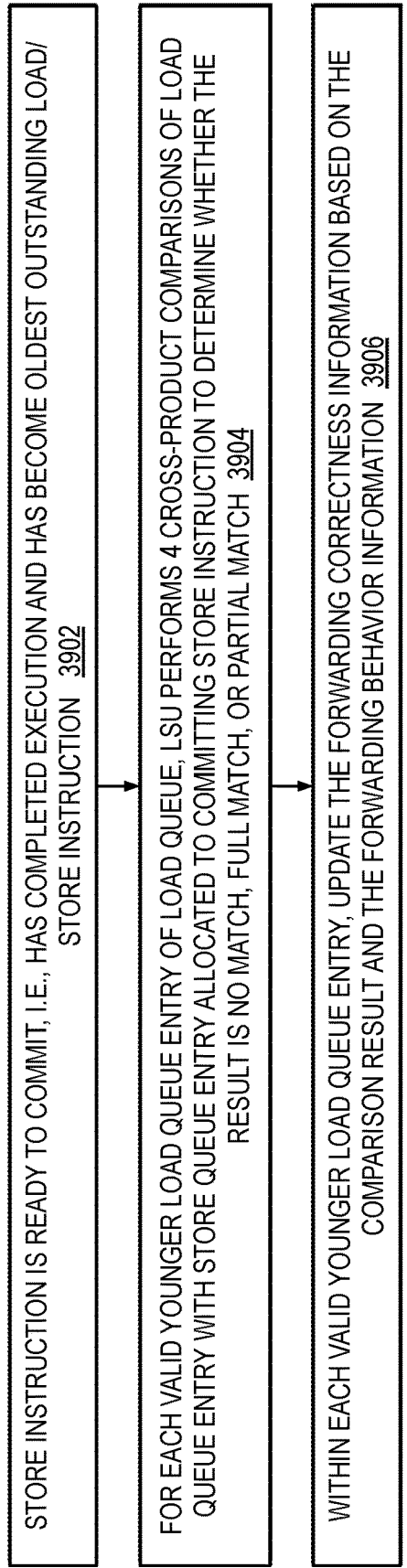
FIG. 39 is an example flowchart illustrating operation of the load/store unit (LSU) to commit a store instruction that is oldest in program order in accordance with embodiments of the present disclosure.

The LSU 117 uses the full match indicator 3516, no match indicator 3512, and partial match indicator 3514 to make store-to-load forwarding determinations during execution of a load instruction, e.g., as described with respect to FIGS. 36 and 38, and to make store-to-load forwarding correctness checks during commit of a store instruction, e.g., as described with respect to FIG. 39. Advantageously, the four cross-comparisons of the PAPs made by comparators 3502 associated with the first and second portions of the load data and the first and second portions of the store data are smaller and may be performed faster than comparisons of physical memory line addresses, which are much larger, e.g., approximately twice as large. Additionally, storage space requirements within the load queue 125 and the store queue 125 are reduced over an implementation that stores two physical memory line addresses in each load queue entry and each store queue entry. The faster PAP comparisons and the reduction in storage space make feasible the embodiments described that accomplish performance penalty-less execution of cache line boundary-straddling load and store instructions by holding two PAPs per LQ entry 2901 and holding two PAPs per SQ entry 1301. Additionally, the L1 data cache 103 provides two PAPs during execution of a load instruction (e.g., via two copies of the hashed tag array 334/3234 or in an alternate embodiment via a single dual-ported hashed tag array indexed concurrently by both the set index 326 and the incremented set index 3226) which facilitates the four smaller and faster comparisons of PAPs (rather than four comparisons of physical memory line addresses) during load instruction execution. Finally, in an embodiment such as described above with respect to FIG. 21 in which all entries 1301 of the store queue 125 are compared against to perform a store-to-load forwarding decision rather than comparing against a single SQ entry 1301 (e.g., as in the embodiments of FIGS. 14, 18, 19 and 20), the number of required comparators 3502 is significantly increased (i.e., by the number of entries 1301 in the store queue 125), in which case the smaller and faster PAP comparisons versus larger and slower physical memory line address comparisons are a further benefit.

FIG. 36 is an example flowchart illustrating operation of the processor 100 of FIG. 1 to execute a load/store instruction that straddles a cache line boundary in accordance with embodiments of the present disclosure. Operation begins at block 3601.

At block 3601, the LSU 117 executes a load/store instruction that specifies a virtual address (e.g., load/store virtual address 321 of FIG. 32) and that specifies a size in bytes of the load/store data (e.g., load/store size 3289 of FIG. 32). The LSU 117 concurrently makes first and second accesses to the L1 data cache 103. More specifically, as described above with respect to FIGS. 32 and 34, a set is selected in the first hashed tag array 334 using the set index 326, and a set is selected in the second hashed tag array 3234 using the set index 326. The first hashed tag 324 is looked up in the selected set of the first hashed tag array 334, resulting in provision of the first way select 341, the first miss indicator 328, and the first PAP0 3204. The second hashed tag 3224 is concurrently looked up in the selected set of the second hashed tag array 3234, resulting in concurrent provision of the second way select 3241, the second miss indicator 3228, and the second PAP1 3205. Additionally, first and second adjacent sets in the tag array 332 (e.g., in two respective adjacent banks) are concurrently selected by the set index 326 and incremented set index 3226, respectively. The tag 322 is concurrently looked up in each of the first and second selected sets, resulting in concurrent provision of the first hit indicator 352 and the second hit indicator 3252 based on the first way select 341 and second way select 3241, respectively. Still further, in the case of a load instruction, first and second adjacent sets in the data array 336 (e.g., in two respective adjacent banks) are concurrently selected by the set index 326 and incremented set index 3226, respectively. Operation proceeds to decision block 3602.

At decision block 3602, if the first hit indicator 352 is true, operation proceeds to decision block 3604; otherwise, operation proceeds to block 3612.

Figure 37:
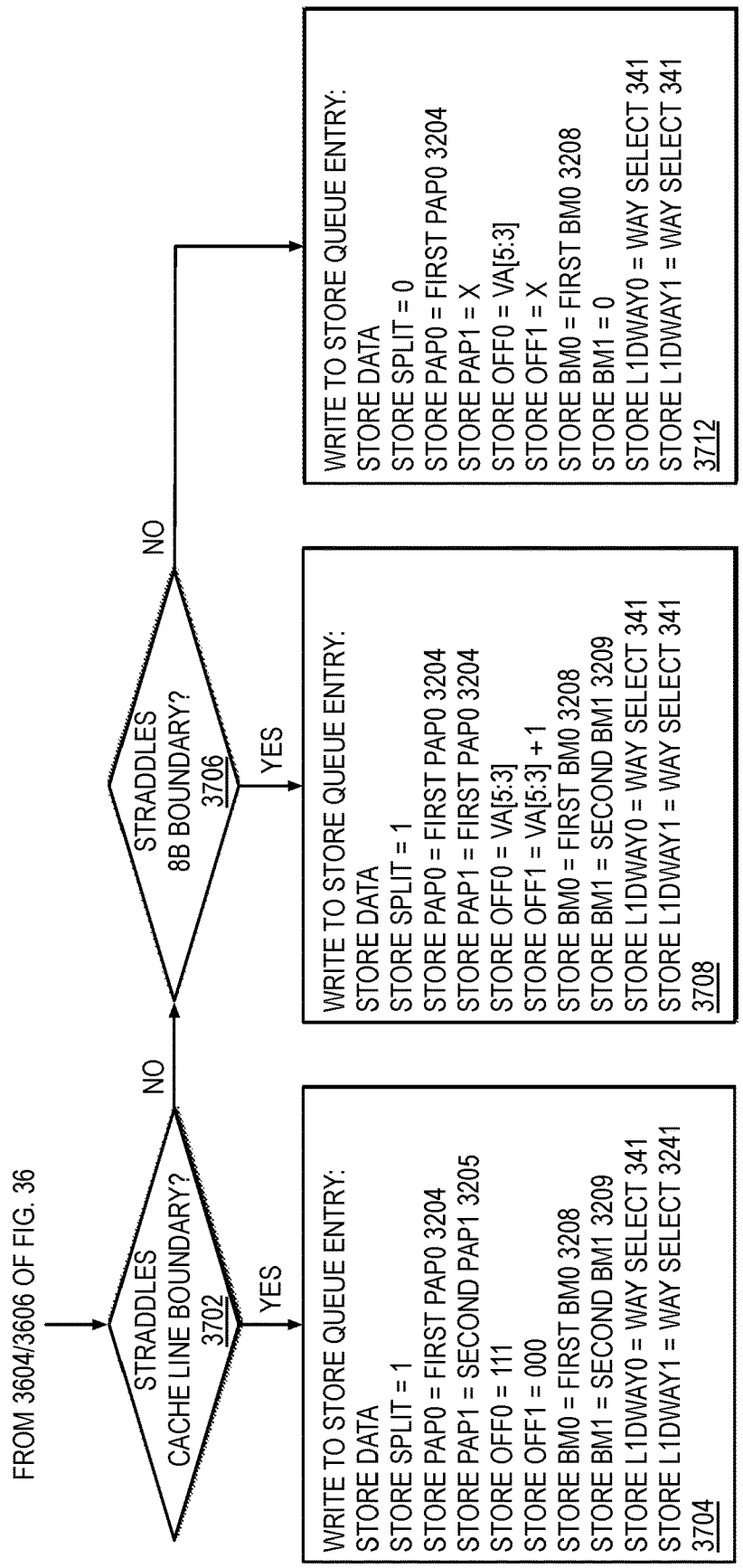
FIG. 37 is an example flowchart illustrating execution continued from FIG. 36 of a store instruction that includes writing two store PAPs into a store queue entry in accordance with embodiments of the present disclosure.

At decision block 3604, if the load/store data straddles a cache line boundary (e.g., split indicator 3297 is true and VA[5:3] are all binary 1's), operation proceeds to decision block 3606; otherwise, operation proceeds to block 3702 of FIG. 37 in the case of a store instruction, or to block 3802 of FIG. 38 in the case of a load instruction.

At decision block 3606, if the second hit indicator 3252 is true, operation proceeds to block 3702 of FIG. 37 in the case of a store instruction, or to block 3802 of FIG. 38 in the case of a load instruction; otherwise, operation proceeds to block 3608.

At block 3608, the LSU 117 generates a cache line fill request associated with the second access to obtain the cache line implicated by the incremented load/store virtual address 3221, or more specifically the cache line specified by the physical memory line address into which the incremented load/store virtual address 3221 is translated (e.g., by the DTLB 141 of FIG. 1). The LSU 117 also replays the load/store instruction, i.e., the LSU 117 returns the load/store instruction to the scheduler 121 with a dependency on the return of the fill request. When the L2 cache 107 subsequently returns the fill request, the LSU 117 fills the returned cache line data and PAP into the entry 201 of the L1 data cache 103 allocated for the second access.

At block 3612, the LSU 117 generates a cache line fill request associated with the first access to obtain the cache line implicated by the load/store virtual address 321, or more specifically the cache line specified by the physical memory line address into which the load/store virtual address 321 is translated (e.g., by the DTLB 141 of FIG. 1). The LSU 117 also replays the load/store instruction, i.e., the LSU 117 returns the load/store instruction to the scheduler 121 with a dependency on the return of the fill request. When the L2 cache 107 subsequently returns the fill request, the LSU 117 fills the returned cache line data and PAP into the entry 201 of the L1 data cache 103 allocated for the first access. Operation proceeds to decision block 3614.

At decision block 3614, if the load/store data straddles a cache line boundary (e.g., split indicator 3297 is true and VA[5:3] are all binary 1's), operation proceeds to decision block 3616; otherwise, operation ends (until the cache line fill returns, as described with respect to block 3612 and FIG. 7).

At decision block 3616, if the second hit indicator 3252 is true, operation ends (until the cache line fill returns, as described with respect to block 3612 and FIG. 7); otherwise, operation proceeds to block 3618.

At block 3618, the LSU 117 generates a cache line fill request associated with the second access to obtain the cache line implicated by the incremented load/store virtual address 3221, or more specifically the cache line specified by the physical memory line address into which the incremented load/store virtual address 3221 is translated (e.g., by the DTLB 141 of FIG. 1). When the L2 cache 107 subsequently returns the fill request, the LSU 117 fills the returned cache line data and PAP into the entry 201 of the L1 data cache 103 allocated for the second access.

FIG. 37 is an example flowchart illustrating execution continued from block 3604/3606 of FIG. 36 of a store instruction that includes writing two store PAPs into a store queue entry in accordance with embodiments of the present disclosure. Operation continues at decision block 3702.

At decision block 3702, the LSU 117 determines whether the store instruction straddles a cache line boundary. If so, operation proceeds to block 3704; otherwise, operation proceeds to decision block 3706.

At block 3704, the LSU 117 writes the following to the SQ entry 1301 allocated to the store instruction. The LSU 117 writes: the store data 325 to the store data 1302; a true value to the store split indicator 1397; the first PAP0 3204 to the first store PAP0 1304; the second PAP1 3205 to the second store PAP1 1305; binary 111 to the first store OFF0 1306 since the first portion of the store data is in the last 8-byte block of the first cache line; binary 000 to the second store OFF1 1307 since the second portion of the store data is in the first 8-byte block of the second cache line; first BM0 3208 to the first store BM0 1308, which are trailing binary ones of the overall store byte mask; second BM1 3209 to the second store BM1 1309, which are leading binary ones of the overall store byte mask; the first way select 341 to the store L1Dway0 field 1322; and the second way select 3241 to the L1Dway1 field 1323.

At decision block 3706, the LSU 117 determines whether the store instruction straddles an 8-byte aligned address boundary. If so, operation proceeds to block 3708; otherwise, operation proceeds to block 3712.

At block 3708, the LSU 117 writes the following to the SQ entry 1301 allocated to the store instruction. The LSU 117 writes: the store data 325 to the store data 1302; a true value to the store split indicator 1397; the first PAP0 3204 to the first store PAP0 1304; the first PAP0 3205 to the second store PAP1 1305, since a single cache line is implicated; VA[5:3] to the first store OFF0 1306; VA[5:3]+1 to the second store OFF1 1307 since the second portion of the store data is in the next adjacent 8-byte block of the same cache line; first BM0 3208 to the first store BM0 1308, which are trailing binary ones of the overall store byte mask; second BM1 3209 to the second store BM1 1309, which are leading binary ones of the overall store byte mask; and the first way select 341 to the store L1Dway0 field 1322 and to the L1Dway1 field 1323, since a single cache line and therefore single way is implicated.

At block 3712, the LSU 117 writes the following to the SQ entry 1301 allocated to the store instruction. The LSU 117 writes: the store data 325 to the store data 1302; a false value to the store split indicator 1397; the first PAP0 3204 to the first store PAP0 1304; the second store PAP1 1305 is a don't care value since a single cache line is implicated; VA[5:3] to the first store OFF0 1306; the second store OFF1 1307 is a don't care value since a single cache line is implicated; first BM0 3208 to the first store BM0 1308; binary zero to the second store BM1 1309; and the first way select 341 to the store L1Dway0 field 1322 and to the L1Dway1 field 1323, since a single cache line and therefore single way is implicated.

In the manner described with respect to FIGS. 36 and 37, the LSU 117 advantageously maintains single-cycle throughput throughout the execution of a cache line boundary-straddling store instruction, in contrast to the conventional approaches described above. Another advantage of the embodiments described is that they may consume less storage space and facilitate improved comparison timing characteristics over an approach in which a SQ entry 1301 holds two physical memory line addresses, rather than two PAPs. The embodiments described enable comparisons of two store PAPs with one or two load PAPs rather than comparison of two store physical memory line addresses with one or two load physical memory line addresses. Since the PAPs are significantly smaller than a physical memory line address, e.g., more than half the size, the comparisons are faster, and the amount of storage required is significantly less. This is particularly true in the case of a single-cycle throughput execution of a cache-line boundary-straddling store instruction embodiment since, in the absence of the two store PAPs, two store physical memory line addresses would need to be held for in each SQ entry 1301, and up to four physical memory line address comparisons would need to be performed for each store-to-load forwarding determination (in the case that the load instruction also straddles a cache line boundary, and two otherwise), and up to four physical memory line address comparisons would need to be performed for each store-to-load forwarding check per valid load queue entry (in the case that the load instruction also straddles a cache line boundary, and two otherwise). Still a further advantage is that the embodiments maintain single-cycle throughput throughout the execution of a store instruction even if it straddles a page boundary. This is because the two different cache lines that are implicated by the straddle may be in two different pages and will still be executed with single-cycle throughput since the first and second store PAPs are proxies of the first and second store physical memory line addresses, which may be in different physical memory pages.

FIG. 38 is an example flowchart illustrating execution continued from block 3604/3606 of FIG. 36 of a load instruction that includes writing two load PAPs into a load queue entry in accordance with embodiments of the present disclosure. Operation begins at block 3802.

At block 3802, the LSU 117 performs four cross-product comparisons, as described with respect to FIG. 35, with respect to the load instruction being executed and a store instruction associated with the selected SQ entry 1399 of FIG. 34. The LSU 117 uses the four cross-product comparisons to make a determination whether the selected SQ entry 1399 can provide all the load data requested by the load instruction (e.g., indicated by a true value of the full match indicator 3516), whether the L1 data cache 103 can provide all the load data requested by the load instruction (e.g., indicated by a true value of the no match indicator 3512), or whether neither the SQ entry 1301 nor the L1 data cache 103 can provide all the load data requested by the load instruction (e.g., indicated by a true value of the partial match indicator 3514). Operation proceeds to decision block 3804.

At decision block 3804, if the selected SQ entry 1399 can provide all the requested load data, operation proceeds to block 3806; otherwise, operation proceeds to decision block 3822.

At block 3806, the LSU 117 forwards the store data 1302 from the selected SQ entry 1399 as the load data to the load instruction, as described above with respect to FIG. 34. Operation proceeds to decision block 3808.

At decision block 3808, the LSU 117 determines whether the load instruction straddles a cache line boundary. If so, operation proceeds to block 3812; otherwise, operation proceeds to decision block 3814.

At block 3812, the LSU 117 writes the following to the LQ entry 1301 allocated to the load instruction. The LSU 117 writes: a true value to the load split indicator 2997; the first PAP0 3204 to the first load PAP0 2904; the second PAP1 3205 to the second load PAP1 2905; binary 111 to the first load OFF0 2906 since the first portion of the load data is in the last 8-byte block of the first cache line; binary 000 to the second load OFF1 2907 since the second portion of the load data is in the first 8-byte block of the second cache line; first BM0 3208 to the first load BM0 2908, which are trailing binary ones of the overall load byte mask; and second BM1 3209 to the second load BM1 2909, which are leading binary ones of the overall load byte mask.

At decision block 3814, the LSU 117 determines whether the load instruction straddles an 8-byte aligned address boundary. If so, operation proceeds to block 3816; otherwise, operation proceeds to block 3818.

At block 3816, the LSU 117 writes the following to the LQ entry 2901 allocated to the load instruction. The LSU 117 writes: a true value to the load split indicator 2997; the first PAP0 3204 to the first load PAP0 2904; the first PAP0 3205 to the second load PAP1 2905, since a single cache line is implicated; VA[5:3] to the first load OFF0 2906; VA[5:3]+1 to the second load OFF1 2907 since the second portion of the load data is in the next adjacent 8-byte block of the same cache line; first BM0 3208 to the first load BM0 2908, which are trailing binary ones of the overall load byte mask; and second BM1 3209 to the second load BM1 2909, which are leading binary ones of the overall load byte mask.

At block 3818, the LSU 117 writes the following to the LQ entry 2901 allocated to the load instruction. The LSU 117 writes: a false value to the load split indicator 2997; the first PAP0 3204 to the first load PAP0 2904; the second load PAP1 2905 is a don't care value since a single cache line is implicated; VA[5:3] to the first load OFF0 2906; the second load OFF1 2907 is a don't care value since a single cache line is implicated; first BM0 3208 to the first load BM0 2908; and binary zero to the second load BM1 2909.

At decision block 3822, if the L1 data cache 103 can provide all the requested load data, operation proceeds to block 3824; otherwise, operation proceeds to block 3826.

At block 3824, the load data is read from the L1 data cache 103, as described above with respect to FIG. 34. If the load data straddles a cache line boundary, based on the first way select 341, from the first bank of the first selected set of the data array 336, the mux 346 selects a first cache line that includes the first portion of the load data; additionally, based on the second way select 3241, from the second bank of the second selected set of the data array 336, the mux 346 selects a second cache line that includes the second portion of the load data. That is, the data out 327 includes the first portion of the load data if the first hit indicator 352 is true and includes the second portion of the load data if the second hit indicator 3252 is true. Operation proceeds to decision block 3808.

At block 3826, the LSU 117 replays the load instruction, i.e., sends the load/store instruction back to the scheduler 121, and creates a dependency of the load instruction upon all older store instructions being committed before the load instruction can be re-issued to the LSU 117 for execution. The dependency ensures that upon replay the load instruction will be able to obtain all its load data from the L1 data cache 103.

In the manner described with respect to FIGS. 36 and 38, the LSU 117 advantageously maintains single-cycle throughput throughout the execution of a cache line boundary-straddling load instruction, in contrast to the conventional approaches described above. Another advantage of the embodiments described is that they may consume less storage space and facilitate improved comparison timing characteristics over an approach in which a LQ entry 2901 holds two load physical memory line addresses, rather than two load PAPs. The embodiments described enable comparisons of two load PAPs with one or two store PAPs rather than comparison of two load physical memory line addresses with one or two store physical memory line addresses. Since the PAPs are significantly smaller than a physical memory line address, e.g., more than half the size, the comparisons are faster, and the amount of storage required is significantly less. This is particularly true in the case of a single-cycle throughput execution of a cache-line boundary-straddling load instruction embodiment since, in the absence of the two load PAPs, two load physical memory line addresses would need to be stored in each LQ entry 2901, and up to four physical memory line address comparisons would need to be performed for each store-to-load forwarding determination (in the case that the store instruction also straddles a cache line boundary, and two otherwise), and up to four physical memory line address comparisons would need to be performed for each store-to-load forwarding check for each load queue entry (in the case that the store instruction also straddles a cache line boundary, and two otherwise). Still a further advantage is that the embodiments maintain single-cycle throughput throughout the execution of a load instruction even if it straddles a page boundary. This is because the two different cache lines that are implicated by the straddle may be in two different pages and will still be executed with single-cycle throughput since the first and second load PAPs are proxies of the first and second load physical memory line addresses, which may be in different physical memory pages.

FIG. 39 is an example flowchart illustrating operation of the LSU 117 to commit a store instruction that is oldest in program order in accordance with embodiments of the present disclosure. More specifically, FIG. 39 describes in more detail the operation at block 3006 of FIG. 30 according to store commit embodiments that enable the performance penalty-less execution of load and/or store instructions that straddle a cache line boundary. Operation begins at block 3902.

At block 3902, a store instruction is ready to be committed. That is, the store instruction has completed execution, does not need to be aborted, and has become the oldest load/store instruction among all outstanding load and store instructions. Committing the store instruction includes the LSU 117 writing the store data 1302 from the SQ entry 1301 to the L1 data cache 103, e.g., as described above with respect to FIG. 27, which may involve writing a first portion of the store data to a first entry 201 that holds a first cache line and writing a second portion of the store data to a second entry 201 that holds a second cache line in the case of a cache-line straddling store instruction. Operation proceeds to block 3904.

At block 3904, the store instruction that is being committed still has an allocated SQ entry 1301. For each valid LQ entry 2901 of the load queue 125 that is younger in program order than the store instruction that is being committed, the LSU 117 performs four cross-product comparisons, as described with respect to FIG. 35, with respect to the valid LQ entry 2901 and the allocated SQ entry 1301. As described above, the four cross-product comparisons indicate either no match 3512, a full match 3516, or a partial match 3514. The LSU 117 considers the no match 3512, full match 3516, and partial match 3514 indicators when updating the forwarding correctness information at block 3906, as described below. Operation proceeds to block 3906.

At block 3906, for each valid younger LQ entry 2901, the LSU 117 updates the forwarding correctness information, as needed, based on the result of the associated four comparisons made at block 3904, e.g., upon the no match 3512, full match 3516, and partial match 3514 indicators, and based on the forwarding behavior information. As described above with respect to FIG. 31A, for a given load instruction associated with a valid younger LQ entry 2901, the whole operation 3006 of FIGS. 30 and 39, including the operation at block 3906 to update the forwarding correctness information, may be performed multiple times since multiple older store instructions may be committed before the load instruction becomes the oldest load/store instruction and is committed. Consequently, the forwarding correctness information may be updated with each store instruction commit, e.g., FwdingViol 2924 may be set to true and FwdingGood 2912 may be set to false as the operation at block 3906 is performed for a first older store instruction that is committed, however FwdingViol 2924 may be set to false and FwdingGood 2912 may be set to true as the operation at block 3906 is performed for a second older store instruction that is committed, and then FwdingViol 2924 may be set to true and FwdingGood 2912 may be set to false as the operation at block 3906 is performed for a third older store instruction that is committed, and this updating may occur multiple times until all older store instructions have been committed. However, it is the resting state of the forwarding correctness information that is ultimately used at block 3012 of FIG. 30 to determine whether a forwarding violation occurred. The forwarding correctness information for a LQE 2901 is updated at block 3906 as described with respect to block 3106 of FIG. 31A based on the no match 3512, full match 3516, and partial match 3514 indicators generated at block 3904.

Advantageously, performance penalty-less execution of cache line boundary-straddling load and store instructions is supported by the store-to-load forwarding correctness checks performed at commit of a store instruction according to FIG. 39 by performing the four comparisons of PAPs rather than four comparisons of physical memory line addresses, which has a first advantage that the four PAP comparisons are faster than four physical memory line address comparisons and which has a second advantage of reduced storage space within the load queue 125 and the store queue 125 over an implementation that stores two physical memory line addresses in each load queue entry and each store queue entry.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:
1. A microprocessor, comprising:
a physically-indexed physically-tagged second-level set-associative cache, wherein each entry of the second-level cache is configured to hold a copy of a line of memory and is uniquely identified by a set index and a way;
a store queue; and
a load/store unit configured to, during execution of a store instruction having store data:
  detect that, based on a store virtual address and a data size specified by the store instruction, a first portion of the store data is to be written to a first line of memory specified by a first store physical memory line address and that a second portion of the store data is to be written to a second line of memory different from the first line of memory and specified by a second store physical memory line address;
  write all the store data to an entry of the store queue allocated to the store instruction; and
  write to the allocated store queue entry first and second store physical address proxies (PAPs) for the first and second store physical memory line addresses, respectively, wherein the first store PAP comprises the set index and way that uniquely identifies an entry of the second-level cache that holds a copy of the first line of memory specified by the first store physical memory line address, wherein the second store PAP comprises the set index and way that uniquely identifies an entry of the second-level cache that holds a copy of the second line of memory specified by the second store physical memory line address;

wherein the entries of the store queue are absent storage for holding the first and second store physical memory line addresses.

2. The microprocessor of claim 1, further comprising:
a virtually-indexed virtually-tagged first-level set-associative data cache configured to, in response to the store virtual address hitting in a pair of entries of the first-level data cache, provide the first and second store PAPs for writing into the allocated store queue entry.

3. The microprocessor of claim 2,
wherein the first-level data cache is configured to, in response to a load virtual address specified by a load instruction that hits in a pair of entries of the first-level data cache, provide first and second load PAPs for respective first and second load physical memory line addresses, wherein the first load PAP comprises the set index and way that uniquely identifies an entry of the second-level cache that holds a copy of a first line of memory specified by the first load physical memory line address, wherein the second load PAP comprises the set index and way that uniquely identifies an entry of the second-level cache that holds a copy of a second line of memory specified by the second load physical memory line address; and
wherein the load/store unit is configured to, during execution of the load instruction that requests load data:
   detect that, based on a load virtual address and a data size specified by the load instruction, a first portion of the load data is to be read from the first line of memory specified by the first load physical memory line address and that a second portion of the load data is to be read from a second line of memory different from the first line of memory and specified by the second load physical memory line address; and
   use comparisons of the first and second store PAPs held in the allocated store queue entry with each of the first and second load PAPs received from the first-level data cache in making a decision whether to forward to the load instruction the store data held in the allocated store queue entry.

4. The microprocessor of claim 3, further comprising:
a load queue;
wherein the load/store unit is configured to, during execution of the load instruction:
   write the first and second load PAPs to an entry of the load queue allocated for the load instruction; and
wherein the load/store unit is configured to, during commit of the store instruction:
   write the store data to the first-level data cache; and
   use comparisons of the first and second store PAPs held in the allocated store queue entry with each of the first and second load PAPs held in the allocated load queue entry to make a store-to-load forwarding correctness check with respect to the load instruction from the store instruction.

5. The microprocessor of claim 1,
wherein the load/store unit maintains single-cycle throughput throughout the execution of the store instruction even though the first and second portions of the store data are to be written to different lines of memory.

6. The microprocessor of claim 1,
wherein the load/store unit executes the store instruction with a same performance as the load/store unit executes a store instruction whose store data is to be written to a single line of memory.

7. The microprocessor of claim 1,
wherein the first and second lines of memory are in different pages of memory.

8. The microprocessor of claim 1,
wherein the load/store unit is further configured to set a split indicator of the allocated store queue entry to a true value, in response to detecting that the first and second portions of the store data are to be written to different lines of memory.

9. The microprocessor of claim 8,
wherein the load/store unit is configured to detect, during execution of a second store instruction having second store data and based on a store virtual address and a data size specified by the second store instruction, that a first portion of the second store data is to be written to a first 8-byte-address-aligned block of memory and that a second portion of the second store data is to be written to a second 8-byte-address-aligned block of memory different from the first 8-byte-address-aligned block; and
wherein the load/store unit is further configured to set the split indicator of a store queue entry allocated to the second store instruction to a true value, in response to detecting that the first and second portions of the second store data are to be written to the different 8-byte-address-aligned blocks.

10. A microprocessor, comprising:
a physically-indexed physically-tagged second-level set-associative cache, wherein each entry of the second-level cache is configured to hold a copy of a line of memory and is uniquely identified by a set index and a way;
a load queue; and
a load/store unit configured to, during execution of a load instruction that requests load data:
   detect that, based on a load virtual address and a data size specified by the load instruction, a first portion of the load data is to be read from a first line of memory specified by a first load physical memory line address and that a second portion of the load data is to be read from a second line of memory different from the first line of memory and specified by a second load physical memory line address; and
   write to an entry of the load queue allocated to the load instruction first and second load physical address proxies (PAPs) for the first and second load physical memory line addresses, respectively, wherein the first load PAP comprises the set index and way that uniquely identifies an entry of the second-level cache that holds a copy of the first line of memory specified by the first load physical memory line address, wherein the second load PAP comprises the set index and way that uniquely identifies an entry of the second-level cache that holds a copy of the second line of memory specified by the second load physical memory line address;
wherein the entries of the load queue are absent storage for holding the first and second load physical memory line addresses.

11. The microprocessor of claim 10, further comprising:
a store queue;
wherein the load/store unit is further configured to, during execution of a store instruction having store data, prior to the execution of the load instruction:
   detect that, based on a store virtual address and a data size specified by the store instruction, a first portion of the store data is to be written to a first line of memory specified by a first store physical memory line address and that a second portion of the store data is to be written to a second line of memory different from the first line of memory and specified by a second store physical memory line address;
write all the store data to an entry of the store queue allocated to the store instruction; and
write to the allocated store queue entry first and second store physical address proxies (PAPs) for the first and second store physical memory line addresses, respectively, wherein the first store PAP comprises the set index and way that uniquely identifies an entry of the second-level cache that holds a copy of the first line of memory specified by the first store physical memory line address, wherein the second store PAP comprises the set index and way that uniquely identifies an entry of the second-level cache that holds a copy of the second line of memory specified by the second store physical memory line address.

12. The microprocessor of claim 11, further comprising:
a virtually-indexed virtually-tagged first-level set-associative data cache configured to, in response to the load virtual address hitting in a pair of entries of the first-level data cache, provide the first and second load PAPs for writing into the allocated load queue entry.

13. The microprocessor of claim 12,
wherein the load/store unit is configured to, during execution of the load instruction:
use comparisons of the first and second store PAPs held in the allocated store queue entry with each of the first and second load PAPs received from the first-level data cache in making a decision whether to forward to the load instruction the store data held in the allocated store queue entry.

14. The microprocessor of claim 11,
wherein the load/store unit is configured to, during commit of the store instruction:
write the store data to the first-level data cache; and
use comparisons of the first and second store PAPs held in the allocated store queue entry with each of the first and second load PAPs held in the allocated load queue entry to make a store-to-load forwarding correctness check with respect to the load instruction from the store instruction.

15. The microprocessor of claim 10,
wherein the load/store unit maintains single-cycle throughput throughout the execution of the load instruction even though the first and second portions of the load data are to be read from different lines of memory.

16. The microprocessor of claim 10,
wherein the load/store unit executes the load instruction with a same performance as the load/store unit executes a load instruction whose load data is to be read from a single line of memory.

17. The microprocessor of claim 10,
wherein the first and second lines of memory are in different pages of memory.

18. The microprocessor of claim 10,
wherein the load/store unit is further configured to set a split indicator of the allocated load queue entry to a true value, in response to detecting that the first and second portions of the load data are to be read from different lines of memory.

19. The microprocessor of claim 18,
wherein the load/store unit is configured to detect, during execution of a second load instruction that requests second load data and based on a load virtual address and a data size specified by the second load instruction, that a first portion of the second load data is to be read from a first 8-byte-address-aligned block of memory and that a second portion of the second load data is to be read from a second 8-byte-address-aligned block of memory different from the first 8-byte-address-aligned block; and
wherein the load/store unit is further configured to set the split indicator of a load queue entry allocated to the second load instruction to a true value, in response to detecting that the first and second portions of the second load data are to be read from the different 8-byte-address-aligned blocks.

20. The microprocessor of claim 10, further comprising:
a virtually-indexed virtually-tagged first-level set-associative data cache configured to, in response to the load virtual address hitting in an entry of the first-level data cache, provide the first and second load PAPs for writing into the allocated load queue entry.

21. A method, comprising:
in a microprocessor comprising:
a physically-indexed physically-tagged second-level set-associative cache, wherein each entry of the second-level cache is configured to hold a copy of a line of memory and is uniquely identified by a set index and a way;
a store queue; and
a load/store unit;
by the load/store unit, during execution of a store instruction having store data:
detecting, based on a store virtual address and a data size specified by the store instruction, a first portion of the store data is to be written to a first line of memory specified by a first store physical memory line address and that a second portion of the store data is to be written to a second line of memory different from the first line of memory and specified by a second store physical memory line address;
writing all the store data to an entry of the store queue allocated to the store instruction; and
writing to the allocated store queue entry first and second store physical address proxies (PAPs) for the first and second store physical memory line addresses, respectively, wherein the first store PAP comprises the set index and way that uniquely identifies an entry of the second-level cache that holds a copy of the first line of memory specified by the first store physical memory line address, wherein the second store PAP comprises the set index and way that uniquely identifies an entry of the second-level cache that holds a copy of the second line of memory specified by the second store physical memory line address;
wherein the entries of the store queue are absent storage for holding the first and second store physical memory line addresses.

22. The method of claim 21, further comprising:
providing, by a virtually-indexed virtually-tagged first-level set-associative data cache of the microprocessor in response to the store virtual address hitting in a pair of entries of the first-level data cache, the first and second store PAPs for writing into the allocated store queue entry.

23. The method of claim 22, further comprising:

providing, by the first-level data cache in response to a load virtual address specified by a load instruction that hits in a pair of entries of the first-level data cache, first and second load PAPs for respective first and second load physical memory line addresses, wherein the first load PAP comprises the set index and way that uniquely identifies an entry of the second-level cache that holds a copy of a first line of memory specified by the first load physical memory line address, wherein the second load PAP comprises the set index and way that uniquely identifies an entry of the second-level cache that holds a copy of a second line of memory specified by the second load physical memory line address; and by the load/store unit, during execution of the load instruction that requests load data:

detecting that, based on a load virtual address and a data size specified by the load instruction, a first portion of the load data is to be read from the first line of memory specified by the first load physical memory line address and that a second portion of the load data is to be read from a second line of memory different from the first line of memory and specified by the second load physical memory line address; and using comparisons of the first and second store PAPs held in the allocated store queue entry with each of the first and second load PAPs received from the first-level data cache in making a decision whether to forward to the load instruction the store data held in the allocated store queue entry.

24. The method of claim 23, further comprising:

wherein the microprocessor further comprises a load queue;

writing, by the load/store unit during execution of the load instruction, the first and second load PAPs to an entry of the load queue allocated for the load instruction; and by the load/store unit during commit of the store instruction:

writing the store data to the first-level data cache; and using comparisons of the first and second store PAPs held in the allocated store queue entry with each of the first and second load PAPs held in the allocated load queue entry to make a store-to-load forwarding correctness check with respect to the load instruction from the store instruction.

25. The method of claim 21, wherein the load/store unit maintains single-cycle throughput throughout the execution of the store instruction even though the first and second portions of the store data are to be written to different lines of memory.

26. The method of claim 21, wherein the load/store unit executes the store instruction with a same performance as the load/store unit executes a store instruction whose store data is to be written to a single line of memory.

27. The method of claim 21, wherein the first and second lines of memory are in different pages of memory.

28. The method of claim 21, further comprising:

setting, by the load/store unit, a split indicator of the allocated store queue entry to a true value, in response to detecting that the first and second portions of the store data are to be written to different lines of memory.

29. The method of claim 28, further comprising:

detecting, by the load/store unit during execution of a second store instruction having second store data and based on a store virtual address and a data size specified by the second store instruction, that a first portion of the second store data is to be written to a first 8-byte-address-aligned block of memory and that a second portion of the second store data is to be written to a second 8-byte-address-aligned block of memory different from the first 8-byte-address-aligned block; and setting, by the load/store unit, the split indicator of a store queue entry allocated to the second store instruction to a true value, in response to detecting that the first and second portions of the second store data are to be written to the different 8-byte-address-aligned blocks.

30. A method, comprising:

in a microprocessor comprising:

a physically-indexed physically-tagged second-level set-associative cache, wherein each entry of the second-level cache is configured to hold a copy of a line of memory and is uniquely identified by a set index and a way;

a load queue; and a load/store unit;

by the load/store unit during execution of a load instruction that requests load data:

detecting that, based on a load virtual address and a data size specified by the load instruction, a first portion of the load data is to be read from a first line of memory specified by a first load physical memory line address and that a second portion of the load data is to be read from a second line of memory different from the first line of memory and specified by a second load physical memory line address; and writing to an entry of the load queue allocated to the load instruction first and second load physical address proxies (PAPs) for the first and second load physical memory line addresses, respectively, wherein the first load PAP comprises the set index and way that uniquely identifies an entry of the second-level cache that holds a copy of the first line of memory specified by the first load physical memory line address, wherein the second load PAP comprises the set index and way that uniquely identifies an entry of the second-level cache that holds a copy of the second line of memory specified by the second load physical memory line address;

wherein the entries of the load queue are absent storage for holding the first and second load physical memory line addresses.

31. The method of claim 30, further comprising:

wherein the microprocessor further comprises a store queue;

by the load/store unit during execution of a store instruction having store data and prior to the execution of the load instruction:

detecting that, based on a store virtual address and a data size specified by the store instruction, a first portion of the store data is to be written to a first line of memory specified by a first store physical memory line address and that a second portion of the store data is to be written to a second line of memory different from the first line of memory and specified by a second store physical memory line address;

writing all the store data to an entry of the store queue allocated to the store instruction; and writing to the allocated store queue entry first and second store physical address proxies (PAPs) for the first and second store physical memory line addresses, respectively, wherein the first store PAP comprises the set index and way that uniquely identifies an entry of the second-level cache that holds a copy of the first line of memory specified by the first store physical memory line address, wherein the second store PAP comprises the set index and way that uniquely identifies an entry of the second-level cache that holds a copy of the second line of memory specified by the second store physical memory line address.

32. The method of claim 31, further comprising:
providing, by a virtually-indexed virtually-tagged first-level set-associative data cache in response to the load virtual address hitting in a pair of entries of the first-level data cache, the first and second load PAPs for writing into the allocated load queue entry.

33. The method of claim 32, further comprising:
using, by the load/store unit during execution of the load instruction, comparisons of the first and second store PAPs held in the allocated store queue entry with each of the first and second load PAPs received from the first-level data cache in making a decision whether to forward to the load instruction the store data held in the allocated store queue entry.

34. The method of claim 31, further comprising:
by the load/store unit during commit of the store instruction:
   writing the store data to the first-level data cache; and
   using comparisons of the first and second store PAPs held in the allocated store queue entry with each of the first and second load PAPs held in the allocated load queue entry to make a store-to-load forwarding correctness check with respect to the load instruction from the store instruction.

35. The method of claim 30,
wherein the load/store unit maintains single-cycle throughput throughout the execution of the load instruction even though the first and second portions of the load data are to be read from different lines of memory.

36. The method of claim 30,
wherein the load/store unit executes the load instruction with a same performance as the load/store unit executes a load instruction whose load data is to be read from a single line of memory.

37. The method of claim 30,
wherein the first and second lines of memory are in different pages of memory.

38. The method of claim 30, further comprising:
setting, by the load/store unit, a split indicator of the allocated load queue entry to a true value, in response to detecting that the first and second portions of the load data are to be read from different lines of memory.

39. The method of claim 38, further comprising:
detecting, by the load/store unit during execution of a second load instruction that requests second load data and based on a load virtual address and a data size specified by the second load instruction, that a first portion of the second load data is to be read from a first 8-byte-address-aligned block of memory and that a second portion of the second load data is to be read from a second 8-byte-address-aligned block of memory different from the first 8-byte-address-aligned block; and
setting, by the load/store unit, the split indicator of a load queue entry allocated to the second load instruction to a true value, in response to detecting that the first and second portions of the second load data are to be read from the different 8-byte-address-aligned blocks.

40. The method of claim 30, further comprising:
providing, by a virtually-indexed virtually-tagged first-level set-associative data cache in response to the load virtual address hitting in an entry of the first-level data cache, the first and second load PAPs for writing into the allocated load queue entry.

* * * * *